(12) United States Patent
Gießibl

(10) Patent No.: US 10,940,726 B2
(45) Date of Patent: Mar. 9, 2021

(54) MAGNETOELASTIC BASED SENSOR ASSEMBLY

(71) Applicant: Methode Electronics Malta Ltd., Birkirkara (MT)

(72) Inventor: Johannes Gießibl, Amerang (DE)

(73) Assignee: Methode Electronics Malta Ltd., Mriehel Bkr (MT)

( * ) Notice: Subject to any disclaimer, the term of this patent is extended or adjusted under 35 U.S.C. 154(b) by 0 days.

(21) Appl. No.: 16/893,988

(22) Filed: Jun. 5, 2020

(65) Prior Publication Data

US 2020/0298638 A1  Sep. 24, 2020

Related U.S. Application Data

(63) Continuation of application No. 16/523,418, filed on Jul. 26, 2019, now Pat. No. 10,696,109, which is a
(Continued)

(30) Foreign Application Priority Data

Mar. 22, 2017  (EP) ..................................... 17162429

(51) Int. Cl.
  *B60D 1/24* (2006.01)
  *B60D 1/64* (2006.01)
  (Continued)

(52) U.S. Cl.
  CPC ............... *B60D 1/248* (2013.01); *B60D 1/64* (2013.01); *G01L 5/0004* (2013.01); *G01L 5/136* (2013.01); *B60D 1/04* (2013.01); *F16C 11/06* (2013.01)

(58) Field of Classification Search
  CPC .. B60D 1/248; B60D 1/62; B60D 1/04; G01L 1/125; G01L 5/136; F16C 11/06
  See application file for complete search history.

(56) References Cited

U.S. PATENT DOCUMENTS

| 2,317,718 A | 4/1943 | Barnes et al. |
| 3,514,997 A | 6/1970 | Gwathmey et al. |

(Continued)

FOREIGN PATENT DOCUMENTS

| DE | 102006058439 A1 | 6/2008 |
| DE | 102014217801 A1 | 3/2016 |

(Continued)

OTHER PUBLICATIONS

The European Search Report dated Dec. 7, 2018.
(Continued)

*Primary Examiner* — Kevin Hurley
*Assistant Examiner* — Harold Eric Pahlck, III
(74) *Attorney, Agent, or Firm* — Blank Rome LLP

(57) ABSTRACT

The invention provides a sensor assembly for force sensing, the sensor assembly comprising: a first portion having a first and a second through hole, a second portion having a third and fourth through hole, and a first pin and a second pin coupling the first portion to the second portion. At least one out of the first and the second pin comprises a magnetoelastic based sensor for outputting a signal corresponding to a stress-induced magnetic flux emanating from a magnetically polarized region of the pin. The magnetoelastic based sensor comprises at least one direction sensitive magnetic field sensor in an at least partially hollow portion of the pin, which field sensor is configured for determination of a shear force in at least one direction. The invention further provides a tow coupling comprising the sensor assembly. The invention further provides a method for detecting a load.

32 Claims, 16 Drawing Sheets

Related U.S. Application Data continuation of application No. PCT/EP2018/000105, filed on Mar. 22, 2018.

(51) Int. Cl.

| | | |
|---|---|---|
| *G01L 5/00* | (2006.01) | |
| *G01L 5/13* | (2006.01) | |
| *B60D 1/04* | (2006.01) | |
| *F16C 11/06* | (2006.01) | |

(56) References Cited

U.S. PATENT DOCUMENTS

| | | |
|---|---|---|
| 3,520,184 A | 7/1970 | Tanner et al. |
| 3,593,263 A | 7/1971 | Olsen |
| 3,737,233 A | 6/1973 | Blau et al. |
| 3,972,231 A | 8/1976 | Richardson |
| 4,105,972 A | 8/1978 | Smith |
| 4,384,270 A | 5/1983 | Morita et al. |
| 4,814,743 A | 3/1989 | Hanaki |
| 4,836,019 A | 6/1989 | Hagen et al. |
| 5,205,169 A | 4/1993 | Hagen |
| 5,351,564 A | 10/1994 | Watson et al. |
| 5,511,812 A | 4/1996 | Milner |
| 5,592,171 A | 1/1997 | Jordan |
| 5,616,861 A | 4/1997 | Hagen |
| 5,617,025 A | 4/1997 | Taylor et al. |
| 5,618,999 A | 4/1997 | Schweitzer et al. |
| 5,716,071 A | 2/1998 | Stanley et al. |
| 5,716,302 A | 2/1998 | Andersson |
| 5,727,637 A | 3/1998 | Kono et al. |
| 5,729,194 A | 3/1998 | Spears et al. |
| 5,731,525 A | 3/1998 | Boe |
| 5,738,176 A | 4/1998 | Gingerich |
| 5,739,442 A | 4/1998 | Schweitzer et al. |
| 5,741,048 A | 4/1998 | Eccleston |
| 5,741,981 A | 4/1998 | Ling et al. |
| 5,747,683 A | 5/1998 | Gerum et al. |
| 5,773,722 A | 6/1998 | Helderman |
| 5,777,240 A | 7/1998 | Lefebvre et al. |
| 5,780,782 A | 7/1998 | O'Dea |
| 5,780,783 A | 7/1998 | Heider et al. |
| 5,782,542 A | 7/1998 | McGrath et al. |
| 5,783,751 A | 7/1998 | Maw et al. |
| 5,785,393 A | 7/1998 | McGrath et al. |
| 5,791,676 A | 8/1998 | Jones |
| 5,800,025 A | 9/1998 | McGrath et al. |
| 5,806,937 A | 9/1998 | Brunson |
| 5,811,738 A | 9/1998 | Boyovich et al. |
| 5,821,852 A | 10/1998 | Fairchild |
| 5,822,876 A | 10/1998 | Haas et al. |
| 5,823,637 A | 10/1998 | Blue |
| 5,824,771 A | 10/1998 | Rivier |
| 5,831,173 A | 11/1998 | Hanano |
| 5,844,146 A | 12/1998 | Murray et al. |
| 5,848,826 A | 12/1998 | Muller |
| 5,851,021 A | 12/1998 | Van Kley |
| 5,853,186 A | 12/1998 | Gentner et al. |
| 5,861,802 A | 1/1999 | Hungerink et al. |
| 5,861,814 A | 1/1999 | Clayton |
| 5,863,057 A | 1/1999 | Wessels |
| 5,865,593 A | 2/1999 | Cohn |
| 5,876,055 A | 3/1999 | Fontaine |
| 5,876,100 A | 3/1999 | Breckner et al. |
| 5,877,455 A | 3/1999 | Kyrtsos |
| 5,880,409 A | 3/1999 | Hartman |
| 5,883,312 A | 3/1999 | Hayashida |
| 5,884,238 A | 3/1999 | Noll et al. |
| 5,910,217 A | 6/1999 | Sargent |
| 5,912,616 A | 6/1999 | Valentino |
| 5,915,281 A | 6/1999 | Sparks |
| 5,921,641 A | 7/1999 | Lupges et al. |
| 5,941,560 A | 8/1999 | Wolfram |
| 5,947,225 A | 9/1999 | Kawakami et al. |
| 5,947,637 A | 9/1999 | Neuling |
| 5,951,035 A | 9/1999 | Phillips, Jr. et al. |
| 5,957,476 A | 9/1999 | Simpson |
| 5,964,476 A | 10/1999 | Maines |
| 5,969,270 A | 10/1999 | Doemes et al. |
| 5,971,432 A | 10/1999 | Gagnon et al. |
| 5,980,048 A | 11/1999 | Rannells, Jr. et al. |
| 5,983,729 A | 11/1999 | Taylor |
| 5,985,666 A | 11/1999 | Loiselle et al. |
| 5,988,000 A | 11/1999 | Adams |
| 5,988,666 A | 11/1999 | Flater |
| 6,000,709 A | 12/1999 | Gentner et al. |
| 6,003,614 A | 12/1999 | Crabb |
| 6,012,780 A | 1/2000 | Duvernay |
| 6,012,781 A | 1/2000 | Gerum |
| 6,013,880 A | 1/2000 | McFarlane et al. |
| 6,014,901 A | 1/2000 | Boe |
| 6,025,563 A | 2/2000 | Lesesky et al. |
| 6,035,943 A | 3/2000 | Gerein et al. |
| 6,037,550 A | 3/2000 | Bradley |
| 6,039,139 A | 3/2000 | Breed et al. |
| 6,039,410 A | 3/2000 | Robertson et al. |
| 6,042,196 A | 3/2000 | Nakamura et al. |
| 6,044,915 A | 4/2000 | Schlegel et al. |
| 6,044,916 A | 4/2000 | Hundeby |
| 6,050,649 A | 4/2000 | Hensley |
| 6,053,521 A | 4/2000 | Schertler |
| 6,065,353 A | 5/2000 | Hirabayashi et al. |
| 6,068,352 A | 5/2000 | Kulkarni et al. |
| 6,079,791 A | 6/2000 | Stumpe et al. |
| 6,082,203 A | 7/2000 | Koivisto et al. |
| 6,082,467 A | 7/2000 | Friesen |
| 6,084,183 A | 7/2000 | Nakazaki |
| 6,095,348 A | 8/2000 | Karashima |
| 6,100,794 A | 8/2000 | Hillier |
| 6,100,795 A | 8/2000 | Otterbacher et al. |
| 6,105,230 A | 8/2000 | Balestracci |
| 6,112,589 A | 9/2000 | Tressler et al. |
| 6,116,638 A | 9/2000 | Hosoda |
| 6,118,083 A | 9/2000 | Boyovich et al. |
| 6,120,052 A | 9/2000 | Capik et al. |
| 6,126,246 A | 10/2000 | Decker, Sr. et al. |
| 6,127,939 A | 10/2000 | Lesesky et al. |
| 6,139,118 A | 10/2000 | Hurst et al. |
| 6,142,959 A | 11/2000 | Sarvazyan et al. |
| 6,144,928 A | 11/2000 | Leimbach et al. |
| 6,150,617 A | 11/2000 | Hart et al. |
| 6,152,252 A | 11/2000 | Pettersson |
| 6,152,475 A | 11/2000 | Poole |
| 6,157,889 A | 12/2000 | Baker |
| 6,161,962 A | 12/2000 | French et al. |
| 6,168,181 B1 | 1/2001 | Gadd |
| 6,176,505 B1 | 1/2001 | Capik et al. |
| 6,178,650 B1 | 1/2001 | Thibodeaux |
| 6,179,319 B1 | 1/2001 | Malisch et al. |
| 6,189,644 B1 | 2/2001 | Taylor |
| 6,196,328 B1 | 3/2001 | McDaniel et al. |
| 6,203,045 B1 | 3/2001 | Kyrtsos et al. |
| 6,203,049 B1 | 3/2001 | Gibson |
| 6,216,072 B1 | 4/2001 | Boe et al. |
| 6,218,737 B1 | 4/2001 | Adamek et al. |
| 6,222,443 B1 | 4/2001 | Beeson et al. |
| 6,222,457 B1 | 4/2001 | Mills et al. |
| 6,230,817 B1 | 5/2001 | Haugen |
| 6,234,508 B1 | 5/2001 | Tuttle et al. |
| 6,234,511 B1 | 5/2001 | Gentner et al. |
| 6,240,339 B1 | 5/2001 | von Mayenburg et al. |
| 6,240,788 B1 | 6/2001 | Balestracci |
| 6,242,701 B1 | 6/2001 | Breed et al. |
| 6,250,650 B1 | 6/2001 | Douglas |
| 6,250,863 B1 | 6/2001 | Kamentser et al. |
| 6,252,497 B1 | 6/2001 | Dupay et al. |
| 6,259,357 B1 | 7/2001 | Heider |
| 6,262,573 B1 | 7/2001 | Wojnarowski et al. |
| 6,264,337 B1 | 7/2001 | Rannells, Jr. et al. |
| 6,268,800 B1 | 7/2001 | Howard |
| 6,273,522 B1 | 8/2001 | Feetenby et al. |
| 6,285,278 B1 | 9/2001 | Schutt et al. |
| 6,289,749 B1 | 9/2001 | Sanders |
| 6,299,191 B1 | 10/2001 | Sargent |
| 6,302,424 B1 | 10/2001 | Gisinger et al. |

(56) References Cited

U.S. PATENT DOCUMENTS

| | | |
|---|---|---|
| 6,308,578 B1 | 10/2001 | DeRose |
| 6,327,903 B1 | 12/2001 | Hecker et al. |
| 6,334,746 B1 | 1/2002 | Nguyen et al. |
| 6,349,959 B2 | 2/2002 | Schlegel et al. |
| 6,351,697 B1 | 2/2002 | Baker |
| 6,352,277 B1 | 3/2002 | Timmings |
| 6,354,448 B1 | 3/2002 | Ramne |
| 6,364,432 B1 | 4/2002 | Mixon |
| 6,371,217 B1 | 4/2002 | Boden |
| 6,375,211 B1 | 4/2002 | MacKarvich |
| 6,378,620 B1 | 4/2002 | Luca et al. |
| 6,378,957 B1 | 4/2002 | V.ang.gstedt |
| 6,384,716 B1 | 5/2002 | Eckelberry |
| 6,394,490 B2 | 5/2002 | Osmer et al. |
| 6,401,855 B1 | 6/2002 | Wolfe |
| 6,407,353 B1 | 6/2002 | Fritzinger et al. |
| 6,408,685 B2 | 6/2002 | Shin |
| 6,416,138 B1 | 7/2002 | Barnett |
| 6,419,037 B1 | 7/2002 | Kramer et al. |
| 6,420,798 B2 | 7/2002 | Adamek et al. |
| 6,439,545 B1 | 8/2002 | Hansen |
| 6,445,993 B1 | 9/2002 | Eccleston et al. |
| 6,446,998 B1 | 9/2002 | Koenig et al. |
| 6,450,523 B1 | 9/2002 | Masters et al. |
| 6,452,485 B1 | 9/2002 | Schutt et al. |
| 6,456,066 B1 | 9/2002 | Burd et al. |
| 6,480,104 B1 | 11/2002 | Wall et al. |
| 6,490,935 B1 | 12/2002 | Joki et al. |
| 6,494,476 B2 | 12/2002 | Masters et al. |
| 6,494,478 B1 | 12/2002 | MacKarvich |
| 6,499,814 B1 | 12/2002 | Mixon |
| 6,516,925 B1 | 2/2003 | Napier et al. |
| 6,523,911 B1 | 2/2003 | Rupp et al. |
| 6,524,221 B2 | 2/2003 | Nishimura |
| 6,525,276 B1 | 2/2003 | Vellidus et al. |
| 6,531,951 B2 | 3/2003 | Serban et al. |
| 6,534,728 B1 | 3/2003 | Spikings |
| 6,547,271 B2 | 4/2003 | Kleb et al. |
| 6,581,695 B2 | 6/2003 | Bernhardt et al. |
| 6,587,041 B1 | 7/2003 | Brown, Jr. |
| 6,592,230 B2 | 7/2003 | Dupay |
| 6,595,062 B1 | 7/2003 | Luke et al. |
| 6,598,895 B1 | 7/2003 | Hult et al. |
| 6,606,913 B1 | 8/2003 | Gianchandani |
| 6,609,055 B2 | 8/2003 | Stanley |
| 6,615,125 B2 | 9/2003 | Eccleston et al. |
| 6,619,136 B2 | 9/2003 | Basile et al. |
| 6,619,759 B2 | 9/2003 | Bradsen et al. |
| 6,624,363 B2 | 9/2003 | Orlando et al. |
| 6,626,504 B2 | 9/2003 | Harner et al. |
| 6,629,701 B1 | 10/2003 | Colibert |
| 6,631,916 B1 | 10/2003 | Miller |
| 6,636,047 B2 | 10/2003 | Arlt et al. |
| 6,640,646 B2 | 11/2003 | Davis et al. |
| 6,644,761 B2 | 11/2003 | Schuck |
| 6,647,162 B2 | 11/2003 | Kim et al. |
| 6,652,038 B1 | 11/2003 | Frye |
| 6,652,544 B2 | 11/2003 | Houser et al. |
| 6,655,710 B2 | 12/2003 | Lindell et al. |
| 6,662,138 B1 | 12/2003 | Takafuji et al. |
| 6,663,132 B1 | 12/2003 | Kizy |
| 6,666,097 B2 | 12/2003 | Smith |
| 6,666,527 B2 | 12/2003 | Gill et al. |
| 6,668,225 B2 | 12/2003 | Oh et al. |
| 6,685,281 B2 | 2/2004 | MacGregor et al. |
| 6,688,631 B1 | 2/2004 | Andre |
| 6,691,635 B2 | 2/2004 | Murakami et al. |
| 6,705,684 B1 | 3/2004 | Garvey |
| 6,722,684 B1 | 4/2004 | McAllister |
| 6,739,611 B2 | 5/2004 | Gisinger et al. |
| 6,753,780 B2 | 6/2004 | Li |
| 6,765,607 B2 | 7/2004 | Mizusawa et al. |
| 6,769,315 B2 | 8/2004 | Stevenson et al. |
| 6,769,709 B1 | 8/2004 | Piper et al. |
| 6,777,968 B1 | 8/2004 | Kobayashi et al. |
| 6,779,616 B1 | 8/2004 | Brown |
| 6,793,233 B2 | 9/2004 | Eckelberry et al. |
| 6,799,653 B2 | 10/2004 | Recknagel |
| 6,799,814 B2 | 10/2004 | Lesesky et al. |
| 6,803,530 B2 | 10/2004 | Carlstrom et al. |
| 6,807,869 B2 | 10/2004 | Farringdon et al. |
| 6,808,098 B1 | 10/2004 | Bickett, III et al. |
| 6,813,959 B2 | 11/2004 | Kim et al. |
| 6,829,943 B2 | 12/2004 | Weyand et al. |
| 6,845,851 B1 | 1/2005 | Donaldson et al. |
| 6,851,504 B2 | 2/2005 | Campbell et al. |
| 6,851,697 B2 | 2/2005 | Kinnard |
| 6,854,557 B1 | 2/2005 | Deng et al. |
| 6,860,030 B1 | 3/2005 | Graf et al. |
| 6,860,161 B2 | 3/2005 | Yamakawa et al. |
| 6,863,286 B2 | 3/2005 | Eros et al. |
| 6,863,295 B2 | 3/2005 | Reutlinger et al. |
| 6,866,283 B2 | 3/2005 | Alguera et al. |
| 6,871,547 B2 | 3/2005 | Davis et al. |
| 6,873,909 B2 | 3/2005 | Borugian |
| 6,886,847 B2 | 5/2005 | Piper et al. |
| 6,920,940 B2 | 7/2005 | Casali et al. |
| 6,921,100 B2 | 7/2005 | Mantini et al. |
| 6,921,139 B2 | 7/2005 | Tobler |
| 6,931,947 B2 | 8/2005 | Schulze et al. |
| 6,932,374 B1 | 8/2005 | Timms et al. |
| 6,938,910 B2 | 9/2005 | Liljeberg et al. |
| 6,940,186 B2 | 9/2005 | Weitkamp |
| 6,945,348 B2 | 9/2005 | Henderson et al. |
| 6,948,387 B2 | 9/2005 | Chen et al. |
| 6,966,613 B2 | 11/2005 | Davis |
| 6,969,809 B2 | 11/2005 | Rainey |
| 6,971,452 B2 | 12/2005 | Ocsenknecht et al. |
| 6,983,883 B2 | 1/2006 | Ridling |
| 6,990,745 B1 | 1/2006 | Schoenenberger |
| 6,997,060 B2 | 2/2006 | Morikawa |
| 6,997,279 B2 | 2/2006 | Kolpasky et al. |
| 7,000,352 B2 | 2/2006 | Ishihara et al. |
| 7,005,587 B2 | 2/2006 | Axakov et al. |
| 7,006,127 B2 | 2/2006 | Mizusawa et al. |
| 7,009,118 B2 | 3/2006 | Pottebaum et al. |
| 7,021,157 B2 | 4/2006 | Nastasi, Jr. |
| 7,024,940 B2 | 4/2006 | Davis et al. |
| 7,032,918 B2 | 4/2006 | Saarinen et al. |
| 7,055,639 B2 | 6/2006 | Kiribayashi |
| 7,057,498 B1 | 6/2006 | Cook et al. |
| 7,072,763 B2 | 7/2006 | Saxon et al. |
| 7,073,603 B2 | 7/2006 | Nordhoff |
| 7,077,015 B2 | 7/2006 | Hayward et al. |
| 7,096,991 B2 | 8/2006 | Keutz |
| 7,117,755 B2 | 10/2006 | Yang |
| 7,125,033 B2 | 10/2006 | Forrister |
| 7,131,512 B2 | 11/2006 | Aoki |
| 7,135,645 B2 | 11/2006 | Hiraki et al. |
| 7,137,302 B2 | 11/2006 | Silverbrook et al. |
| 7,137,472 B2 | 11/2006 | Aoki |
| 7,140,632 B2 | 11/2006 | Alguera et al. |
| 7,141,746 B1 | 11/2006 | Scott |
| 7,142,968 B2 | 11/2006 | Alexander et al. |
| 7,151,443 B2 | 12/2006 | Dialinakis |
| 7,156,410 B1 | 1/2007 | Maskaleris |
| 7,158,017 B2 | 1/2007 | Baur et al. |
| 7,159,890 B2 | 1/2007 | Craig et al. |
| 7,168,661 B1 | 1/2007 | Fox |
| 7,171,289 B1 | 1/2007 | Tamez et al. |
| 7,171,330 B2 | 1/2007 | Kruse et al. |
| 7,171,769 B2 | 2/2007 | Schultz et al. |
| 7,182,362 B2 | 2/2007 | Yeakel |
| 7,188,549 B2 | 3/2007 | Ohtake et al. |
| 7,190,258 B2 | 3/2007 | Lee |
| 7,195,267 B1 | 3/2007 | Thompson |
| 7,204,504 B2 | 4/2007 | Gehring et al. |
| 7,207,588 B2 | 4/2007 | Bergum et al. |
| 7,210,209 B2 | 5/2007 | Dvoskin et al. |
| 7,221,265 B2 | 5/2007 | Bjorkgard |
| 7,224,264 B2 | 5/2007 | Honan, III |
| 7,225,068 B2 | 5/2007 | Schick et al. |
| 7,225,891 B2 | 6/2007 | Gehring et al. |
| 7,226,068 B2 | 6/2007 | Ahner et al. |

(56) References Cited

U.S. PATENT DOCUMENTS

| | | |
|---|---|---|
| 7,226,134 B2 | 6/2007 | Horn et al. |
| 7,236,866 B2 | 6/2007 | Takafuji et al. |
| 7,237,790 B2 | 7/2007 | Gehring et al. |
| 7,261,487 B2 | 8/2007 | Urbach |
| 7,267,020 B2 | 9/2007 | Wilcox et al. |
| 7,270,486 B2 | 9/2007 | Meyer |
| 7,273,260 B2 | 9/2007 | Gray |
| 7,275,619 B2 | 10/2007 | Tokumoto |
| 7,285,735 B1 | 10/2007 | Elliott et al. |
| 7,287,947 B2 | 10/2007 | Smith |
| 7,290,783 B2 | 11/2007 | Dornbos |
| 7,293,809 B2 | 11/2007 | Suzuki et al. |
| 7,294,793 B2 | 11/2007 | Axakov et al. |
| 7,302,332 B2 | 11/2007 | Nenninger |
| 7,305,864 B2 | 12/2007 | Graber et al. |
| 7,309,075 B2 | 12/2007 | Ramsey et al. |
| 7,311,364 B2 | 12/2007 | Robertson |
| 7,331,238 B2 | 2/2008 | Wanami et al. |
| 7,336,159 B2 | 2/2008 | Fackrell et al. |
| 7,338,062 B1 | 3/2008 | Violette et al. |
| 7,341,264 B2 | 3/2008 | Swannie |
| 7,344,204 B2 | 3/2008 | Cayer |
| 7,344,311 B2 | 3/2008 | Lu et al. |
| 7,347,464 B2 | 3/2008 | Tanabe |
| 7,357,036 B2 | 4/2008 | Steprath |
| 7,361,303 B2 | 4/2008 | Kantor et al. |
| 7,380,810 B1 | 6/2008 | Wilkens et al. |
| 7,387,183 B2 | 6/2008 | Breed et al. |
| 7,388,370 B2 | 6/2008 | Cech et al. |
| 7,390,008 B1 | 6/2008 | Hall |
| 7,401,527 B2 | 7/2008 | Flaharty et al. |
| 7,401,871 B2 | 7/2008 | Lu et al. |
| 7,404,448 B2 | 7/2008 | Tuttle et al. |
| 7,404,466 B2 | 7/2008 | Diehl |
| 7,408,123 B2 | 8/2008 | Hawes et al. |
| 7,410,183 B2 | 8/2008 | Stowell et al. |
| 7,415,869 B2 | 8/2008 | Beverly et al. |
| 7,419,027 B2 | 9/2008 | Bihya |
| 7,429,051 B2 | 9/2008 | Bauer et al. |
| 7,429,073 B2 | 9/2008 | Watanabe et al. |
| 7,430,491 B2 | 9/2008 | Gutierrez et al. |
| 7,431,319 B2 | 10/2008 | Staggs |
| 7,438,368 B2 | 10/2008 | Kohler et al. |
| 7,452,038 B2 | 11/2008 | Crawford |
| 7,454,304 B2 | 11/2008 | Johansen et al. |
| 7,455,139 B2 | 11/2008 | Lee |
| 7,458,597 B2 | 12/2008 | MacDougall |
| 7,463,137 B2 | 12/2008 | Wishart et al. |
| 7,463,139 B2 | 12/2008 | Burlak et al. |
| 7,472,599 B2 | 1/2009 | Vik et al. |
| 7,484,750 B2 | 2/2009 | Van Vooren et al. |
| 7,497,458 B2 | 3/2009 | Daniel |
| 7,506,885 B2 | 3/2009 | Colibert et al. |
| 7,507,917 B2 | 3/2009 | Kaltenheuser |
| 7,520,183 B2 | 4/2009 | Kouduki et al. |
| 7,522,986 B2 | 4/2009 | Kitapini et al. |
| 7,530,590 B2 | 5/2009 | Staggs |
| 7,540,524 B2 | 6/2009 | Viaud |
| 7,546,764 B2 | 6/2009 | Morinaga et al. |
| 7,548,155 B2 | 6/2009 | Schutt et al. |
| 7,549,667 B2 | 6/2009 | Busuttil et al. |
| 7,556,278 B2 | 7/2009 | Roberts et al. |
| 7,559,270 B2 | 7/2009 | Langenfeld et al. |
| 7,559,569 B2 | 7/2009 | Nejsum |
| 7,562,893 B2 | 7/2009 | Donnard |
| 7,568,716 B2 | 8/2009 | Dietz |
| 7,572,988 B1 | 8/2009 | Morton et al. |
| 7,575,286 B2 | 8/2009 | Robertson |
| 7,581,503 B2 | 9/2009 | Martin et al. |
| 7,584,982 B2 | 9/2009 | Fisher |
| 7,588,089 B2 | 9/2009 | Guo et al. |
| 7,598,845 B2 | 10/2009 | Kanafani |
| 7,600,574 B2 | 10/2009 | Chauvel |
| 7,603,918 B2 | 10/2009 | Blackwood et al. |
| 7,607,677 B1 | 10/2009 | Bosak |
| 7,619,506 B2 | 11/2009 | Knoll et al. |
| 7,619,508 B2 | 11/2009 | Lynam et al. |
| 7,621,552 B2 | 11/2009 | Bergum et al. |
| 7,631,886 B2 | 12/2009 | Kapfer et al. |
| 7,633,020 B2 | 12/2009 | Santi et al. |
| 7,648,153 B2 | 1/2010 | Metternich et al. |
| 7,651,114 B2 | 1/2010 | Weber et al. |
| 7,686,516 B2 | 3/2010 | Shibasaki et al. |
| 7,690,664 B2 | 4/2010 | Saieg et al. |
| 7,690,670 B1 | 4/2010 | Lincul |
| 7,693,661 B2 | 4/2010 | Iwasaka |
| 7,703,790 B2 | 4/2010 | Cunefare et al. |
| 7,712,760 B2 | 5/2010 | Ohtomo |
| 7,715,970 B2 | 5/2010 | Snyder |
| 7,717,451 B2 | 5/2010 | Alguera |
| 7,719,409 B1 | 5/2010 | Jones |
| 7,731,215 B2 | 6/2010 | Alguera |
| 7,731,216 B2 | 6/2010 | Cornish |
| 7,731,302 B2 | 6/2010 | Tandy, Jr. et al. |
| 7,757,803 B2 | 7/2010 | Fiske et al. |
| 7,758,059 B2 | 7/2010 | Alguera Gallego et al. |
| 7,762,736 B2 | 7/2010 | Ersoy et al. |
| 7,770,909 B2 | 8/2010 | Anderson et al. |
| 7,772,839 B2 | 8/2010 | Watson et al. |
| 7,775,316 B2 | 8/2010 | Hosokawa et al. |
| 7,777,482 B2 | 8/2010 | Munz et al. |
| 7,777,615 B2 | 8/2010 | Okuda et al. |
| 7,786,849 B2 | 8/2010 | Buckley |
| 7,789,412 B2 | 9/2010 | Alguera |
| 7,793,965 B2 | 9/2010 | Padula |
| 7,797,093 B2 | 9/2010 | Tsukasaki et al. |
| 7,798,263 B2 | 9/2010 | Tandy, Jr. et al. |
| 7,806,423 B2 | 10/2010 | Vikstrom et al. |
| 7,815,212 B2 | 10/2010 | Groshong et al. |
| 7,818,140 B2 | 10/2010 | Dreier et al. |
| 7,825,783 B2 | 11/2010 | Gallego et al. |
| 7,826,953 B2 | 11/2010 | Traechtler |
| 7,839,142 B2 | 11/2010 | Cech et al. |
| 7,839,143 B2 | 11/2010 | Cech et al. |
| 7,857,331 B2 | 12/2010 | Walters, Jr. |
| 7,862,067 B2 | 1/2011 | Alguera |
| 7,864,033 B2 | 1/2011 | Imura et al. |
| 7,864,066 B2 | 1/2011 | Kriel et al. |
| 7,868,748 B2 | 1/2011 | Kiribayashi |
| 7,891,691 B2 | 2/2011 | Bearey |
| 7,896,383 B2 | 3/2011 | Cockram et al. |
| 7,900,736 B2 | 3/2011 | Breed |
| 7,904,222 B2 | 3/2011 | Lee et al. |
| 7,930,131 B2 | 4/2011 | Ridenour et al. |
| 7,932,816 B2 | 4/2011 | Schmidt et al. |
| 7,949,492 B2 | 5/2011 | Krueger et al. |
| 7,959,177 B2 | 6/2011 | Fiske et al. |
| 7,960,659 B2 | 6/2011 | Cleary |
| 7,963,547 B2 | 6/2011 | Anderson |
| 7,967,319 B2 | 6/2011 | Alguera |
| 7,971,942 B2 | 7/2011 | Parrott et al. |
| 7,984,920 B2 | 7/2011 | Alguera |
| 8,002,065 B2 | 8/2011 | Glavinic et al. |
| 8,013,759 B1 | 9/2011 | Aid et al. |
| 8,038,166 B1 | 10/2011 | Piesinger |
| 8,039,769 B2 | 10/2011 | Asp et al. |
| 8,051,941 B2 | 11/2011 | Takayasu et al. |
| 8,060,288 B2 | 11/2011 | Choby |
| 8,072,318 B2 | 12/2011 | Lynam et al. |
| 8,073,594 B2 | 12/2011 | Lee et al. |
| 8,087,304 B2 | 1/2012 | Lee |
| 8,098,145 B2 | 1/2012 | Ancuta et al. |
| 8,100,426 B2 | 1/2012 | Kronenberg |
| 8,120,475 B2 | 2/2012 | Iwamoto et al. |
| 8,138,899 B2 | 3/2012 | Ghneim |
| 8,152,243 B2 | 4/2012 | Bensch et al. |
| 8,155,879 B2 | 4/2012 | Takagi et al. |
| 8,160,806 B2 | 4/2012 | Salaka |
| 8,165,768 B2 | 4/2012 | Leschuk et al. |
| 8,167,329 B2 | 5/2012 | Lee |
| 8,170,825 B2 | 5/2012 | Beaujot et al. |
| 8,180,543 B2 | 5/2012 | Futamura et al. |
| 8,180,546 B2 | 5/2012 | Culbert et al. |
| 8,188,385 B2 | 5/2012 | Wolfgang et al. |

(56) References Cited

U.S. PATENT DOCUMENTS

| | | |
|---|---|---|
| 8,191,915 B2 | 6/2012 | Freese, V et al. |
| RE43,537 E | 7/2012 | Davis |
| 8,234,993 B2 | 8/2012 | Naruishi et al. |
| 8,239,145 B2 | 8/2012 | Suzuki et al. |
| 8,240,270 B2 | 8/2012 | Naruishi |
| 8,256,526 B2 | 9/2012 | Schmidt et al. |
| 8,256,560 B2 | 9/2012 | Fiske et al. |
| 8,256,851 B2 | 9/2012 | Pelosse |
| 8,258,413 B2 | 9/2012 | Ito et al. |
| 8,258,981 B2 | 9/2012 | Turnbull |
| 8,260,518 B2 | 9/2012 | Englert |
| 8,262,120 B1 | 9/2012 | Pitts et al. |
| 8,262,173 B2 | 9/2012 | Crawford |
| 8,267,485 B2 | 9/2012 | Barlsen et al. |
| 8,276,461 B2 | 10/2012 | Zwygart |
| 8,282,173 B2 | 10/2012 | Forster et al. |
| 8,286,997 B2 | 10/2012 | Kimener et al. |
| 8,290,679 B2 | 10/2012 | Bensch et al. |
| 8,297,384 B2 | 10/2012 | Wanger et al. |
| 8,297,639 B2 | 10/2012 | Alguera Gallego |
| 8,297,713 B2 | 10/2012 | Soupal |
| 8,308,182 B2 | 11/2012 | Ortmann et al. |
| 8,317,216 B2 | 11/2012 | Treude et al. |
| 8,322,482 B2 | 12/2012 | Sprinkle et al. |
| 8,322,743 B1 | 12/2012 | Klein |
| 8,333,116 B2 | 12/2012 | Boone et al. |
| 8,335,607 B2 | 12/2012 | Gatten et al. |
| 8,342,560 B2 | 1/2013 | Albers et al. |
| 8,348,298 B2 | 1/2013 | Alguera et al. |
| 8,364,435 B2 | 1/2013 | Battenberg |
| 8,365,422 B1 | 2/2013 | Ott |
| 8,365,849 B2 | 2/2013 | Bartel |
| 8,366,135 B2 | 2/2013 | Asbach et al. |
| 8,368,523 B2 | 2/2013 | Takahashi et al. |
| 8,370,026 B2 | 2/2013 | Kondoh et al. |
| 8,374,757 B2 | 2/2013 | Choby |
| 8,380,390 B2 | 2/2013 | Sy et al. |
| 8,380,391 B2 | 2/2013 | Baino |
| 8,389,879 B2 | 3/2013 | Kolb et al. |
| 8,393,632 B2 | 3/2013 | Vortmeyer et al. |
| 8,414,010 B2 | 4/2013 | Smith |
| 8,421,611 B1 | 4/2013 | Coshow et al. |
| 8,424,393 B1 | 4/2013 | Lee |
| 8,424,892 B2 | 4/2013 | Hapyuk et al. |
| 8,430,458 B2 | 4/2013 | Kaminski et al. |
| 8,463,486 B2 | 6/2013 | Park |
| 8,463,519 B2 | 6/2013 | McCann |
| 8,469,125 B2 | 6/2013 | Yu et al. |
| 8,483,942 B2 | 7/2013 | Watanabe |
| 8,485,545 B2 | 7/2013 | Szczepanek |
| 8,505,954 B1 | 8/2013 | Haley |
| 8,509,997 B2 | 8/2013 | Sorimachi |
| 8,511,150 B2 | 8/2013 | Lucas et al. |
| 8,512,208 B2 | 8/2013 | Hilberer |
| 8,515,627 B2 | 8/2013 | Marathe et al. |
| 8,527,151 B2 | 9/2013 | Le et al. |
| 8,528,929 B2 | 9/2013 | Kimener |
| 8,532,870 B2 | 9/2013 | Hoetzer et al. |
| 8,539,843 B2 | 9/2013 | Inns et al. |
| 8,540,047 B2 | 9/2013 | Takayasu et al. |
| 8,548,683 B2 | 10/2013 | Cebon et al. |
| 8,561,472 B2 | 10/2013 | Sauder et al. |
| 8,565,983 B2 | 10/2013 | Alberius et al. |
| 8,567,820 B2 | 10/2013 | Kimener et al. |
| 8,571,777 B2 | 10/2013 | Greene |
| 8,573,627 B2 | 11/2013 | Appel |
| 8,578,794 B2 | 11/2013 | Lee |
| 8,579,067 B2 | 11/2013 | Kaiser et al. |
| 8,587,421 B2 | 11/2013 | Koie |
| 8,590,917 B2 | 11/2013 | Lee |
| 8,615,347 B2 | 12/2013 | Alguera Gallego et al. |
| 8,622,158 B2 | 1/2014 | Leonard |
| 8,630,753 B2 | 1/2014 | Cahill |
| 8,635,917 B2 | 1/2014 | Lee |
| 8,638,203 B2 | 1/2014 | Raines |
| 8,646,401 B2 | 2/2014 | Branch |
| 8,646,852 B2 | 2/2014 | Bitter et al. |
| 8,651,510 B2 | 2/2014 | Fankhauser et al. |
| 8,651,585 B2 | 2/2014 | Kaminski et al. |
| 8,653,959 B2 | 2/2014 | Lynam et al. |
| 8,665,080 B2 | 3/2014 | Nagamine et al. |
| 8,678,121 B2 | 3/2014 | Troy et al. |
| 8,678,420 B2 | 3/2014 | Gallego et al. |
| 8,694,211 B2 | 4/2014 | Alg era |
| 8,698,643 B2 | 4/2014 | Schmitt et al. |
| 8,700,270 B2 | 4/2014 | Foster et al. |
| 8,701,503 B2 | 4/2014 | Shimizu et al. |
| 8,706,344 B2 | 4/2014 | Park |
| 8,716,609 B2 | 5/2014 | Pangrazio et al. |
| 8,717,013 B2 | 5/2014 | Rohmann |
| 8,717,197 B2 | 5/2014 | Rathmacher et al. |
| 8,733,242 B2 | 5/2014 | Viaud |
| 8,738,196 B2 | 5/2014 | Kronenberg |
| 8,739,916 B2 | 6/2014 | Furuhi et al. |
| 8,744,694 B2 | 6/2014 | Ystueta |
| 8,746,084 B2 | 6/2014 | Ghannam et al. |
| 8,746,812 B2 | 6/2014 | Albright et al. |
| 8,749,628 B2 | 6/2014 | Wuestefeld et al. |
| 8,753,032 B2 | 6/2014 | Yu et al. |
| 8,768,535 B2 | 7/2014 | Kossira et al. |
| 8,779,305 B2 | 7/2014 | Takayasu et al. |
| 8,781,714 B2 | 7/2014 | Kim et al. |
| 8,788,151 B2 | 7/2014 | Hwang et al. |
| 8,789,850 B2 | 7/2014 | Kimener et al. |
| 8,789,896 B2 | 7/2014 | Albright et al. |
| 8,794,656 B2 | 8/2014 | West |
| 8,798,842 B2 | 8/2014 | Woolf et al. |
| 8,814,198 B2 | 8/2014 | Wolfe |
| 8,818,699 B2 | 8/2014 | Nichols et al. |
| 8,822,849 B2 | 9/2014 | Takayasu et al. |
| 8,827,297 B2 | 9/2014 | Keatley |
| 8,836,458 B2 | 9/2014 | Lee |
| 8,838,353 B2 | 9/2014 | Wu et al. |
| 8,841,566 B2 | 9/2014 | Reichow et al. |
| 8,841,994 B2 | 9/2014 | Li et al. |
| 8,850,900 B2 | 10/2014 | Isono et al. |
| 8,855,854 B2 | 10/2014 | Schmidt et al. |
| 8,857,825 B1 | 10/2014 | Johnson |
| 8,864,247 B2 | 10/2014 | Hilberer |
| 8,864,382 B2 | 10/2014 | Ono et al. |
| 8,868,356 B2 | 10/2014 | Liu |
| 8,886,400 B2 | 11/2014 | Kossira et al. |
| 8,888,120 B2 | 11/2014 | Trevino |
| 8,888,121 B2 | 11/2014 | Trevino et al. |
| 8,890,670 B2 | 11/2014 | Brey et al. |
| 8,892,270 B2 | 11/2014 | Engstrand |
| 8,893,562 B2 | 11/2014 | Barraco et al. |
| 8,905,179 B2 | 12/2014 | Endo et al. |
| 8,905,424 B2 | 12/2014 | Williams, Jr. et al. |
| 8,917,170 B2 | 12/2014 | Padula |
| 8,930,114 B1 | 1/2015 | Reid |
| 8,939,462 B2 | 1/2015 | Adamczyk et al. |
| 8,954,240 B2 | 2/2015 | Scully |
| 8,955,865 B2 | 2/2015 | Fortin et al. |
| 8,965,635 B2 | 2/2015 | Alberius et al. |
| 8,966,998 B2 | 3/2015 | Gentner et al. |
| 8,976,246 B1 | 3/2015 | Rappuhn |
| 8,987,615 B2 | 3/2015 | Khatavkar et al. |
| 8,988,220 B2 | 3/2015 | Markyvech et al. |
| 8,997,587 B2 | 4/2015 | Usowicz et al. |
| 8,998,240 B2 | 4/2015 | Boittin et al. |
| 9,004,523 B2 | 4/2015 | Scharf |
| 9,016,142 B2 | 4/2015 | Takahashi et al. |
| 9,026,311 B1 | 5/2015 | Pieronek et al. |
| 9,027,949 B2 | 5/2015 | Reimer |
| 9,031,754 B2 | 5/2015 | Matoy et al. |
| 9,037,312 B2 | 5/2015 | Rhode et al. |
| 9,037,322 B2 | 5/2015 | Fortin et al. |
| 9,037,346 B2 | 5/2015 | Keys, II et al. |
| 9,043,094 B2 | 5/2015 | Wellhoefer et al. |
| 9,056,535 B2 | 6/2015 | Materna et al. |
| 9,061,629 B2 | 6/2015 | Miller et al. |
| 9,061,686 B2 | 6/2015 | Yu et al. |
| 9,078,391 B2 | 7/2015 | Pichlmaier |

(56) References Cited

U.S. PATENT DOCUMENTS

| | | |
|---|---|---|
| 9,080,931 B2 | 7/2015 | Carbo, Jr. et al. |
| 9,085,261 B2 | 7/2015 | Lu et al. |
| 9,102,272 B2 | 8/2015 | Trombley et al. |
| 9,108,598 B2 | 8/2015 | Headley |
| 9,108,691 B2 | 8/2015 | Fanourakis et al. |
| 9,109,964 B2 | 8/2015 | Bao et al. |
| 9,114,832 B2 | 8/2015 | Wang et al. |
| 9,120,358 B2 | 9/2015 | Motts et al. |
| 9,120,359 B2 | 9/2015 | Chiu et al. |
| 9,133,780 B2 | 9/2015 | Asami et al. |
| 9,134,149 B2 | 9/2015 | Endo et al. |
| 9,140,587 B2 | 9/2015 | Endo et al. |
| 9,150,061 B2 | 10/2015 | Riehle et al. |
| 9,150,062 B2 | 10/2015 | Hao |
| 9,150,201 B2 | 10/2015 | Smith et al. |
| 9,151,686 B2 | 10/2015 | Barraco |
| 9,156,384 B2 | 10/2015 | Takayasu et al. |
| 9,157,785 B2 | 10/2015 | Brenninger |
| 9,168,901 B2 | 10/2015 | Funder et al. |
| 9,174,614 B2 | 11/2015 | Mercure |
| 9,180,814 B2 | 11/2015 | Mitani et al. |
| 9,180,846 B2 | 11/2015 | Mercure |
| 9,186,942 B1 | 11/2015 | Waggoner et al. |
| 9,193,385 B2 | 11/2015 | Svardby et al. |
| 9,207,135 B2 | 12/2015 | Staufer et al. |
| 9,211,772 B2 | 12/2015 | Brown et al. |
| 9,217,683 B2 | 12/2015 | Branch |
| 9,227,474 B2 | 1/2016 | Liu |
| 9,227,607 B1 | 1/2016 | Ripley et al. |
| 9,228,882 B2 | 1/2016 | Ruby |
| 9,234,815 B2 | 1/2016 | Brathe et al. |
| 9,238,483 B2 | 1/2016 | Hafner et al. |
| 9,254,828 B2 | 2/2016 | Simpson |
| 9,255,858 B2 | 2/2016 | Vallon et al. |
| 9,255,909 B2 | 2/2016 | Kollgaard et al. |
| 9,258,869 B2 | 2/2016 | Tarr |
| 9,260,078 B2 | 2/2016 | Mederer et al. |
| 9,266,401 B2 | 2/2016 | Klank et al. |
| 9,268,061 B2 | 2/2016 | Salmi |
| 9,278,673 B2 | 3/2016 | Squire et al. |
| 9,282,690 B2 | 3/2016 | Tilkes et al. |
| 9,283,932 B2 | 3/2016 | Bleckmann et al. |
| 9,290,166 B2 | 3/2016 | Harrison et al. |
| 9,290,203 B2 | 3/2016 | Lavoie et al. |
| 9,302,557 B2 | 4/2016 | Alldredge et al. |
| 9,303,627 B2 | 4/2016 | Romo et al. |
| 9,315,173 B1 | 4/2016 | Gray et al. |
| 9,315,179 B2 | 4/2016 | Herges et al. |
| 9,321,440 B2 | 4/2016 | Perlick et al. |
| 9,321,483 B2 | 4/2016 | Headley |
| 9,327,566 B2 | 5/2016 | McAllister |
| 9,329,094 B2 | 5/2016 | Noguchi |
| 9,335,163 B2 | 5/2016 | Lavoie et al. |
| 9,338,937 B2 | 5/2016 | Sauder et al. |
| 9,340,150 B2 | 5/2016 | Kendrick et al. |
| 9,340,197 B1 | 5/2016 | Miersch-Wiemers et al. |
| 9,346,439 B2 | 5/2016 | Diehl et al. |
| 9,347,844 B2 | 5/2016 | Tilkes et al. |
| 9,347,845 B2 | 5/2016 | Gießibl |
| 9,352,623 B2 | 5/2016 | Lynam et al. |
| 9,352,629 B2 | 5/2016 | Chabanon et al. |
| 9,366,591 B2 | 6/2016 | Bodenweber et al. |
| 9,370,977 B2 | 6/2016 | Sallis, Sr. |
| 9,372,125 B2 | 6/2016 | Geldman |
| 9,374,562 B2 | 6/2016 | Trombley et al. |
| 9,383,270 B1 | 7/2016 | Galambos et al. |
| 9,389,328 B2 | 7/2016 | Schneider et al. |
| 9,393,593 B2 | 7/2016 | Niemi et al. |
| 9,393,846 B2 | 7/2016 | Kadnikov et al. |
| 9,395,233 B2 | 7/2016 | Dourra et al. |
| 9,400,238 B2 | 7/2016 | Bin |
| 9,403,412 B2 | 8/2016 | Kim et al. |
| 9,403,413 B2 | 8/2016 | Talty et al. |
| 9,415,753 B2 | 8/2016 | Pieronek et al. |
| 9,421,884 B2 | 8/2016 | Boyer et al. |
| 9,432,492 B2 | 8/2016 | Peterson et al. |
| 9,434,224 B2 | 9/2016 | Schulte |
| 9,434,414 B2 | 9/2016 | Lavoie |
| 9,442,030 B2 | 9/2016 | Fujiwara et al. |
| 9,446,747 B2 | 9/2016 | Fosdike |
| 9,456,468 B2 | 9/2016 | Fry |
| 9,457,632 B1 | 10/2016 | Windeler et al. |
| 9,459,135 B2 | 10/2016 | Kirita et al. |
| 9,459,161 B1 | 10/2016 | Galambos et al. |
| 9,464,886 B2 | 10/2016 | Salter et al. |
| 9,464,887 B2 | 10/2016 | Salter et al. |
| 9,464,930 B2 | 10/2016 | Santi |
| 9,464,953 B2 | 10/2016 | Wirthlin |
| 9,481,346 B2 | 11/2016 | Morselli et al. |
| 9,493,156 B2 | 11/2016 | Haeussler et al. |
| 9,499,018 B2 | 11/2016 | Gehrke et al. |
| 9,499,109 B2 | 11/2016 | Armacost et al. |
| 9,499,200 B2 | 11/2016 | Hochrein et al. |
| 9,505,281 B1 | 11/2016 | Borkholder |
| 9,506,786 B2 | 11/2016 | Strnad et al. |
| 9,510,498 B2 | 12/2016 | Tuttle et al. |
| 9,513,103 B2 | 12/2016 | Crossman |
| 9,516,275 B2 | 12/2016 | Okano et al. |
| 9,517,668 B2 | 12/2016 | Lavoie |
| 9,517,739 B2 | 12/2016 | Kollmer et al. |
| 9,518,881 B2 | 12/2016 | Hammerschmidt |
| 9,522,582 B2 | 12/2016 | Cullen et al. |
| 9,533,721 B2 | 1/2017 | Booher et al. |
| 9,545,828 B2 | 1/2017 | Grannemann et al. |
| 9,550,399 B2 | 1/2017 | Jones et al. |
| 9,550,479 B2 | 1/2017 | Kim |
| 9,550,481 B2 | 1/2017 | Tu et al. |
| 9,551,788 B2 | 1/2017 | Epler |
| 9,554,499 B2 | 1/2017 | Muller et al. |
| 9,555,813 B2 | 1/2017 | Strano |
| 9,561,784 B2 | 2/2017 | Casali et al. |
| 9,562,801 B2 | 2/2017 | Santi |
| 9,574,955 B2 | 2/2017 | Iwase et al. |
| 9,581,487 B2 | 2/2017 | Warzecha et al. |
| 9,593,992 B2 | 3/2017 | Wu |
| 9,604,613 B2 | 3/2017 | Cooper et al. |
| 9,610,975 B1 | 4/2017 | Hu et al. |
| 9,616,753 B2 | 4/2017 | Oi et al. |
| 9,616,943 B2 | 4/2017 | Burchett et al. |
| 9,623,849 B2 | 4/2017 | Spath et al. |
| 9,623,904 B2 | 4/2017 | Lavoie et al. |
| 9,630,459 B2 | 4/2017 | Choi |
| 9,631,969 B1 | 4/2017 | Whalen |
| 9,638,595 B2 | 5/2017 | Shigeta |
| 9,643,462 B2 | 5/2017 | McAllister |
| 9,645,023 B2 | 5/2017 | Li |
| 9,649,879 B2 | 5/2017 | Randall et al. |
| 9,649,899 B1 | 5/2017 | Berry et al. |
| 9,650,030 B2 | 5/2017 | Nagura |
| 9,651,433 B2 | 5/2017 | Matsuzawa et al. |
| 9,651,438 B2 | 5/2017 | Tokito |
| 9,653,865 B2 | 5/2017 | Ayabakan et al. |
| 9,656,637 B2 | 5/2017 | Kimener |
| 9,656,699 B1 | 5/2017 | Polgrean |
| 9,663,079 B2 | 5/2017 | Yamamoto |
| 9,671,298 B2 | 6/2017 | Sawada et al. |
| 9,676,377 B2 | 6/2017 | Hafner et al. |
| 9,677,592 B2 | 6/2017 | Bernhardt |
| 9,688,111 B1 | 6/2017 | Ghannam et al. |
| 9,694,749 B2 | 7/2017 | Lynam et al. |
| 9,694,790 B2 | 7/2017 | Kimener |
| 9,694,816 B2 | 7/2017 | Morissette |
| 9,696,227 B2 | 7/2017 | Lavergne |
| 9,696,229 B2 | 7/2017 | Schulz et al. |
| 9,696,723 B2 | 7/2017 | Zeng et al. |
| 9,702,797 B2 | 7/2017 | Yang |
| 9,708,165 B2 | 7/2017 | Oberg |
| 9,718,503 B2 | 8/2017 | Ursich et al. |
| 9,723,692 B2 | 8/2017 | Sibley, Jr. et al. |
| 9,723,815 B2 | 8/2017 | Epema |
| 9,726,535 B2 | 8/2017 | Reichow et al. |
| 9,731,568 B2 | 8/2017 | Wuergler et al. |
| 9,738,125 B1 | 8/2017 | Brickley et al. |
| 9,738,216 B2 | 8/2017 | Kendrick et al. |

(56) References Cited

U.S. PATENT DOCUMENTS

| | | |
|---|---|---|
| 9,738,333 B2 | 8/2017 | Alldredge et al. |
| 9,744,972 B2 | 8/2017 | Trombley et al. |
| 9,745,013 B2 | 8/2017 | Wood |
| 9,758,138 B2 | 9/2017 | Albright et al. |
| 9,758,140 B2 | 9/2017 | Eberling et al. |
| 9,760,748 B2 | 9/2017 | Iannotti et al. |
| 9,796,226 B2 | 10/2017 | Turner et al. |
| 9,796,227 B2 | 10/2017 | McAllister |
| 9,799,132 B2 | 10/2017 | Okano et al. |
| 9,802,587 B2 | 10/2017 | Morselli |
| 9,802,771 B2 | 10/2017 | Kimener et al. |
| 9,804,022 B2 | 10/2017 | Kyrtsos et al. |
| 9,805,459 B2 | 10/2017 | Nakamura et al. |
| 9,805,623 B1 | 10/2017 | Kwon et al. |
| 9,809,206 B2 | 11/2017 | Hummel et al. |
| 9,809,249 B2 | 11/2017 | Boehm et al. |
| 9,812,037 B2 | 11/2017 | Kwon et al. |
| 9,821,779 B2 | 11/2017 | Grandstaff et al. |
| 9,823,142 B2 | 11/2017 | Lehmann |
| 9,823,148 B2 | 11/2017 | Von Waitz et al. |
| 9,827,818 B2 | 11/2017 | Hu et al. |
| 9,827,819 B2 | 11/2017 | Luker |
| 9,828,046 B2 | 11/2017 | Hellholm |
| 9,834,049 B2 | 12/2017 | Strand |
| 9,834,140 B2 | 12/2017 | Windeler |
| 9,834,184 B2 | 12/2017 | Braunberger |
| 9,834,187 B2 | 12/2017 | Englert et al. |
| 9,835,479 B2 | 12/2017 | Endo et al. |
| 9,840,119 B1 | 12/2017 | Melaragni |
| 9,840,240 B2 | 12/2017 | Trombley et al. |
| 9,840,277 B1 | 12/2017 | Beech |
| 9,841,312 B2 | 12/2017 | Vail et al. |
| 9,844,988 B2 | 12/2017 | Van de Wetering |
| 9,851,265 B2 | 12/2017 | Buttle |
| 9,852,346 B2 | 12/2017 | Min |
| 9,854,209 B2 | 12/2017 | Aich et al. |
| 9,855,876 B2 | 1/2018 | Affleck |
| 9,856,698 B2 | 1/2018 | Pollock et al. |
| 9,857,251 B2 | 1/2018 | Seo et al. |
| 9,857,255 B2 | 1/2018 | Hagan |
| 9,862,242 B2 | 1/2018 | Lurie |
| 9,868,327 B1 | 1/2018 | Borkholder |
| 9,868,328 B2 | 1/2018 | Kortesalmi |
| 9,870,653 B1 | 1/2018 | Fritz et al. |
| 9,873,300 B1 | 1/2018 | Gramlow |
| 9,880,560 B2 | 1/2018 | Han et al. |
| 9,883,622 B2 | 2/2018 | Gschwendtner et al. |
| 9,884,528 B2 | 2/2018 | Hara |
| 9,884,529 B2 | 2/2018 | Davis, Jr. et al. |
| 9,884,639 B2 | 2/2018 | Collins |
| 9,885,749 B2 | 2/2018 | Penjovic et al. |
| 9,981,512 B2 | 5/2018 | Gentner |
| 2001/0003393 A1 | 6/2001 | Cooper |
| 2001/0007234 A1 | 7/2001 | Scheetz |
| 2001/0037164 A1 | 11/2001 | Hecker |
| 2001/0038239 A1 | 11/2001 | Ehrlich et al. |
| 2001/0040408 A1 | 11/2001 | Lesesky et al. |
| 2001/0051809 A1 | 12/2001 | Houser et al. |
| 2002/0004418 A1 | 1/2002 | Mesquita et al. |
| 2002/0030347 A1 | 3/2002 | Korneff |
| 2002/0030403 A1 | 3/2002 | Lesesky et al. |
| 2002/0032533 A1 | 3/2002 | Sangiacomo |
| 2002/0038193 A1 | 3/2002 | Grunberg et al. |
| 2002/0056579 A1 | 5/2002 | Cooper |
| 2002/0074139 A1 | 6/2002 | Ankenman |
| 2002/0092360 A1 | 7/2002 | McDearmon |
| 2002/0093245 A1 | 7/2002 | Claerhout |
| 2002/0107627 A1 | 8/2002 | Funke et al. |
| 2002/0125049 A1 | 9/2002 | Kajiyama |
| 2002/0149172 A1 | 10/2002 | Field et al. |
| 2002/0154004 A1 | 10/2002 | Meyer |
| 2002/0157841 A1 | 10/2002 | Bernhardt et al. |
| 2002/0189881 A1 | 12/2002 | Mathias et al. |
| 2002/0195870 A1 | 12/2002 | Brunson et al. |
| 2003/0010554 A1 | 1/2003 | Grong et al. |
| 2003/0037767 A1 | 2/2003 | Breitegger et al. |
| 2003/0037981 A1 | 2/2003 | Scholer et al. |
| 2003/0051477 A1 | 3/2003 | Franklin |
| 2003/0083828 A1 | 5/2003 | Stylios |
| 2003/0085562 A1 | 5/2003 | Sparling |
| 2003/0090083 A1 | 5/2003 | Williams |
| 2003/0117011 A1 | 6/2003 | Ackley |
| 2003/0127255 A1 | 7/2003 | Hammonds |
| 2003/0137126 A1 | 7/2003 | Reuter et al. |
| 2003/0178811 A1 | 9/2003 | Buckner |
| 2003/0184047 A1 | 10/2003 | Gallego et al. |
| 2003/0196495 A1 | 10/2003 | Saunders et al. |
| 2003/0209086 A1 | 11/2003 | Schurr et al. |
| 2003/0217606 A1 | 11/2003 | Moore et al. |
| 2003/0220766 A1 | 11/2003 | Saunders et al. |
| 2003/0226704 A1 | 12/2003 | Aoki et al. |
| 2004/0011579 A1 | 1/2004 | Heckmann et al. |
| 2004/0016304 A1 | 1/2004 | Kaijala et al. |
| 2004/0017285 A1 | 1/2004 | Zielinski et al. |
| 2004/0021291 A1 | 2/2004 | Haug et al. |
| 2004/0032323 A1 | 2/2004 | Nommensen |
| 2004/0035630 A1 | 2/2004 | Lich et al. |
| 2004/0035631 A1 | 2/2004 | Schlecht et al. |
| 2004/0042696 A1 | 3/2004 | Kajiyama |
| 2004/0045361 A1 | 3/2004 | Davis et al. |
| 2004/0045362 A1 | 3/2004 | Davis et al. |
| 2004/0069078 A1 | 4/2004 | Schwendemann |
| 2004/0079576 A1 | 4/2004 | Knight-Newbury et al. |
| 2004/0084876 A1 | 5/2004 | Losee |
| 2004/0104555 A1 | 6/2004 | Atley |
| 2004/0112246 A1 | 6/2004 | Gain et al. |
| 2004/0124026 A1 | 7/2004 | Walters et al. |
| 2004/0124605 A1 | 7/2004 | McClure et al. |
| 2004/0129479 A1 | 7/2004 | Ozaki |
| 2004/0139793 A1 | 7/2004 | Bac |
| 2004/0162658 A1 | 8/2004 | Newman |
| 2004/0169363 A1 | 9/2004 | Fukawatase et al. |
| 2004/0183372 A1 | 9/2004 | Heuer et al. |
| 2004/0195030 A1 | 10/2004 | Eberle et al. |
| 2004/0195031 A1 | 10/2004 | Nagasaka |
| 2004/0221663 A1 | 11/2004 | Umemura et al. |
| 2004/0251659 A1 | 12/2004 | Amerson |
| 2004/0252019 A1 | 12/2004 | Paull |
| 2004/0255680 A1 | 12/2004 | Ortega et al. |
| 2004/0256184 A1 | 12/2004 | Liljeberg et al. |
| 2004/0262883 A1 | 12/2004 | Kerins et al. |
| 2005/0000303 A1 | 1/2005 | Moore et al. |
| 2005/0006165 A1 | 1/2005 | Scherl et al. |
| 2005/0006946 A1 | 1/2005 | Traechtler et al. |
| 2005/0011694 A1 | 1/2005 | Rosenthal et al. |
| 2005/0012304 A1 | 1/2005 | Pfleging et al. |
| 2005/0017577 A1 | 1/2005 | Eckert et al. |
| 2005/0023050 A1 | 2/2005 | Chidlow et al. |
| 2005/0023064 A1 | 2/2005 | Lich et al. |
| 2005/0045403 A1 | 3/2005 | Inoue |
| 2005/0056477 A1 | 3/2005 | Saieg et al. |
| 2005/0061569 A1 | 3/2005 | Pascolo et al. |
| 2005/0087381 A1 | 4/2005 | Tobata |
| 2005/0087955 A1 | 4/2005 | Kellogg |
| 2005/0098371 A1 | 5/2005 | Zabtcioglu |
| 2005/0109548 A1 | 5/2005 | Cooper |
| 2005/0127628 A1 | 6/2005 | Ramsey |
| 2005/0128059 A1 | 6/2005 | Vause |
| 2005/0212256 A1 | 9/2005 | Cole |
| 2005/0248123 A1 | 11/2005 | Symington |
| 2005/0248125 A1 | 11/2005 | Flynn et al. |
| 2005/0269115 A1 | 12/2005 | Harnetiaux et al. |
| 2006/0032679 A1 | 2/2006 | Wilson et al. |
| 2006/0033308 A1 | 2/2006 | Waldbauer et al. |
| 2006/0042406 A1 | 3/2006 | Ono |
| 2006/0043767 A1 | 3/2006 | Lunson |
| 2006/0044121 A1 | 3/2006 | Jarnagin |
| 2006/0071549 A1 | 4/2006 | Chesnut et al. |
| 2006/0108771 A1 | 5/2006 | Elkins et al. |
| 2006/0125313 A1 | 6/2006 | Gunne et al. |
| 2006/0204347 A1 | 9/2006 | Waldbauer et al. |
| 2006/0207822 A1 | 9/2006 | Taylor |
| 2006/0210382 A1 | 9/2006 | Mountz et al. |
| 2006/0219417 A1 | 10/2006 | Thompson et al. |

(56) References Cited

U.S. PATENT DOCUMENTS

| | | |
|---|---|---|
| 2006/0220345 A1 | 10/2006 | Schmidt |
| 2006/0234842 A1 | 10/2006 | Minami et al. |
| 2006/0261572 A1 | 11/2006 | Biondi et al. |
| 2006/0273549 A1 | 12/2006 | Dietz |
| 2006/0289580 A1 | 12/2006 | Faver et al. |
| 2006/0290102 A1 | 12/2006 | VanBuskirk |
| 2007/0017715 A1 | 1/2007 | McCann |
| 2007/0034027 A1 | 2/2007 | Wolfer et al. |
| 2007/0040353 A1 | 2/2007 | Dallaire et al. |
| 2007/0040354 A1 | 2/2007 | Wacker et al. |
| 2007/0040355 A1 | 2/2007 | Spratte et al. |
| 2007/0058273 A1 | 3/2007 | Ito et al. |
| 2007/0065060 A1 | 3/2007 | Koike et al. |
| 2007/0068691 A1 | 3/2007 | Smart et al. |
| 2007/0114756 A1 | 5/2007 | Shagbazyan |
| 2007/0114759 A1 | 5/2007 | Biondi et al. |
| 2007/0131461 A1 | 6/2007 | Treadwell et al. |
| 2007/0132560 A1 | 6/2007 | Nystrom et al. |
| 2007/0140812 A1 | 6/2007 | Ohtake et al. |
| 2007/0152424 A1 | 7/2007 | Deng et al. |
| 2007/0164574 A1 | 7/2007 | Tanabe |
| 2007/0176394 A1 | 8/2007 | Gehring et al. |
| 2007/0181318 A1 | 8/2007 | Laudick et al. |
| 2007/0181350 A1 | 8/2007 | Kranz et al. |
| 2007/0194557 A1 | 8/2007 | Caporali et al. |
| 2007/0205580 A1 | 9/2007 | Hamilton et al. |
| 2007/0210538 A1 | 9/2007 | Steprath et al. |
| 2007/0216136 A1 | 9/2007 | Dietz |
| 2007/0216220 A1 | 9/2007 | Beijersbergen Van Henegouwen et al. |
| 2007/0222283 A1 | 9/2007 | Skinner et al. |
| 2007/0228814 A1 | 10/2007 | Miller |
| 2007/0245831 A1 | 10/2007 | Betancor Bethencourt |
| 2008/0029997 A1 | 2/2008 | Wickelmaier et al. |
| 2008/0058980 A1 | 3/2008 | Nakano |
| 2008/0073129 A1 | 3/2008 | Heuer |
| 2008/0073872 A1 | 3/2008 | Scott |
| 2008/0079237 A1 | 4/2008 | Rubin |
| 2008/0121401 A1 | 5/2008 | Posselius et al. |
| 2008/0143080 A1 | 6/2008 | Burr |
| 2008/0143179 A1 | 6/2008 | Rutherford |
| 2008/0157948 A1 | 7/2008 | Swannie |
| 2008/0159674 A1 | 7/2008 | Varonis |
| 2008/0164679 A1 | 7/2008 | MacDougall |
| 2008/0177435 A1 | 7/2008 | Caporali et al. |
| 2008/0191449 A1 | 8/2008 | Standen |
| 2008/0195250 A1 | 8/2008 | Post et al. |
| 2008/0217093 A1 | 9/2008 | Foxwell |
| 2008/0217883 A1 | 9/2008 | Gustafsson et al. |
| 2008/0238638 A1 | 10/2008 | Phillips |
| 2008/0257656 A1 | 10/2008 | Skinner et al. |
| 2008/0303647 A1 | 12/2008 | Pare |
| 2008/0309156 A1 | 12/2008 | Kissel |
| 2009/0001976 A1 | 1/2009 | Cech et al. |
| 2009/0008486 A1 | 1/2009 | Torres et al. |
| 2009/0028677 A1 | 1/2009 | Williams et al. |
| 2009/0069951 A1 | 3/2009 | Liljeblad et al. |
| 2009/0093928 A1 | 4/2009 | Getman et al. |
| 2009/0107734 A1 | 4/2009 | Lucas et al. |
| 2009/0115161 A1 | 5/2009 | Sato |
| 2009/0119030 A1 | 5/2009 | Fang et al. |
| 2009/0120211 A1 | 5/2009 | Roovers |
| 2009/0152831 A1 | 6/2009 | Verhagen |
| 2009/0189369 A1 | 7/2009 | Thomas |
| 2009/0205908 A1 | 8/2009 | Hammonds |
| 2009/0212770 A1 | 8/2009 | Koyama |
| 2009/0236578 A1 | 9/2009 | Nirenberg et al. |
| 2009/0309332 A1 | 12/2009 | Birkholz et al. |
| 2010/0030115 A1 | 2/2010 | Fujimoto et al. |
| 2010/0038213 A1 | 2/2010 | DeMong et al. |
| 2010/0038883 A1 | 2/2010 | Thedford et al. |
| 2010/0039515 A1 | 2/2010 | Dietz |
| 2010/0044998 A1 | 2/2010 | Franchineau |
| 2010/0063702 A1 | 3/2010 | Sabelstrom et al. |
| 2010/0066161 A1 | 3/2010 | Fry et al. |
| 2010/0071453 A1 | 3/2010 | Isono |
| 2010/0071968 A1 | 3/2010 | Gavarini et al. |
| 2010/0082179 A1 | 4/2010 | Kronenberg |
| 2010/0109286 A1 | 5/2010 | Visser |
| 2010/0161190 A1 | 6/2010 | McCann et al. |
| 2010/0180457 A1 | 7/2010 | Katoh et al. |
| 2010/0187489 A1 | 7/2010 | Hebert |
| 2010/0187794 A1 | 7/2010 | MacDougall |
| 2010/0206091 A1 | 8/2010 | Ariav et al. |
| 2010/0211279 A1 | 8/2010 | Lingman et al. |
| 2010/0230224 A1 | 9/2010 | Hindman |
| 2010/0262341 A1 | 10/2010 | Alguera |
| 2010/0262368 A1 | 10/2010 | Kaminski |
| 2010/0282522 A1 | 11/2010 | Endo et al. |
| 2010/0308291 A1 | 12/2010 | Krones |
| 2010/0308559 A1 | 12/2010 | Tarasinski et al. |
| 2010/0308809 A1 | 12/2010 | Houldley et al. |
| 2010/0324770 A1 | 12/2010 | Ramsey et al. |
| 2011/0018231 A1 | 1/2011 | Collenberg |
| 2011/0025482 A1 | 2/2011 | Alguera et al. |
| 2011/0049836 A1 | 3/2011 | Weber et al. |
| 2011/0050903 A1 | 3/2011 | Vorobiev |
| 2011/0071736 A1 | 3/2011 | Brown et al. |
| 2011/0073381 A1 | 3/2011 | Endo et al. |
| 2011/0087413 A1 | 4/2011 | McCrickard et al. |
| 2011/0094803 A1 | 4/2011 | Takayasu et al. |
| 2011/0101646 A1 | 5/2011 | Sakita |
| 2011/0155888 A1 | 6/2011 | Jordahl |
| 2011/0167929 A1 | 7/2011 | Ling et al. |
| 2011/0174553 A1 | 7/2011 | Chaudron et al. |
| 2011/0187143 A1 | 8/2011 | Foster |
| 2011/0189640 A1 | 8/2011 | Hurd |
| 2011/0202232 A1 | 8/2011 | Busch et al. |
| 2011/0209624 A1 | 9/2011 | Endo et al. |
| 2011/0210529 A1 | 9/2011 | Markstaller |
| 2011/0221164 A1 | 9/2011 | Williams, Jr. et al. |
| 2011/0234388 A1 | 9/2011 | Lesesky et al. |
| 2011/0250038 A1 | 10/2011 | Affleck |
| 2011/0259651 A1 | 10/2011 | Cleary |
| 2011/0290576 A1 | 12/2011 | Koestler et al. |
| 2011/0303469 A1 | 12/2011 | Saito et al. |
| 2011/0303787 A1 | 12/2011 | Bennett |
| 2012/0000715 A1 | 1/2012 | Saigh |
| 2012/0007615 A1 | 1/2012 | Todd |
| 2012/0024081 A1 | 2/2012 | Baker |
| 2012/0027504 A1 | 2/2012 | Moisy et al. |
| 2012/0043735 A1 | 2/2012 | Grauer et al. |
| 2012/0059797 A1 | 3/2012 | Prahlad et al. |
| 2012/0187659 A1 | 7/2012 | Nordberg |
| 2012/0209425 A1 | 8/2012 | Beaujot et al. |
| 2012/0245711 A1 | 9/2012 | Park |
| 2012/0255646 A1 | 10/2012 | Hasenay |
| 2012/0283909 A1 | 11/2012 | Dix |
| 2012/0283925 A1 | 11/2012 | Barlsen et al. |
| 2012/0298387 A1 | 11/2012 | Sauermann |
| 2013/0001924 A1 | 1/2013 | Adamczyk |
| 2013/0056959 A1 | 3/2013 | Mathes et al. |
| 2013/0076007 A1 | 3/2013 | Goode et al. |
| 2013/0079979 A1 | 3/2013 | Sheidler et al. |
| 2013/0079980 A1 | 3/2013 | Vuk et al. |
| 2013/0080078 A1 | 3/2013 | Wirthlin |
| 2013/0081830 A1 | 4/2013 | Tuttle et al. |
| 2013/0154235 A1 | 6/2013 | Boittin et al. |
| 2013/0158826 A1 | 6/2013 | Cusi |
| 2013/0173116 A1 | 7/2013 | Gustafson et al. |
| 2013/0192854 A1 | 8/2013 | Kosmicki et al. |
| 2013/0192904 A1 | 8/2013 | Sprecher |
| 2013/0226390 A1 | 8/2013 | Luo et al. |
| 2013/0234411 A1 | 9/2013 | Hapyuk et al. |
| 2013/0238205 A1 | 9/2013 | Edwards et al. |
| 2013/0253814 A1 | 9/2013 | Wirthlin |
| 2013/0297154 A1 | 11/2013 | Burchett et al. |
| 2014/0047928 A1 | 2/2014 | Bao et al. |
| 2014/0054874 A1 | 2/2014 | Masanek, Jr. et al. |
| 2014/0062178 A1 | 3/2014 | Panse et al. |
| 2014/0081544 A1 | 3/2014 | Fry |
| 2014/0097595 A1 | 4/2014 | Williams, Jr. et al. |
| 2014/0110918 A1 | 4/2014 | McCoy |
| 2014/0151979 A1 | 6/2014 | Puckett et al. |

(56) References Cited

U.S. PATENT DOCUMENTS

| | | |
|---|---|---|
| 2014/0159340 A1 | 6/2014 | Kimener et al. |
| 2014/0174239 A1 | 6/2014 | Nagata et al. |
| 2014/0183841 A1 | 7/2014 | Jones |
| 2014/0190275 A1 | 7/2014 | McILravey |
| 2014/0202776 A1 | 7/2014 | Kane et al. |
| 2014/0216169 A1 | 8/2014 | Romo et al. |
| 2014/0224553 A1 | 8/2014 | Ozawa |
| 2014/0224588 A1 | 8/2014 | Van Seumeren |
| 2014/0237868 A1 | 8/2014 | Whitchurch et al. |
| 2014/0262918 A1 | 9/2014 | Chu |
| 2014/0288769 A1 | 9/2014 | Trombley et al. |
| 2014/0288795 A1 | 9/2014 | Albright et al. |
| 2014/0298916 A1 | 10/2014 | Duan et al. |
| 2014/0309840 A1 | 10/2014 | Woolf et al. |
| 2014/0360282 A1 | 12/2014 | Giessibl |
| 2015/0009010 A1 | 1/2015 | Biemer |
| 2015/0012199 A1 | 1/2015 | Mederer et al. |
| 2015/0030423 A1 | 1/2015 | Reid |
| 2015/0043711 A1 | 2/2015 | Den Heeten et al. |
| 2015/0069736 A1 | 3/2015 | Trevino et al. |
| 2015/0069737 A1 | 3/2015 | McAllister |
| 2015/0105963 A1 | 4/2015 | Blackwell et al. |
| 2015/0105975 A1 | 4/2015 | Dunn |
| 2015/0135890 A1 | 5/2015 | Pertile |
| 2015/0137482 A1 | 5/2015 | Woolf et al. |
| 2015/0203156 A1 | 7/2015 | Hafner et al. |
| 2015/0210257 A1 | 7/2015 | Matoy et al. |
| 2015/0231938 A1 | 8/2015 | Gentner |
| 2015/0253151 A1 | 9/2015 | Inberg et al. |
| 2015/0275991 A1 | 10/2015 | De Leon |
| 2015/0306928 A1 | 10/2015 | McCollum |
| 2015/0314818 A1 | 11/2015 | Gaston |
| 2015/0321697 A1 | 11/2015 | Lu et al. |
| 2015/0343865 A1 | 12/2015 | Hile et al. |
| 2015/0344277 A1 | 12/2015 | Simons |
| 2015/0353063 A1 | 12/2015 | Tuhro et al. |
| 2015/0374558 A1 | 12/2015 | Strong et al. |
| 2016/0023525 A1 | 1/2016 | Lavoie |
| 2016/0023642 A1 | 1/2016 | Smith et al. |
| 2016/0029543 A1 | 2/2016 | Stich et al. |
| 2016/0031357 A1 | 2/2016 | Collins |
| 2016/0039480 A1 | 2/2016 | Pichlmaier |
| 2016/0052548 A1 | 2/2016 | Singh et al. |
| 2016/0059888 A1 | 3/2016 | Bradley et al. |
| 2016/0075281 A1 | 3/2016 | Singh et al. |
| 2016/0114844 A1 | 4/2016 | Harris |
| 2016/0121790 A1 | 5/2016 | Mains, Jr. |
| 2016/0137204 A1 | 5/2016 | Morselli |
| 2016/0144906 A1 | 5/2016 | Han et al. |
| 2016/0159176 A1 | 6/2016 | McCormick et al. |
| 2016/0167630 A1 | 6/2016 | Wolf |
| 2016/0185170 A1 | 6/2016 | McAllister |
| 2016/0187185 A1 | 6/2016 | Smith |
| 2016/0229394 A1 | 8/2016 | Fujii et al. |
| 2016/0229453 A1 | 8/2016 | Yang et al. |
| 2016/0231165 A1 | 8/2016 | Fredrickson |
| 2016/0236526 A1 | 8/2016 | Shepard |
| 2016/0236659 A1 | 8/2016 | Diehl et al. |
| 2016/0243908 A1 | 8/2016 | Lannen et al. |
| 2016/0251005 A1 | 9/2016 | Morselli et al. |
| 2016/0255760 A1 | 9/2016 | Sauder et al. |
| 2016/0257176 A1 | 9/2016 | Tabellini et al. |
| 2016/0264046 A1 | 9/2016 | Bochenek et al. |
| 2016/0280023 A1 | 9/2016 | Olesen et al. |
| 2016/0284217 A1 | 9/2016 | Lee et al. |
| 2016/0297361 A1 | 10/2016 | Drazan et al. |
| 2016/0297432 A1 | 10/2016 | Fletcher et al. |
| 2016/0303933 A1 | 10/2016 | Nowakowski |
| 2016/0304054 A1 | 10/2016 | Mansuri et al. |
| 2016/0309807 A1 | 10/2016 | Stanzione |
| 2016/0311280 A1 | 10/2016 | Gerbrandt et al. |
| 2016/0318493 A1 | 11/2016 | Drako |
| 2016/0332606 A1 | 11/2016 | Buchner et al. |
| 2016/0340122 A1 | 11/2016 | Lindblom |
| 2016/0375736 A1 | 12/2016 | Wilson |
| 2016/0375831 A1 | 12/2016 | Wang et al. |
| 2017/0008357 A1 | 1/2017 | Sallis, Sr. |
| 2017/0008559 A1 | 1/2017 | Shepard |
| 2017/0015163 A1 | 1/2017 | Sielhorst |
| 2017/0016757 A1 | 1/2017 | Strong et al. |
| 2017/0043806 A1 | 2/2017 | Muharemovic et al. |
| 2017/0043807 A1 | 2/2017 | Shepard |
| 2017/0049012 A1 | 2/2017 | Hoshikawa et al. |
| 2017/0072753 A1 | 3/2017 | Kadnikov et al. |
| 2017/0074634 A1 | 3/2017 | Yoon et al. |
| 2017/0074700 A1 | 3/2017 | Strnad et al. |
| 2017/0082509 A1 | 3/2017 | Bushnell et al. |
| 2017/0086346 A1 | 3/2017 | Payne et al. |
| 2017/0088104 A1 | 3/2017 | Risse et al. |
| 2017/0089777 A1 | 3/2017 | Obata et al. |
| 2017/0089778 A1 | 3/2017 | Toyoshima et al. |
| 2017/0100974 A1 | 4/2017 | Smith |
| 2017/0101141 A1 | 4/2017 | Booher et al. |
| 2017/0106869 A1 | 4/2017 | Lavoie et al. |
| 2017/0113745 A1 | 4/2017 | Cook et al. |
| 2017/0130768 A1 | 5/2017 | Matsuda et al. |
| 2017/0137002 A1 | 5/2017 | Taneyhill et al. |
| 2017/0144497 A1 | 5/2017 | Guntersweiler et al. |
| 2017/0144714 A1 | 5/2017 | Dupay et al. |
| 2017/0151845 A1 | 6/2017 | Allcorn et al. |
| 2017/0151935 A1 | 6/2017 | Prohaszka et al. |
| 2017/0158233 A1 | 6/2017 | Herzog et al. |
| 2017/0174179 A1 | 6/2017 | Schumacher et al. |
| 2017/0174275 A1 | 6/2017 | Mohamad Jembari et al. |
| 2017/0184460 A1 | 6/2017 | Matsuzawa et al. |
| 2017/0188505 A1 | 7/2017 | Potier et al. |
| 2017/0197598 A1 | 7/2017 | Lesher et al. |
| 2017/0211969 A1 | 7/2017 | Waite et al. |
| 2017/0211998 A1 | 7/2017 | Smith et al. |
| 2017/0217411 A1 | 8/2017 | Albright et al. |
| 2017/0218999 A1 | 8/2017 | Brown |
| 2017/0219447 A1 | 8/2017 | Ovaere et al. |
| 2017/0225692 A1 | 8/2017 | Ghannam et al. |
| 2017/0228145 A1 | 8/2017 | Schneider et al. |
| 2017/0231146 A1 | 8/2017 | Romig et al. |
| 2017/0232893 A1 | 8/2017 | Ebner et al. |
| 2017/0240152 A1 | 8/2017 | Strange et al. |
| 2017/0240153 A1 | 8/2017 | Ripley et al. |
| 2017/0241828 A1 | 8/2017 | Reichow et al. |
| 2017/0245417 A1 | 8/2017 | Frascella |
| 2017/0246521 A1 | 8/2017 | deGreef et al. |
| 2017/0253442 A1 | 9/2017 | Kimener et al. |
| 2017/0254694 A1 | 9/2017 | Toigo |
| 2017/0259791 A1 | 9/2017 | Kimener |
| 2017/0262717 A1 | 9/2017 | Drazan et al. |
| 2017/0276163 A1 | 9/2017 | Bernhardt |
| 2017/0282658 A1 | 10/2017 | Shepard |
| 2017/0297391 A1 | 10/2017 | Pilliod |
| 2017/0297490 A1 | 10/2017 | Lynam et al. |
| 2017/0305214 A1 | 10/2017 | Gray |
| 2017/0305215 A1 | 10/2017 | Scheips et al. |
| 2017/0305436 A1 | 10/2017 | Maskell et al. |
| 2017/0313141 A1 | 11/2017 | Casasanta |
| 2017/0314986 A1 | 11/2017 | Dyal |
| 2017/0326929 A1 | 11/2017 | Chmelar et al. |
| 2017/0334255 A1 | 11/2017 | McAllister |
| 2017/0334256 A1 | 11/2017 | Scheips et al. |
| 2017/0341917 A1 | 11/2017 | Adams |
| 2017/0349231 A1 | 12/2017 | Wood |
| 2017/0356818 A1 | 12/2017 | Gouko et al. |
| 2017/0359941 A1 | 12/2017 | Czapka et al. |
| 2017/0360279 A1 | 12/2017 | Gafford et al. |
| 2017/0363490 A1 | 12/2017 | Matsuzawa et al. |
| 2017/0368701 A1 | 12/2017 | Gester et al. |
| 2017/0368747 A1 | 12/2017 | Nolet et al. |
| 2017/0368897 A1 | 12/2017 | Brickley et al. |
| 2017/0370764 A1 | 12/2017 | Xu et al. |
| 2017/0370788 A1 | 12/2017 | Neuschaefer-Rube et al. |
| 2018/0000114 A1 | 1/2018 | Grampassi et al. |
| 2018/0001720 A1 | 1/2018 | McAllister |
| 2018/0001721 A1 | 1/2018 | Huger et al. |
| 2018/0001928 A1 | 1/2018 | Lavoie et al. |
| 2018/0003546 A1 | 1/2018 | Mignon et al. |
| 2018/0029155 A1 | 2/2018 | Garza |

(56) References Cited

U.S. PATENT DOCUMENTS

| | | |
|---|---|---|
| 2018/0029429 A1 | 2/2018 | Janardhana et al. |
| 2018/0037209 A1 | 2/2018 | Hecker et al. |
| 2018/0039266 A1 | 2/2018 | Dotzler et al. |
| 2018/0039278 A1 | 2/2018 | Huger et al. |
| 2019/0143769 A1 | 5/2019 | Niedert et al. |
| 2019/0225196 A1 | 7/2019 | Niedert et al. |
| 2019/0265112 A1 | 8/2019 | Reed |
| 2019/0315169 A1 | 10/2019 | Rogness et al. |
| 2019/0381844 A1 | 12/2019 | Niedert et al. |
| 2019/0391590 A1 | 12/2019 | Niewiadomski et al. |
| 2020/0102009 A1 | 4/2020 | Owen et al. |
| 2020/0198422 A1 | 6/2020 | Niedert et al. |

FOREIGN PATENT DOCUMENTS

| | | |
|---|---|---|
| EP | 0341459 A2 | 11/1989 |
| EP | 192871 B1 | 2/1990 |
| EP | 523880 B1 | 11/1994 |
| EP | 610702 B1 | 5/1995 |
| EP | 675820 B1 | 10/1995 |
| EP | 694422 B1 | 1/1996 |
| EP | 699899 B1 | 3/1996 |
| EP | 700822 B1 | 3/1996 |
| EP | 737608 B1 | 10/1996 |
| EP | 697314 B1 | 3/1997 |
| EP | 773075 B1 | 10/1997 |
| EP | 798615 A1 | 10/1997 |
| EP | 823368 A1 | 2/1998 |
| EP | 625696 B1 | 3/1998 |
| EP | 695655 B1 | 4/1998 |
| EP | 667252 B1 | 5/1998 |
| EP | 760717 B1 | 5/1998 |
| EP | 730140 A3 | 8/1998 |
| EP | 765251 B1 | 9/1998 |
| EP | 816809 A3 | 10/1998 |
| EP | 602054 B1 | 12/1998 |
| EP | 595213 B1 | 1/1999 |
| EP | 740139 B1 | 1/1999 |
| EP | 625697 B1 | 3/1999 |
| EP | 919165 A1 | 6/1999 |
| EP | 693250 B1 | 9/1999 |
| EP | 824386 B1 | 9/1999 |
| EP | 728600 B1 | 10/1999 |
| EP | 925456 B1 | 12/1999 |
| EP | 650139 B1 | 1/2000 |
| EP | 832000 B1 | 2/2000 |
| EP | 679326 B1 | 3/2000 |
| EP | 861179 B1 | 3/2000 |
| EP | 983932 B1 | 3/2000 |
| EP | 985342 B1 | 3/2000 |
| EP | 712769 B1 | 4/2000 |
| EP | 739226 B1 | 4/2000 |
| EP | 644417 B1 | 5/2000 |
| EP | 688687 B1 | 5/2000 |
| EP | 985563 B1 | 5/2000 |
| EP | 1002671 B1 | 6/2000 |
| EP | 1012595 A1 | 6/2000 |
| EP | 1002672 B1 | 8/2000 |
| EP | 713638 B1 | 10/2000 |
| EP | 960039 B1 | 10/2000 |
| EP | 1049616 A1 | 11/2000 |
| EP | 713637 B1 | 12/2000 |
| EP | 941905 B1 | 12/2000 |
| EP | 799730 B1 | 1/2001 |
| EP | 799732 B1 | 1/2001 |
| EP | 1084870 B1 | 3/2001 |
| EP | 1084871 A2 | 3/2001 |
| EP | 1086360 A1 | 3/2001 |
| EP | 1103172 B1 | 5/2001 |
| EP | 799731 B1 | 6/2001 |
| EP | 884570 B1 | 6/2001 |
| EP | 1106486 B1 | 6/2001 |
| EP | 823343 B1 | 7/2001 |
| EP | 1120334 B1 | 8/2001 |
| EP | 921056 A3 | 9/2001 |
| EP | 828622 B1 | 10/2001 |
| EP | 1147973 A1 | 10/2001 |
| EP | 1150109 B1 | 10/2001 |
| EP | 881139 B1 | 11/2001 |
| EP | 918655 B1 | 11/2001 |
| EP | 950549 B1 | 11/2001 |
| EP | 1151261 A1 | 11/2001 |
| EP | 928250 B1 | 12/2001 |
| EP | 953490 A3 | 12/2001 |
| EP | 1160105 A2 | 12/2001 |
| EP | 1162090 B1 | 12/2001 |
| EP | 843956 B1 | 1/2002 |
| EP | 1016572 A3 | 1/2002 |
| EP | 1084872 B1 | 1/2002 |
| EP | 1165330 A1 | 1/2002 |
| EP | 1170155 A2 | 1/2002 |
| EP | 1086835 B1 | 2/2002 |
| EP | 1177889 B1 | 2/2002 |
| EP | 900682 B1 | 4/2002 |
| EP | 1160104 B1 | 4/2002 |
| EP | 1192068 A1 | 4/2002 |
| EP | 1195273 B1 | 4/2002 |
| EP | 1195274 B1 | 4/2002 |
| EP | 1142732 B1 | 5/2002 |
| EP | 1182062 B1 | 5/2002 |
| EP | 1138985 B1 | 6/2002 |
| EP | 1216856 B1 | 6/2002 |
| EP | 794110 B1 | 7/2002 |
| EP | 1153770 A3 | 7/2002 |
| EP | 1155881 B1 | 7/2002 |
| EP | 1199547 A3 | 7/2002 |
| EP | 1117584 B1 | 8/2002 |
| EP | 1189772 | 8/2002 |
| EP | 1225067 A3 | 8/2002 |
| EP | 1225068 A3 | 8/2002 |
| EP | 1233895 A1 | 8/2002 |
| EP | 876929 B1 | 9/2002 |
| EP | 1040020 B1 | 9/2002 |
| EP | 1007925 B1 | 10/2002 |
| EP | 1251025 B1 | 10/2002 |
| EP | 1253027 A1 | 10/2002 |
| EP | 1038744 B1 | 12/2002 |
| EP | 1225069 B1 | 12/2002 |
| EP | 1279527 B2 | 1/2003 |
| EP | 1279528 B1 | 1/2003 |
| EP | 914264 B1 | 3/2003 |
| EP | 1312492 A2 | 5/2003 |
| EP | 848805 B1 | 7/2003 |
| EP | 1245439 B1 | 7/2003 |
| EP | 968852 B1 | 8/2003 |
| EP | 991559 B1 | 9/2003 |
| EP | 1295783 B1 | 9/2003 |
| EP | 849207 B1 | 10/2003 |
| EP | 1022164 B1 | 10/2003 |
| EP | 1163529 B1 | 10/2003 |
| EP | 1308358 B1 | 10/2003 |
| EP | 1359085 B1 | 11/2003 |
| EP | 1359321 A1 | 11/2003 |
| EP | 1249365 B1 | 1/2004 |
| EP | 1099575 B1 | 2/2004 |
| EP | 1389541 A1 | 2/2004 |
| EP | 1326772 B1 | 3/2004 |
| EP | 1405738 A1 | 4/2004 |
| EP | 1011994 B1 | 5/2004 |
| EP | 1418843 A1 | 5/2004 |
| EP | 1422366 B1 | 5/2004 |
| EP | 1447246 B1 | 8/2004 |
| EP | 1448431 A2 | 8/2004 |
| EP | 1448952 B1 | 8/2004 |
| EP | 1449115 A2 | 8/2004 |
| EP | 1450658 A1 | 9/2004 |
| EP | 1451058 B1 | 9/2004 |
| EP | 1456043 A1 | 9/2004 |
| EP | 1116431 B1 | 10/2004 |
| EP | 1289781 B1 | 10/2004 |
| EP | 1466813 A2 | 10/2004 |
| EP | 1468899 B1 | 10/2004 |
| EP | 1471339 A2 | 10/2004 |
| EP | 1350683 B1 | 11/2004 |

(56) References Cited

FOREIGN PATENT DOCUMENTS

| | | | |
|---|---|---|---|
| EP | 1476736 | A1 | 11/2004 |
| EP | 1116013 | B1 | 12/2004 |
| EP | 1129606 | B1 | 12/2004 |
| EP | 1455207 | B1 | 12/2004 |
| EP | 1485285 | A2 | 12/2004 |
| EP | 1486375 | B1 | 12/2004 |
| EP | 1499517 | B1 | 1/2005 |
| EP | 1254036 | B1 | 2/2005 |
| EP | 1400423 | B1 | 3/2005 |
| EP | 1459963 | B1 | 3/2005 |
| EP | 1171717 | B1 | 4/2005 |
| EP | 1288026 | B1 | 4/2005 |
| EP | 1486400 | A3 | 4/2005 |
| EP | 1093419 | B1 | 7/2005 |
| EP | 1347676 | B1 | 7/2005 |
| EP | 1197357 | B1 | 8/2005 |
| EP | 1375279 | B1 | 8/2005 |
| EP | 1407153 | B1 | 8/2005 |
| EP | 1562809 | A1 | 8/2005 |
| EP | 1334847 | B1 | 9/2005 |
| EP | 1571015 | B1 | 9/2005 |
| EP | 1580043 | A1 | 9/2005 |
| EP | 1538044 | A3 | 11/2005 |
| EP | 1595774 | B1 | 11/2005 |
| EP | 1301362 | B1 | 12/2005 |
| EP | 1380444 | B1 | 12/2005 |
| EP | 1499510 | B1 | 12/2005 |
| EP | 1604179 | B1 | 12/2005 |
| EP | 961722 | B1 | 1/2006 |
| EP | 1227945 | B1 | 1/2006 |
| EP | 1400379 | B1 | 2/2006 |
| EP | 1403102 | B1 | 2/2006 |
| EP | 1462280 | B1 | 2/2006 |
| EP | 1627803 | A1 | 2/2006 |
| EP | 1320734 | B1 | 3/2006 |
| EP | 1396417 | B1 | 3/2006 |
| EP | 1633599 | A1 | 3/2006 |
| EP | 1351340 | B1 | 4/2006 |
| EP | 1386761 | B1 | 4/2006 |
| EP | 1535765 | B1 | 4/2006 |
| EP | 1650060 | B1 | 4/2006 |
| EP | 1650095 | A1 | 4/2006 |
| EP | 932032 | B1 | 5/2006 |
| EP | 1541454 | B1 | 5/2006 |
| EP | 1029440 | B1 | 6/2006 |
| EP | 1238577 | B1 | 6/2006 |
| EP | 1312491 | B1 | 6/2006 |
| EP | 1475348 | B1 | 6/2006 |
| EP | 1664708 | A1 | 6/2006 |
| EP | 1666280 | A1 | 6/2006 |
| EP | 1671851 | A1 | 6/2006 |
| EP | 1673274 | A1 | 6/2006 |
| EP | 1186510 | B1 | 7/2006 |
| EP | 1318066 | B1 | 7/2006 |
| EP | 1679205 | B1 | 7/2006 |
| EP | 1683696 | A2 | 7/2006 |
| EP | 1541385 | B1 | 8/2006 |
| EP | 1687158 | A2 | 8/2006 |
| EP | 1688727 | A1 | 8/2006 |
| EP | 1688728 | A1 | 8/2006 |
| EP | 1691996 | A1 | 8/2006 |
| EP | 1111353 | B1 | 9/2006 |
| EP | 1200276 | B1 | 9/2006 |
| EP | 1697207 | A1 | 9/2006 |
| EP | 1107894 | B1 | 10/2006 |
| EP | 1709419 | A2 | 10/2006 |
| EP | 1710129 | B1 | 10/2006 |
| EP | 1713609 | A1 | 10/2006 |
| EP | 1597098 | B1 | 11/2006 |
| EP | 1717134 | B1 | 11/2006 |
| EP | 1735168 | A2 | 12/2006 |
| EP | 1205097 | B1 | 1/2007 |
| EP | 1609344 | B1 | 1/2007 |
| EP | 1749193 | A1 | 2/2007 |
| EP | 1750108 | A1 | 2/2007 |
| EP | 1757464 | A1 | 2/2007 |
| EP | 1422124 | B1 | 3/2007 |
| EP | 1593552 | B1 | 3/2007 |
| EP | 1574399 | B1 | 4/2007 |
| EP | 1495883 | B1 | 5/2007 |
| EP | 1788363 | B1 | 5/2007 |
| EP | 1788364 | B1 | 5/2007 |
| EP | 1637364 | B1 | 6/2007 |
| EP | 1680608 | B1 | 6/2007 |
| EP | 1782973 | A3 | 6/2007 |
| EP | 1796926 | A1 | 6/2007 |
| EP | 1799540 | B1 | 6/2007 |
| EP | 1395484 | B1 | 7/2007 |
| EP | 1562810 | B1 | 7/2007 |
| EP | 1380446 | B1 | 8/2007 |
| EP | 1448421 | B1 | 8/2007 |
| EP | 1674366 | B1 | 8/2007 |
| EP | 1813513 | B1 | 8/2007 |
| EP | 1817181 | A1 | 8/2007 |
| EP | 1820708 | B1 | 8/2007 |
| EP | 1293363 | B1 | 9/2007 |
| EP | 1836063 | A1 | 9/2007 |
| EP | 1848599 | B1 | 10/2007 |
| EP | 1358453 | B1 | 11/2007 |
| EP | 1734355 | B1 | 11/2007 |
| EP | 1862050 | B1 | 12/2007 |
| EP | 1867499 | A1 | 12/2007 |
| EP | 1336824 | B1 | 1/2008 |
| EP | 1634729 | B2 | 1/2008 |
| EP | 1778507 | B1 | 1/2008 |
| EP | 1877268 | A1 | 1/2008 |
| EP | 1713649 | B9 | 2/2008 |
| EP | 1891344 | A2 | 2/2008 |
| EP | 1557299 | B1 | 3/2008 |
| EP | 1559592 | B1 | 3/2008 |
| EP | 1900552 | A2 | 3/2008 |
| EP | 1900609 | A2 | 3/2008 |
| EP | 1900610 | B1 | 3/2008 |
| EP | 1902917 | A2 | 3/2008 |
| EP | 1475253 | B1 | 4/2008 |
| EP | 1598249 | B1 | 4/2008 |
| EP | 1609345 | B1 | 4/2008 |
| EP | 1740400 | B1 | 4/2008 |
| EP | 1904351 | B1 | 4/2008 |
| EP | 1904357 | A2 | 4/2008 |
| EP | 1607248 | B1 | 5/2008 |
| EP | 1921432 | A1 | 5/2008 |
| EP | 1924451 | A1 | 5/2008 |
| EP | 1847448 | A3 | 6/2008 |
| EP | 1826033 | B1 | 7/2008 |
| EP | 1918137 | B1 | 7/2008 |
| EP | 1942037 | B2 | 7/2008 |
| EP | 1943138 | B1 | 7/2008 |
| EP | 1944224 | A1 | 7/2008 |
| EP | 1949822 | A1 | 7/2008 |
| EP | 1368222 | B1 | 9/2008 |
| EP | 1454808 | B2 | 9/2008 |
| EP | 1967426 | A1 | 9/2008 |
| EP | 1968846 | B1 | 9/2008 |
| EP | 1545913 | B1 | 10/2008 |
| EP | 1891343 | B1 | 10/2008 |
| EP | 1982151 | A2 | 10/2008 |
| EP | 1686047 | B1 | 12/2008 |
| EP | 1998965 | A1 | 12/2008 |
| EP | 2008892 | B1 | 12/2008 |
| EP | 2018981 | A1 | 1/2009 |
| EP | 1425209 | B1 | 2/2009 |
| EP | 1549124 | B1 | 2/2009 |
| EP | 1584499 | B1 | 2/2009 |
| EP | 2022654 | B1 | 2/2009 |
| EP | 2023111 | A2 | 2/2009 |
| EP | 2025536 | A1 | 2/2009 |
| EP | 2032417 | A2 | 3/2009 |
| EP | 1710100 | B1 | 5/2009 |
| EP | 1769949 | B1 | 5/2009 |
| EP | 1802516 | B1 | 5/2009 |
| EP | 2057444 | A2 | 5/2009 |
| EP | 2058151 | A1 | 5/2009 |
| EP | 2058185 | A2 | 5/2009 |

(56) References Cited

FOREIGN PATENT DOCUMENTS

| | | |
|---|---|---|
| EP | 2059400 | 5/2009 |
| EP | 2060892 A1 | 5/2009 |
| EP | 1623913 B1 | 7/2009 |
| EP | 2075562 A2 | 7/2009 |
| EP | 1910152 B1 | 8/2009 |
| EP | 2088062 B1 | 8/2009 |
| EP | 2090481 B1 | 8/2009 |
| EP | 2090874 A1 | 8/2009 |
| EP | 2091807 B1 | 8/2009 |
| EP | 1757466 B1 | 10/2009 |
| EP | 1834852 B1 | 10/2009 |
| EP | 1861306 B1 | 10/2009 |
| EP | 2108553 B1 | 10/2009 |
| EP | 1812278 B1 | 11/2009 |
| EP | 1902870 B1 | 11/2009 |
| EP | 2116400 A1 | 11/2009 |
| EP | 2119927 A1 | 11/2009 |
| EP | 1886847 B1 | 12/2009 |
| EP | 1905617 B1 | 12/2009 |
| EP | 1948498 B1 | 12/2009 |
| EP | 2129560 B1 | 12/2009 |
| EP | 1278656 B1 | 1/2010 |
| EP | 2141472 A1 | 1/2010 |
| EP | 1107893 B1 | 2/2010 |
| EP | 1912852 B1 | 2/2010 |
| EP | 1987967 B1 | 2/2010 |
| EP | 2079627 B3 | 2/2010 |
| EP | 2149476 A2 | 2/2010 |
| EP | 2155507 B1 | 2/2010 |
| EP | 1702812 B1 | 3/2010 |
| EP | 1787872 B1 | 3/2010 |
| EP | 2164638 A1 | 3/2010 |
| EP | 2164733 A2 | 3/2010 |
| EP | 1886845 B1 | 4/2010 |
| EP | 1917161 B9 | 4/2010 |
| EP | 1917188 B1 | 4/2010 |
| EP | 1932411 B1 | 4/2010 |
| EP | 2176632 A1 | 4/2010 |
| EP | 1927485 B1 | 5/2010 |
| EP | 2181002 A1 | 5/2010 |
| EP | 2184182 B1 | 5/2010 |
| EP | 2187166 B1 | 5/2010 |
| EP | 1561610 B1 | 6/2010 |
| EP | 1810561 B1 | 6/2010 |
| EP | 1812261 B1 | 6/2010 |
| EP | 1933121 A3 | 6/2010 |
| EP | 1970224 B1 | 6/2010 |
| EP | 2118616 B1 | 6/2010 |
| EP | 2199166 A1 | 6/2010 |
| EP | 2208034 A1 | 7/2010 |
| EP | 2210002 B1 | 7/2010 |
| EP | 1210257 B1 | 8/2010 |
| EP | 1298026 B1 | 8/2010 |
| EP | 1821090 A3 | 8/2010 |
| EP | 1995085 B1 | 8/2010 |
| EP | 1612081 B1 | 9/2010 |
| EP | 1784326 B1 | 9/2010 |
| EP | 1916127 B1 | 9/2010 |
| EP | 2042352 B1 | 9/2010 |
| EP | 2090500 B1 | 9/2010 |
| EP | 2129561 B1 | 9/2010 |
| EP | 2240796 A1 | 10/2010 |
| EP | 2243883 A2 | 10/2010 |
| EP | 2253529 B1 | 11/2010 |
| EP | 1638792 B1 | 12/2010 |
| EP | 2258586 A1 | 12/2010 |
| EP | 2260278 A2 | 12/2010 |
| EP | 2261066 B1 | 12/2010 |
| EP | 1562811 B1 | 1/2011 |
| EP | 1913804 B1 | 1/2011 |
| EP | 2100757 B1 | 1/2011 |
| EP | 2275287 B1 | 1/2011 |
| EP | 2277724 B1 | 1/2011 |
| EP | 2280263 A2 | 2/2011 |
| EP | 1530521 B1 | 3/2011 |
| EP | 1741572 B2 | 3/2011 |
| EP | 2289776 B1 | 3/2011 |
| EP | 2301322 B1 | 3/2011 |
| EP | 1818245 B1 | 4/2011 |
| EP | 2151373 B1 | 4/2011 |
| EP | 2311673 B1 | 4/2011 |
| EP | 2093134 B1 | 5/2011 |
| EP | 2110272 B1 | 5/2011 |
| EP | 2189307 B1 | 5/2011 |
| EP | 1472122 B1 | 6/2011 |
| EP | 1896317 B1 | 6/2011 |
| EP | 1676763 B1 | 7/2011 |
| EP | 1792791 B1 | 7/2011 |
| EP | 1919745 B1 | 7/2011 |
| EP | 2021227 B1 | 7/2011 |
| EP | 2164734 B1 | 7/2011 |
| EP | 2110271 B1 | 8/2011 |
| EP | 2222487 B1 | 8/2011 |
| EP | 2349777 B1 | 8/2011 |
| EP | 2356471 A1 | 8/2011 |
| EP | 2103458 B1 | 9/2011 |
| EP | 2165901 B1 | 9/2011 |
| EP | 2291646 B1 | 9/2011 |
| EP | 2363307 A2 | 9/2011 |
| EP | 2363307 B1 | 9/2011 |
| EP | 2373532 A1 | 10/2011 |
| EP | 1849013 B1 | 11/2011 |
| EP | 2138333 B1 | 11/2011 |
| EP | 2384941 A1 | 11/2011 |
| EP | 2099626 B1 | 12/2011 |
| EP | 2223831 B1 | 12/2011 |
| EP | 2394890 A1 | 12/2011 |
| EP | 2300289 B1 | 1/2012 |
| EP | 2401182 A1 | 1/2012 |
| EP | 2404800 A2 | 1/2012 |
| EP | 2405263 B1 | 1/2012 |
| EP | 2141034 B1 | 2/2012 |
| EP | 2417007 B1 | 2/2012 |
| EP | 2417008 A1 | 2/2012 |
| EP | 2432672 A2 | 3/2012 |
| EP | 1557300 B1 | 4/2012 |
| EP | 1902289 B1 | 4/2012 |
| EP | 2436540 A1 | 4/2012 |
| EP | 2439504 A2 | 4/2012 |
| EP | 2447118 A1 | 5/2012 |
| EP | 2450248 A1 | 5/2012 |
| EP | 2289773 B1 | 6/2012 |
| EP | 2274967 B1 | 7/2012 |
| EP | 2316714 B1 | 8/2012 |
| EP | 2480442 A1 | 8/2012 |
| EP | 2492173 B1 | 8/2012 |
| EP | 2289717 B1 | 9/2012 |
| EP | 2493732 A1 | 9/2012 |
| EP | 2503062 A2 | 9/2012 |
| EP | 2303649 B1 | 10/2012 |
| EP | 2511110 A1 | 10/2012 |
| EP | 2092815 B1 | 11/2012 |
| EP | 2335952 B1 | 11/2012 |
| EP | 2520447 A1 | 11/2012 |
| EP | 2368726 B1 | 1/2013 |
| EP | 2542463 B1 | 1/2013 |
| EP | 2542871 A1 | 1/2013 |
| EP | 2543776 B1 | 1/2013 |
| EP | 2163446 B1 | 2/2013 |
| EP | 2344386 B1 | 2/2013 |
| EP | 2556973 A1 | 2/2013 |
| EP | 2570312 B1 | 3/2013 |
| EP | 1606984 B1 | 4/2013 |
| EP | 2576297 B1 | 4/2013 |
| EP | 2584331 A1 | 4/2013 |
| EP | 2370308 B1 | 5/2013 |
| EP | 2502763 B1 | 5/2013 |
| EP | 2588852 A1 | 5/2013 |
| EP | 2266820 B1 | 6/2013 |
| EP | 2607159 A1 | 6/2013 |
| EP | 2607873 A2 | 6/2013 |
| EP | 2132539 B1 | 8/2013 |
| EP | 2268528 B9 | 8/2013 |
| EP | 2433482 B1 | 8/2013 |

(56) References Cited

FOREIGN PATENT DOCUMENTS

| | | | |
|---|---|---|---|
| EP | 2626678 | A2 | 8/2013 |
| EP | 2272691 | B1 | 9/2013 |
| EP | 2340699 | B1 | 9/2013 |
| EP | 2366564 | B1 | 9/2013 |
| EP | 2540530 | B1 | 9/2013 |
| EP | 2540531 | B1 | 9/2013 |
| EP | 2634073 | B1 | 9/2013 |
| EP | 2191988 | B1 | 10/2013 |
| EP | 2654394 | A1 | 10/2013 |
| EP | 2663485 | A1 | 11/2013 |
| EP | 2683164 | B1 | 1/2014 |
| EP | 2688763 | A1 | 1/2014 |
| EP | 2295268 | B1 | 3/2014 |
| EP | 2708386 | B1 | 3/2014 |
| EP | 2708865 | A1 | 3/2014 |
| EP | 2711207 | A2 | 3/2014 |
| EP | 2055542 | B1 | 4/2014 |
| EP | 2722204 | A1 | 4/2014 |
| EP | 2722215 | A2 | 4/2014 |
| EP | 2724876 | A1 | 4/2014 |
| EP | 2729333 | A1 | 5/2014 |
| EP | 2729778 | A2 | 5/2014 |
| EP | 2730903 | A2 | 5/2014 |
| EP | 2734027 | A1 | 5/2014 |
| EP | 1024036 | B1 | 6/2014 |
| EP | 2343201 | B1 | 6/2014 |
| EP | 2602132 | B1 | 6/2014 |
| EP | 2316669 | B1 | 7/2014 |
| EP | 2417009 | B1 | 7/2014 |
| EP | 2608186 | A3 | 7/2014 |
| EP | 2752650 | A1 | 7/2014 |
| EP | 2717239 | A3 | 8/2014 |
| EP | 2717240 | A3 | 8/2014 |
| EP | 2761708 | A1 | 8/2014 |
| EP | 2767417 | A2 | 8/2014 |
| EP | 2767418 | A1 | 8/2014 |
| EP | 2589504 | B1 | 9/2014 |
| EP | 2594534 | B1 | 9/2014 |
| EP | 2772739 | A1 | 9/2014 |
| EP | 2773544 | A1 | 9/2014 |
| EP | 2773545 | A1 | 9/2014 |
| EP | 2776258 | A1 | 9/2014 |
| EP | 2781378 | A1 | 9/2014 |
| EP | 2635447 | B1 | 10/2014 |
| EP | 2788749 | A1 | 10/2014 |
| EP | 2793009 | A1 | 10/2014 |
| EP | 2533942 | B1 | 11/2014 |
| EP | 2801488 | A1 | 11/2014 |
| EP | 2316668 | B1 | 12/2014 |
| EP | 2809274 | A1 | 12/2014 |
| EP | 2817180 | A1 | 12/2014 |
| EP | 2817187 | A1 | 12/2014 |
| EP | 2817600 | A1 | 12/2014 |
| EP | 2819858 | A1 | 1/2015 |
| EP | 2390145 | B1 | 2/2015 |
| EP | 2838742 | A1 | 2/2015 |
| EP | 2442989 | B1 | 3/2015 |
| EP | 2848480 | B1 | 3/2015 |
| EP | 2848502 | B1 | 3/2015 |
| EP | 2415620 | B1 | 4/2015 |
| EP | 2442990 | B1 | 4/2015 |
| EP | 2856099 | A1 | 4/2015 |
| EP | 2452839 | B1 | 5/2015 |
| EP | 2497658 | B1 | 5/2015 |
| EP | 2608971 | B1 | 5/2015 |
| EP | 2870446 | A1 | 5/2015 |
| EP | 2874855 | A1 | 5/2015 |
| EP | 2417306 | B1 | 6/2015 |
| EP | 2548764 | B1 | 6/2015 |
| EP | 2851667 | A3 | 6/2015 |
| EP | 2269880 | B1 | 7/2015 |
| EP | 2606653 | B1 | 7/2015 |
| EP | 2889592 | A1 | 7/2015 |
| EP | 2890956 | A1 | 7/2015 |
| EP | 2891586 | B1 | 7/2015 |
| EP | 2892738 | A1 | 7/2015 |
| EP | 2899101 | A1 | 7/2015 |
| EP | 2651678 | B1 | 8/2015 |
| EP | 2905155 | A1 | 8/2015 |
| EP | 2907710 | A1 | 8/2015 |
| EP | 2521665 | B1 | 9/2015 |
| EP | 2918469 | A1 | 9/2015 |
| EP | 2636546 | B1 | 10/2015 |
| EP | 2865585 | B1 | 10/2015 |
| EP | 2934962 | A1 | 10/2015 |
| EP | 2934964 | A1 | 10/2015 |
| EP | 2551132 | B1 | 11/2015 |
| EP | 2751536 | B1 | 11/2015 |
| EP | 2766239 | B1 | 11/2015 |
| EP | 2951115 | A1 | 12/2015 |
| EP | 2362201 | B1 | 2/2016 |
| EP | 2984914 | A1 | 2/2016 |
| EP | 2984915 | A1 | 2/2016 |
| EP | 2511109 | B1 | 3/2016 |
| EP | 2988958 | A1 | 3/2016 |
| EP | 2988973 | A1 | 3/2016 |
| EP | 2988983 | A1 | 3/2016 |
| EP | 2993373 | A1 | 3/2016 |
| EP | 2994355 | A1 | 3/2016 |
| EP | 2997429 | A1 | 3/2016 |
| EP | 2602134 | B1 | 4/2016 |
| EP | 3003802 | A1 | 4/2016 |
| EP | 3007917 | A1 | 4/2016 |
| EP | 3009923 | A1 | 4/2016 |
| EP | 2139732 | B1 | 5/2016 |
| EP | 2676820 | B1 | 5/2016 |
| EP | 2839173 | B1 | 5/2016 |
| EP | 2523837 | B1 | 6/2016 |
| EP | 2558338 | B1 | 6/2016 |
| EP | 2714436 | B1 | 6/2016 |
| EP | 2727752 | B1 | 6/2016 |
| EP | 2758258 | B1 | 6/2016 |
| EP | 3028882 | A2 | 6/2016 |
| EP | 3034373 | A1 | 6/2016 |
| EP | 3036148 | A1 | 6/2016 |
| EP | 3036986 | A1 | 6/2016 |
| EP | 2754594 | B1 | 7/2016 |
| EP | 2883435 | B1 | 7/2016 |
| EP | 2916643 | A4 | 7/2016 |
| EP | 3040235 | A1 | 7/2016 |
| EP | 3046805 | A1 | 7/2016 |
| EP | 3047986 | A1 | 7/2016 |
| EP | 2527168 | B1 | 8/2016 |
| EP | 2567837 | B1 | 8/2016 |
| EP | 2815950 | B1 | 8/2016 |
| EP | 3055173 | A1 | 8/2016 |
| EP | 3057849 | A1 | 8/2016 |
| EP | 3059103 | A1 | 8/2016 |
| EP | 3059142 | A1 | 8/2016 |
| EP | 3060894 | A1 | 8/2016 |
| EP | 2906923 | B1 | 9/2016 |
| EP | 3000671 | B1 | 9/2016 |
| EP | 3068640 | A1 | 9/2016 |
| EP | 3072710 | A1 | 9/2016 |
| EP | 2714437 | B1 | 10/2016 |
| EP | 2893793 | B1 | 10/2016 |
| EP | 3078513 | A1 | 10/2016 |
| EP | 3078515 | A1 | 10/2016 |
| EP | 3081405 | A2 | 10/2016 |
| EP | 3084379 | B1 | 10/2016 |
| EP | 3085217 | A1 | 10/2016 |
| EP | 2594455 | B1 | 11/2016 |
| EP | 2931569 | B1 | 11/2016 |
| EP | 3098111 | A1 | 11/2016 |
| EP | 2326540 | B1 | 12/2016 |
| EP | 2602133 | B1 | 12/2016 |
| EP | 3099545 | A1 | 12/2016 |
| EP | 2272692 | B1 | 1/2017 |
| EP | 3110636 | A1 | 1/2017 |
| EP | 3122618 | A1 | 2/2017 |
| EP | 3123697 | A1 | 2/2017 |
| EP | 3128299 | A1 | 2/2017 |
| EP | 3128759 | A1 | 2/2017 |
| EP | 3133381 | A1 | 2/2017 |

(56) References Cited

FOREIGN PATENT DOCUMENTS

| | | |
|---|---|---|
| EP | 3012180 B1 | 3/2017 |
| EP | 3134281 A2 | 3/2017 |
| EP | 2197718 B1 | 4/2017 |
| EP | 2664506 B1 | 4/2017 |
| EP | 2946647 B1 | 4/2017 |
| EP | 3152090 A1 | 4/2017 |
| EP | 3155886 A1 | 4/2017 |
| EP | 2928734 B1 | 5/2017 |
| EP | 3162665 A1 | 5/2017 |
| EP | 3163274 A1 | 5/2017 |
| EP | 3164325 A1 | 5/2017 |
| EP | 3164686 A1 | 5/2017 |
| EP | 3165974 A1 | 5/2017 |
| EP | 3166825 A1 | 5/2017 |
| EP | 2589503 B1 | 6/2017 |
| EP | 3177515 A1 | 6/2017 |
| EP | 3180217 A1 | 6/2017 |
| EP | 2987694 B1 | 7/2017 |
| EP | 3188480 A1 | 7/2017 |
| EP | 2535212 B1 | 8/2017 |
| EP | 2893527 B1 | 8/2017 |
| EP | 2893792 B1 | 8/2017 |
| EP | 2918452 B1 | 8/2017 |
| EP | 2981796 B1 | 8/2017 |
| EP | 3008985 B1 | 8/2017 |
| EP | 3197692 A1 | 8/2017 |
| EP | 3201586 A1 | 8/2017 |
| EP | 3204275 A1 | 8/2017 |
| EP | 3209509 A1 | 8/2017 |
| EP | 2729401 B1 | 9/2017 |
| EP | 3114440 A4 | 9/2017 |
| EP | 3222129 A1 | 9/2017 |
| EP | 2546627 A3 | 10/2017 |
| EP | 2573041 B1 | 10/2017 |
| EP | 2803618 B1 | 10/2017 |
| EP | 3227130 A1 | 10/2017 |
| EP | 2648950 B1 | 11/2017 |
| EP | 3239009 A1 | 11/2017 |
| EP | 3246685 A1 | 11/2017 |
| EP | 3249368 A1 | 11/2017 |
| EP | 3255214 A1 | 12/2017 |
| EP | 3260832 A1 | 12/2017 |
| EP | 2718094 B1 | 1/2018 |
| EP | 3065957 B1 | 1/2018 |
| EP | 3261889 A1 | 1/2018 |
| EP | 3261890 A2 | 1/2018 |
| EP | 3265330 A2 | 1/2018 |
| EP | 3269590 A1 | 1/2018 |
| EP | 3275704 A2 | 1/2018 |
| WO | WO-2018/019859 A1 | 2/2018 |

OTHER PUBLICATIONS

Office Action, U.S. Appl. No. 15/815,640, dated Jul. 11, 2019, 14 pages.
International Search Report PCT/EP2018/000105 dated Jul. 6, 2018 (3 pages).
K. Kasten et al., "iBolt Technology—A Weight Sensing System for Advanced Passenger Safety"; Advanced Microsystems for Automotive Applications 2006; pp. 171-186 (2006).

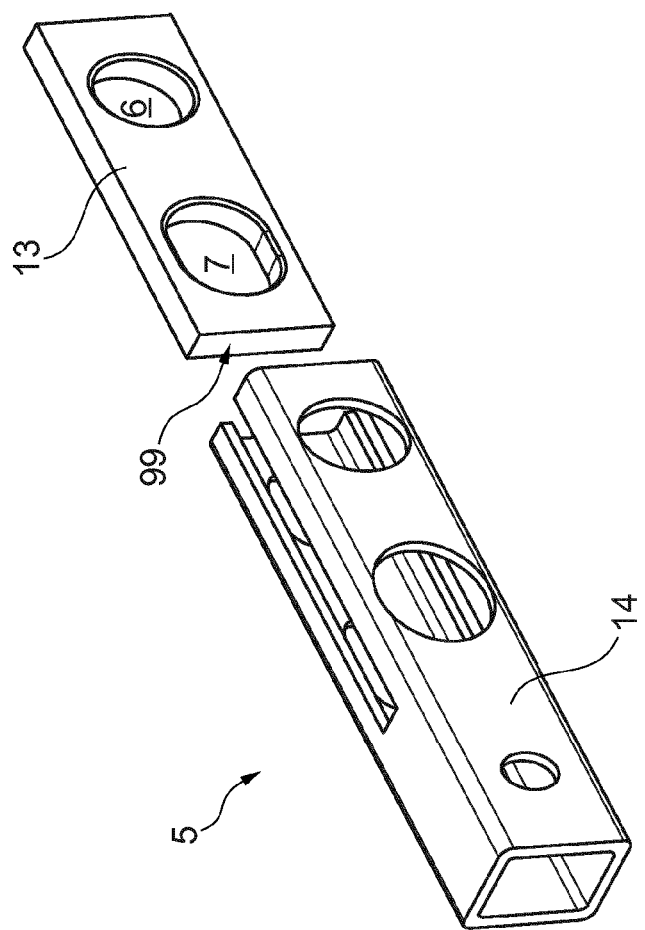
Fig. 3
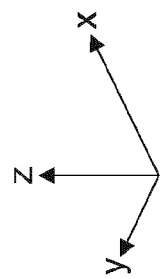

MAGNETOELASTIC BASED SENSOR ASSEMBLY

CROSS-REFERENCE TO RELATED APPLICATIONS

This is a continuation application of, and which claims the benefit of the filing date and disclosure of, U.S. patent application Ser. No. 16/523,418, filed on Jul. 26, 2019, entitled "Magnetoelastic Based Sensor Assembly," which is a continuation of and claims the benefit of the filing date of International Application PCT/EP2018/000105, filed Mar. 22, 2018, which is based on and claims the benefit of the filing date of European Patent Application No. 17162429.9, filed on Mar. 22, 2017, the contents of each of which are incorporated by reference herein.

BACKGROUND OF THE INVENTION

Field of Invention

The invention is related in general to systems and methods involving the use of magnetic field sensors for measuring a load. In particular, the invention relates to a magnetoelastic based sensor assembly, i.e. a sensor assembly comprising a magneto-elastically active region and a tow coupling incorporating this sensor assembly. Furthermore, the invention relates to a method of determining a direction of a load vector.

Description of Related Art

In many use cases strain gauges are used for sensing a load. However, strain gauges often require a structural weakening of the load conducting elements. Often, there is a need for load measurements without compromising on structural stability.

This is especially true for tow couplings. Furthermore, there is a strong demand for smart tow couplings, e.g. for systems providing a load weight gauge (measuring the tongue load of a tow coupling), a tow load weight shift alert, an unsafe trailer load distribution alert, a vehicle limit notification, an automated trailer brake control (closed loop), a low/flat trailer tire notification, and a check trailer brake notification, closed loop braking control, vehicle shift control, engine control, and stability control. The above discussed functions require the measurement of tow loads and/or tongue loads of the tow coupling.

Prior art load measurement devices for tow couplings have significant shortcomings, e.g. the complexity of the measurement and control devices, and the costs of the sensor assembly.

As an alternative to the widely used strain-gauges, non-contact type sensors exploiting the magnetoelastic effect were developed. These are frequently applied for torque measurements at rotating shafts in various mechanic systems. U.S. Pat. No. 9,347,845 discloses such a magnetoelastic sensor. U.S. Pat. No. 9,347,845 is incorporated herein by reference in its entirety.

BRIEF SUMMARY OF THE INVENTION

It is an object of the invention to provide an improved magnetoelastic based sensor assembly to effectively measure stress and strain in systems having a portion, which is subject to a mechanic load. The invention also provides a method of determining a direction of a load vector acting on a magnetoelastic based sensor assembly.

According to an aspect, a sensor assembly for force sensing can comprise a first portion having a first and a second through hole. The sensor assembly can further comprise a second portion having a third and a fourth through hole. The third and the fourth through hole can be positioned in correspondence to the first and the second through holes. The sensor assembly can further comprise a first pin and a second pin. The first pin can be arranged such that it extends through the first and the third through hole and the second pin can be arranged such that it extends through the second and the fourth through hole, so as to couple the first portion to the second portion. At least one out of the first and the second pin can comprise at least one magneto-elastically active region that may directly or indirectly be attached to or form a part of the pin in such a manner that mechanic stress on the pin is transmitted to the magneto-elastically active region. The magneto-elastically active region can comprise at least one magnetically polarized region such that a polarization of the magnetically polarized region may become increasingly helically shaped as the applied stress increases. The sensor assembly can further comprise a magnetic field sensor means which may be arranged approximate the at least one magneto-elastically active region. The magnetic field sensor means may be configured to output a signal corresponding to a stress-induced magnetic flux which may emanate from the magnetically polarized region. The magnetic field sensor means may comprise at least one direction sensitive magnetic field sensor which may be configured to determine a shear force in at least one direction. The at least one direction sensitive magnetic field sensor may in particular be arranged to have a predetermined and fixed spatial coordination with the pin, wherein this pin may at least be partially hollow.

The at least one direction sensitive magnetic field sensor may be arranged inside an interior of this pin. By means of the sensor assembly stress which is applied to a pin caused by a mechanic load can effectively be measured. The sensor assembly according to aspects of the invention overcomes the drawback of the prior art solutions. In particular, the sensor assembly does not tend to drift with respect to the measurement values and is less error-prone.

According to another aspect, at least one out of the first and the second pin of the sensor assembly can comprise at least one X-direction sensitive magnetic field sensor, which can be configured to detect a force component Fx1 in a longitudinal direction X, and/or at least one Z-direction sensitive magnetic field sensor, which can be configured to detect a force component Fz1 in a vertical direction Z. The longitudinal direction X can be defined by a direction of longitudinal extension of the second portion. The vertical direction Z can be substantially perpendicular to the longitudinal direction X and substantially perpendicular to the transversal direction Y of longitudinal extension of the at least one pin.

According to another aspect, the first through hole and the third through hole of the sensor assembly can be configured such that they encompass the first pin in a positive-fitting manner. A positive-fitting manner of the fitting allows the pin to be substantially rigidly fixed to the first portion and the second portion by the first and the third through hole. This means that the pin has almost no play inside the first and third through hole and that the accuracy of the force measurement is advantageously increased compared to a configuration in which the first pin has play inside the first and the third through hole.

According to another aspect, the second pin of the sensor assembly may be encompassed by the second through hole in a positive-fitting manner and the fourth through hole may be configured such that the second pin may have one additional degree of freedom of movement within the fourth through hole. The additional degree of freedom of movement allows the second pin to be insensitive with respect to shear forces acting in the direction of the additional degree of freedom of movement. This means that the determination of the shear force along this direction can advantageously be simplified since the shear effect occurs exclusively on the first pin.

According to another aspect, the additional degree of freedom of movement may extend in the longitudinal direction X. Since the additional degree of freedom of movement corresponds to the longitudinal direction X, the determination of the shear force along this direction can advantageously be simplified.

According to another aspect, the first and/or the second pin of the sensor assembly can comprise a first magneto-elastically active region and a second magneto-elastically active region. The first and the second magneto-elastically active regions may be directly or indirectly attached to or form parts of the pin in such a manner that mechanic stress may be transmitted to the magneto-elastically active regions. Each magneto-elastically active region can comprise a magnetically polarized region. Particularly, the magnetic polarization of the first magneto-elastically active region and the magnetic polarization of the second magneto-elastically active region may be substantially opposite to each other. The magnetic field sensor means can comprise at least one first direction sensitive magnetic field sensor which may be arranged approximate the first magneto-elastically active region.

The magnetic field sensor means may be configured to output a first signal corresponding to a stress-induced magnetic flux which may emanate from the first magneto-elastically active region. The magnetic field sensor means may comprise at least one second direction sensitive magnetic field sensor which may be arranged approximate the second magneto-elastically active region. The magnetic field sensor means may be configured to output a second signal corresponding to a stress-induced magnetic flux which may emanate from the second magneto-elastically active region. This way, the shear force can advantageously be determined in two opposing directions thereby improving the quality of the determination of the shear force. This "vice versa" configuration of the magnetic field sensors enables the shear directions to be determined by the magneto-elastically active regions. For example, the directions may be distinguishable, if the measurement data, which is acquired from the first direction sensitive magnetic field sensor and the second direction sensitive magnetic field sensor, is differentially processed.

The differential evaluation of the signals advantageously doubles the signal, which is correlated with the applied stress. Because the polarization of the first and second magneto-elastically active region is opposite to each other, theoretically possible external fields may be compensated. The sensor assembly according to this embodiment may be more sensitive and less susceptible to errors.

According to another aspect, the first and/or the second pin of the sensor assembly can comprise at least one first X-direction sensitive magnetic field sensor and/or at least one second X-direction sensitive magnetic field sensor and/or at least one Z-direction sensitive magnetic field sensor and/or at least one second Z-direction sensitive magnetic field sensor. The at least one X-direction sensitive magnetic field sensor may be configured to detect a force component $Fx1$ in the first magneto-elastically active region in the longitudinal direction X of the second portion. The at least one second X-direction sensitive magnetic field sensor may be configured to detect a force component $Fx2$ in the second magneto-elastically active region in the longitudinal direction X of the second portion. The at least one Z-direction sensitive magnetic field sensor may be configured to detect a force component $Fz1$ in the first magneto-elastically active region in the vertical direction Z. The at least one second Z-direction sensitive magnetic field sensor may be configured to detect a force component $Fz2$ in the second magneto-elastically active region in the vertical direction Z. Advantageously, the shear force can be determined in different directions being perpendicularly aligned with respect to each other.

According to another aspect, the first pin of the sensor assembly can comprise the at least one Z-direction sensitive magnetic field sensor and the at least one second Z-direction sensitive magnetic field sensor. Advantageously, the first pin can be configured to exclusively react on a shear force acting along the Z-direction.

According to another aspect, the first pin of the sensor assembly can comprise the at least one first X-direction sensitive magnetic field sensor, the at least one second X-direction sensitive magnetic field sensor, the at least one first Z-direction sensitive magnetic field sensor and the at least one second Z-direction sensitive magnetic field sensor and the second pin of the sensor assembly can comprise the at least one Z-direction sensitive magnetic field sensor and the at least one second Z-direction magnetic field sensor. Advantageously, the first pin can be configured to exclusively react on the shear effect along the X-direction which simplifies the shear force evaluation, wherein the shear force along the vertical Z-direction is acting on both pins.

According to another aspect the first pin of the sensor assembly can comprise the at least one first X-direction sensitive magnetic field sensor, the at least one second X-direction sensitive magnetic field sensor, the at least one first Z-direction sensitive magnetic field sensor and the at least one second Z-direction sensitive magnetic field sensor and the second pin of the sensor assembly can comprise the at least one first X-direction sensitive magnetic field sensor, the at least one second X-direction sensitive magnetic field sensor, the at least one first Z-direction sensitive magnetic field sensor and the at least one second Z-direction sensitive magnetic field sensor. This way, both pins are sensitive to all shear forces along the vertical Z-direction as well as along the longitudinal X-direction. The first and the second pin advantageously can detect the different components of the shear force at different positions of the system.

The magnetic field sensor means may be configured for determination of a first component and a second component of the load, which is applied to the pin. In particular, the at least one first X-direction sensitive magnetic field sensor and the at least one second X-direction sensitive magnetic field sensor can form a first group of sensors and the at least one first Z-direction sensitive magnetic field sensor and the at least one second Z-direction sensitive magnetic field sensor can form a second group of sensors. The first group of sensors is suitable for determination of a load component, which is directed along the X-axis. The second group of sensors senses a component of the load, which is substantially perpendicular to the first component along the Z-direction. Consequently, the direction and the value of the stress or force, which is applied to the pins, may be determined from said components in this coordinate system.

According to another aspect, the second portion of the sensor assembly can comprise a center wall which may extend in the longitudinal direction X and the vertical direction Z. The third and the fourth through hole may also extend through the center wall. Advantageously, the center wall allows the first portion to be effectively affected by the shear force at an additional point of action.

According to another aspect, the first and/or the second pin of the sensor assembly may be fixedly attached in a predetermined manner to the first portion. The first and/or the second pin can advantageously be fixedly attached in all six degrees of freedom. This way, the determination of the shear forces is effectively possible since the pins do not have play inside the through holes of the first portion.

According to another aspect, the first portion of the sensor assembly can have a yoke-like shape. The yoke legs of the first portion can comprise the first and the second through holes. The second portion of the sensor assembly can have a tubular shape. The side walls of the second portion can comprise the third and fourth through holes. The direction sensitive magnetic field sensor(s) may be configured to detect force components of shear forces introduced into the pins by the first portion and the second portion. Advantageously, a yoke-like shape of the first portion and a tubular shape of the second portion allow the sensor assembly to be implemented in an elongated joint connection of two objects, whereas the pins are arranged in the through holes and connect both objects.

According to another aspect, the first portion of the sensor assembly can have a yoke-like shape. The yoke legs of the first portion can comprise the first and the second through holes. The center wall can comprise the third and fourth through holes. The direction sensitive magnetic field sensor (s) may be configured to detect force components of shear forces introduced into the pins by the first portion and the second portion. In particular, the side walls of the second portion can comprise through holes which may be larger than the third and the fourth through holes such that the shear forces may be introduced into the pins by abutment surfaces of the first and the second through holes in the yoke legs and abutment surfaces of the third and the fourth through holes in the center wall. The abutment surfaces allow the transmission of power between the first portion and the second portion to be configured in an advantageous manner.

According to another aspect, a tow coupling can comprise a sensor assembly wherein the first portion is a hitch assembly that may be configured to be attached to a car chassis and wherein the second portion may be a receiving tube which may be configured to receive a draw bar, alternatively a hitch bar or a ball mount of the tow coupling. Advantageously, the sensor assembly is configured to detect the forces of a tow coupling of an automobile, which may be part of a land based on-road or off-road vehicle.

According to another aspect, the first portion of the sensor assembly may be a supporting yoke having two yoke legs. The yoke legs may comprise recesses which are aligned in correspondence to each other and which represent the first and the second through holes of the first portion.

According to another aspect, the first portion of the sensor assembly may be a supporting yoke having two or four yoke legs. The yoke legs may comprise recesses which are aligned in correspondence to each other and which represent the first and the second through holes of the first portion.

According to another aspect, the sensor assembly dispenses with a mechanical linkage or connection between the magnetic field sensor means and the second portion. This eliminates sources of error, which result from mechanic failure of this connection. The sensor assembly reliably operates even under extreme operating conditions. The drift of the measurement values during long term measurement is reduced. The sensor assembly according to aspects of the invention is versatile in that it may be applied to or integrated in nearly every tubular shaped portion, which may be for example a part of a hydraulic unit of a land-, marine-, rail- or air transport vehicle.

According to another aspect the forces which are detectable by the sensor assembly are not exclusively restricted to shear forces which originate from shear stress but may also originate due to tensile or compressive stress acting on the magneto-elastically active region(s) of the first pin and/or the second pin of the sensor assembly. In other words, shear stress and normal stress may both induce a variation of the polarization of the magnetically polarized region emanating from the magneto-elastically active region(s). This polarization may be detectable by the magnetic field sensor means which may output a signal corresponding to a stress-induced magnetic flux towards the polarization direction sensitive magnetic field sensor that may be configured to determine the acting force. Consequently, the magneto-elastically active region may be sensitive to all stress types. The embodiment may particularly be suitable, if the pin is exposed to only one single type of stress.

According to another aspect, the direction sensitive magnetic field sensors may be one of a Hall-effect, magneto-resistance, magneto-transistor, magneto-diode, MAGFET field sensors or fluxgate magnetometer. These aspects advantageously apply to all embodiments of the invention.

According to another aspect, any hydraulic piston, crane application, car and other various applications incorporating bolts and pins, where shear forces may be applied, may be equipped with the sensor assembly according to aspects of the invention. Traditionally, shear force sensors using strain-gauges are designed in that they get intentionally weaken to provide enough deformation so as to allow a measurement of the applied loads. The magneto-elastically active region of the sensor assembly, however, provides the possibility to design the bolt without weaken locations and significantly higher overload capability. The load pin having the integrated magneto-elastically active region provides the possibility to detect shear forces in pins, screws, bolts etc.

According to another aspect, a method of determining a direction of a load vector is provided. Within said method, a sensor assembly according to aspects of the invention is provided. In other words, a sensor assembly is provided which can comprise a first portion having a first and a second through hole. The sensor assembly can further comprise a second portion having a third and a fourth through hole. The third and the fourth through hole can be positioned in correspondence to the first and the second through hole. The sensor assembly can further comprise a first pin and a second pin. The first pin can be arranged such that it extends through the first and the third through hole and the second pin can be arranged such that it extends through the second and the fourth through hole, so as to couple the first portion to the second portion. At least one out of the first and the second pin can comprise at least one magneto-elastically active region that may directly or indirectly be attached to or form a part of the pin in such a manner that mechanic stress on the pin is transmitted to the magneto-elastically active region. The magneto-elastically active region can comprise at least one magnetically polarized region such that a polarization of the magnetically polarized region may become increasingly helically shaped as the applied stress increases. The sensor assembly can further comprise a magnetic field sensor means which may be arranged approximate the at least one magneto-elastically active region. The magnetic field sensor means may be configured to output a signal corresponding to a stress-induced magnetic flux which may emanate from the magnetically polarized region. The magnetic field sensor means may comprise at least one direction sensitive magnetic field sensor which may be configured to determine a shear force in at least one direction. The at least one direction sensitive magnetic field sensor may in particular be arranged to have a predetermined and fixed spatial coordination with the pin, wherein this pin may at least be partially hollow. The at least one direction sensitive magnetic field sensor may be arranged inside an interior of this pin.

Furthermore, within the method according to another aspect, the first pin and the second pin may be exposed to a load. Measurement data of the at least one direction sensitive magnetic field sensor may be processed so as to determine a shear stress and/or a tensile or compressive stress that is applied by the second portion and the first portion to the first and/or second pin 8, 9.

In particular, a direction of a force F may be determined from the measurement data on the one hand and the predetermined and known spatial coordination between the direction sensitive magnetic field sensor(s), the first pin, the second pin and the point of load.

The force F is applied to the sensor assembly via the second portion 5.

Same or similar advantages which have been already mentioned with respect to the sensor assembly comprising a magneto-elastically active region according to aspects of the invention apply in a same or similar way to the method of determining a direction of the load vector and will be not repeated.

BRIEF DESCRIPTION OF THE DRAWINGS

Further aspects and characteristics of the invention ensue from the following description of the preferred embodiments of the invention with reference to the accompanying drawings, wherein, FIG. 3 is a simplified exploded perspective view of a second portion.

DETAILED DESCRIPTION OF THE INVENTION

Figure 1:
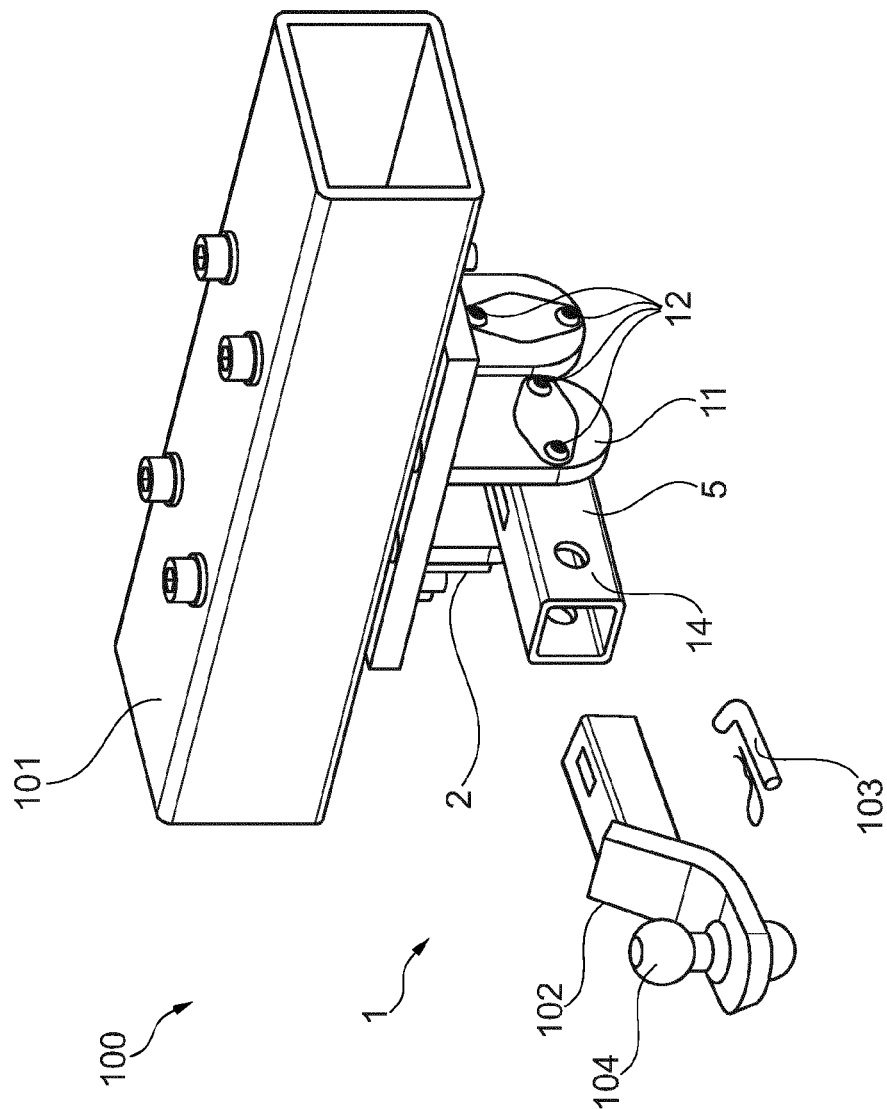
FIG. 1 is a simplified perspective view of a tow coupling comprising a sensor assembly for force sensing.
Figure 2:
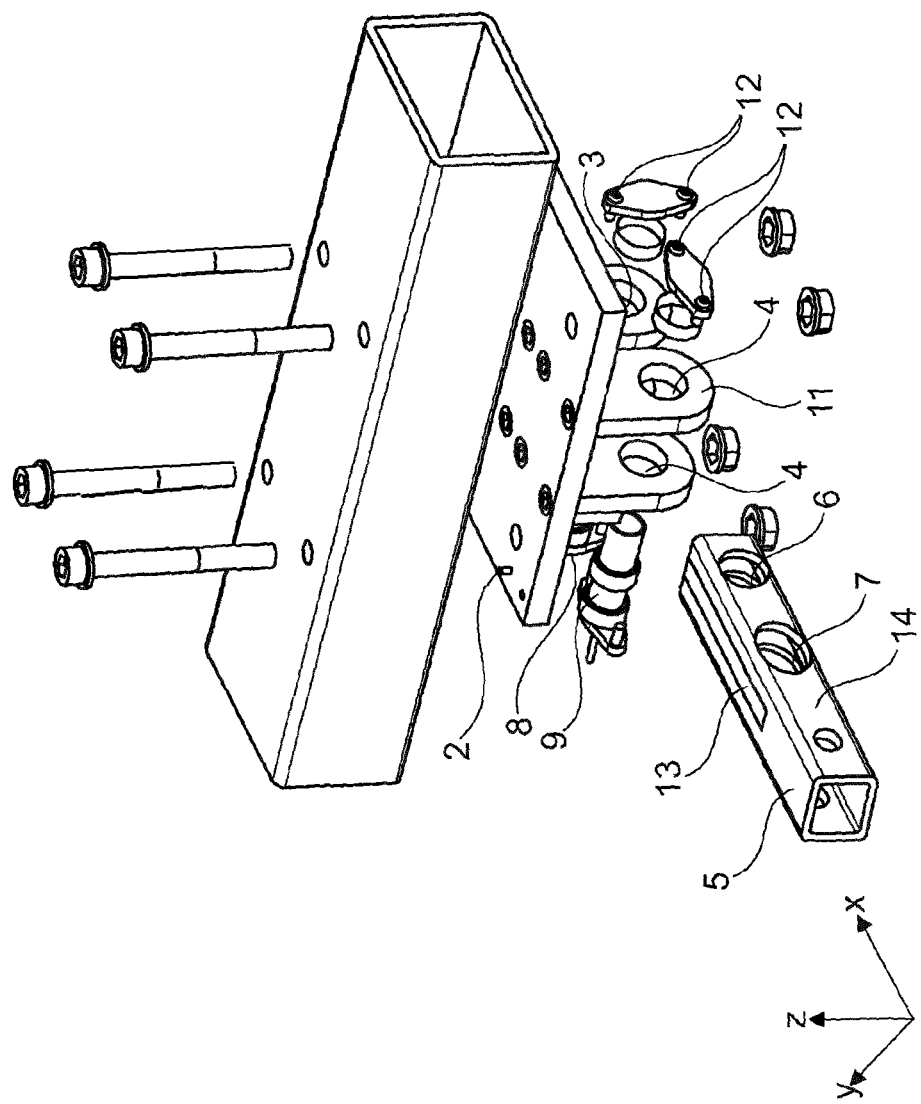
FIG. 2 is a simplified exploded view of the tow coupling.

FIG. 1 is a simplified perspective view of a tow coupling comprising a sensor assembly 1 for force sensing according to aspects of the invention; FIG. 2 is a simplified exploded view of the tow coupling.

The sensor assembly 1 for force sensing comprises a first portion 2 (supporting yoke) having a first through hole 3 and a second through hole 4, a second portion 5 (receiving tube) having a third through hole 6 and fourth through hole 7. The third and fourth through holes 6, 7 are positioned in correspondence to the first and second through holes 3, 4.

The second portion defines a Cartesian coordinate system having a longitudinal direction X, a transversal direction Y and a vertical direction Z. The longitudinal direction X extends in the direction of longitudinal extension of the second portion. The transversal direction Y extends in a direction perpendicular to the longitudinal direction X and in a horizontal plane. The vertical direction Z extends in a direction that perpendicular to the longitudinal direction X and the transversal direction Y.

The sensor assembly 1 further comprises a first pin 8 and a second pin 9. The first pin 8 is arranged such that it extends through the first and third through holes 3, 6. The second pin 9 is arranged such that it extends through the second and fourth through holes 4, 7. The first portion 2 is coupled to the second portion 5 via the first and second pins 8, 9.

At least one out of the first and the second pin 8, 9 comprises at least one magneto-elastically active region 10 (see FIG. 4) that is directly or indirectly attached to or forms a part of the pin 8, 9 in such a manner that mechanic stress of the pin 8, 9 is transmitted to the magneto-elastically active region.

The magneto-elastically active region 10 comprises at least one magnetically polarized region such that a polarization of the polarized region becomes increasingly helically shaped as the applied stress increases.

The at least one pin 8, 9 further comprises a magnetic field sensor means arranged approximate the at least one magneto-elastically active region 10 for outputting a signal corresponding to a stress-induced magnetic flux emanating from the magnetically polarized region.

The magnetic field sensor means comprises at least one direction sensitive magnetic field sensor L. The at least one direction sensitive magnetic field sensor is configured for determination of a shear force in at least one direction.

The at least one direction sensitive magnetic field sensor L is in particular arranged to have a predetermined and fixed spatial coordination with the respective pin 8, 9.

The pin 8, 9 comprises the at least one direction sensitive magnetic field sensor L is at least partially hollow. The at least one direction sensitive magnetic field sensor L is arranged inside the interior of the pin 8, 9.

The first through hole 3 and the third through hole 6 are configured such that they encompass the first pin 8 in a positive-fitting manner. In other words, the first pin 8 extends through the first and third through holes 3, 6, and the first pin 8 is supported in at least two rotational degrees of freedom and at least two translational degrees of freedom by abutting surfaces of the through holes.

The second pin 9 is encompassed by the second through hole 4 in a positive-fitted manner. In other words, the second pin 9 extends through the second through hole 4, and the second pin 9 is supported in at least two rotational degrees of freedom and at least two translational degrees of freedom by abutting surfaces of the second through hole 4.

The fourth through hole 7 is configured such that the second pin 9 has one additional degree of freedom of movement (compared to the first pin 8 in the third through hole 6) within the fourth through hole 7. Differently stated, the second pin 9 extends through fourth through hole 7, and the second pin 9 is supported in at least two rotational degrees of freedom and at least one translational degree of freedom by abutting surfaces of the through holes. The number of translational degrees of freedom of the second pin 9 in the fourth through hole 7 is one more than the number of translational degrees of freedom of the first pin 8 the third through hole 6.

The additional degree of freedom is a translational degree of freedom that extends in the longitudinal direction X.

The first portion 2 has a yoke-like shape, wherein yoke legs 11 of the first portion comprise the first through hole 3 and second through hole 4.

The second portion 5 has a tubular shape, wherein side walls and/or a center wall of the second portion 5 comprise the third through hole 6 and the fourth through hole 7.

The direction sensitive magnetic field sensor is (or the direction sensitive magnetic field sensors are) configured to detect force components of shear forces introduced into the pins 8, 9 by the first portion 2 and the second portion 5.

The first and/or second pin 8, 9 is fixedly attached (in all six degrees of freedom in a predetermined manner to the first portion 2. Bolts 12 screw the pins 8, 9 (via attachment flanges of the pins) to yoke legs 11 of the first portion 2.

The second portion 5 comprises a center wall 13 extending in the longitudinal direction X and the vertical direction Z, the third through hole 6 and fourth through hole 7 extend through the center wall 13.

The first portion 2 has a yoke-like shape, wherein the yoke legs 11 of the first portion 2 comprise the first and second through holes 3, 4, and wherein the center wall comprises the third and fourth through holes 6, 7.

Direction sensitive magnetic field sensor(s) L is/are configured to detect force components of shear forces introduced into the pins 8, 9 by the first portion 2 and the second portion 5.

Side walls 14 of the second portion 5 comprise through holes in side walls that are larger than the third and fourth through holes 6, 7, such that the shear forces are introduced into the pins 8, 9 by abutment surfaces of the first and second through holes 3, 4 in the yoke legs 11 and abutment surfaces of the third and fourth through holes 6, 7 in the center wall 13.

The tow coupling 100 comprises the sensor assembly 1. The first portion 2 is a hitch assembly that is attached to the chassis 101 of a car.

The second portion 5 is a receiving tube that is configured to receive a draw bar 102 (hitch bar, ball mount) of the tow coupling 100. The draw bar 102 can be partially inserted into the second portion 5. A pin 103 secures the draw bar 102 to the second portion 5.

FIG. 3 is a simplified exploded view of a second portion. The second portion 5 is of tubular (extruded) shape comprising a vertical center wall extending along the longitudinal direction X.

The center wall 13 comprises the third through hole 6 and the fourth through hole 7.

The center wall 13 can be welded into a corresponding slit in the second portion 5. The center wall 14 thereby forms a part of the second portion 5.

The second portion 5 further comprises a draw bar barrier 99. The draw bar barrier can be formed by an abutment surface of the center wall 13. Alternatively, the draw bar barrier can be formed by an abutment edge or a bolt/pin extending (in a substantially radial direction) into the inside of the tubular second portion. The draw bar barrier 99 hinders a draw bar from contacting the first and second pins 8, 9.

Figure 4:
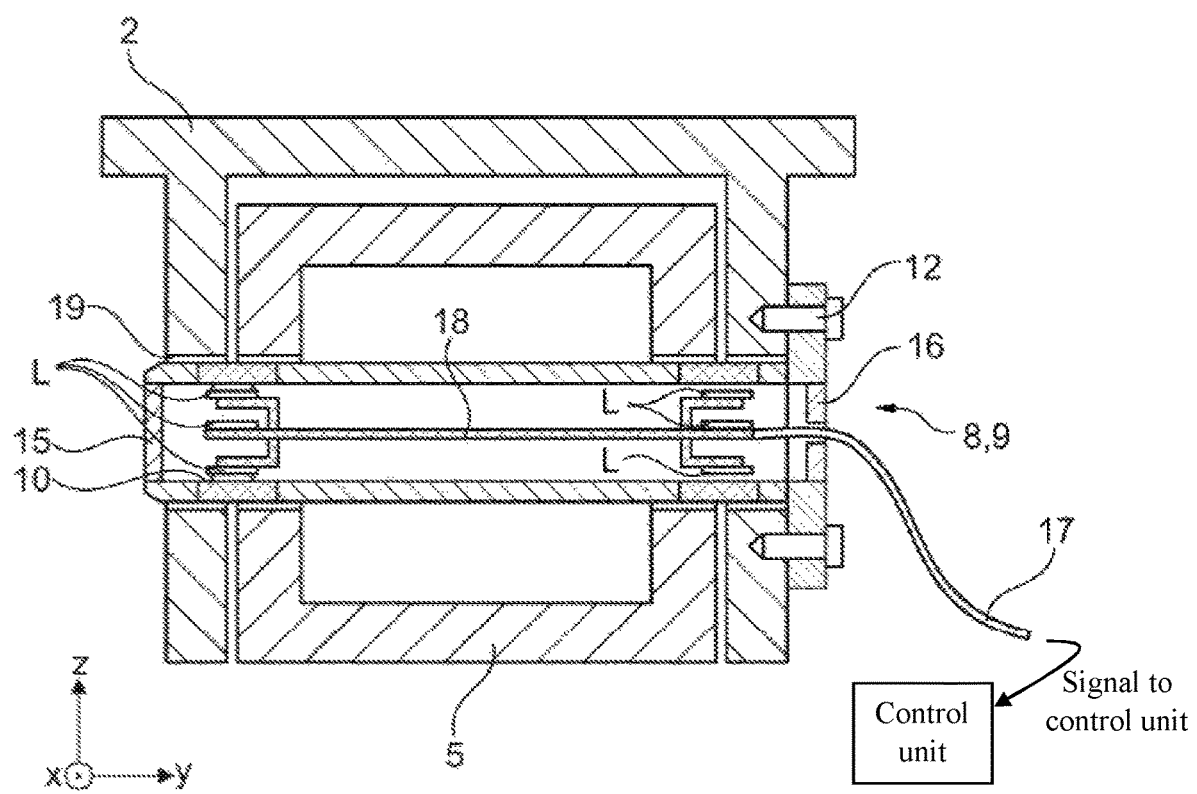
FIG. 4 is a simplified cross-sectional view of a sensor assembly.

FIG. 4 is a simplified cross-sectional view of a sensor assembly. The first and second pins 8, 9 extend through the first through hole 3 and the second through hole 4 in the first portion 2 and through the third through hole 6 and the fourth through hole 7 in the second portion 5.

The first and/or second pin 8, 9 is an at least partially hollow pin. The hollow pin can be sealed by a front cover 15 and a rear cover 16. The rear cover 16 can provide a cable bushing to provide access for supply and/or signal lines 17.

The pins 8, 9 comprise a plurality of direction sensitive field sensors L. A printed circuit board 18 supports the direction sensitive field sensors L.

The pins 8, 9 can comprise one or more collars 19 of comparatively low magnetic permeability (compared to the hollow shaft of the pins 8, 9) arranged such that the positions of the one or more collars 19 substantially correspond to one or more of the positions of the through holes 3, 4, 6, 7 in the first and/or second portion.

Alternatively, one or more of the through holes 3, 4, 6, 7 can comprise a collar/bushing 19 of comparatively low magnetic permeability (compared to the hollow shaft of the pins 8, 9).

The first portion 2 and the second portion 5 can be configured to provide a gap between the first portion 2 and the second portion 5. The gap can comprise a material of low magnetic permeability (compared to the hollow shaft of the pins 8, 9).

Figure 5A:
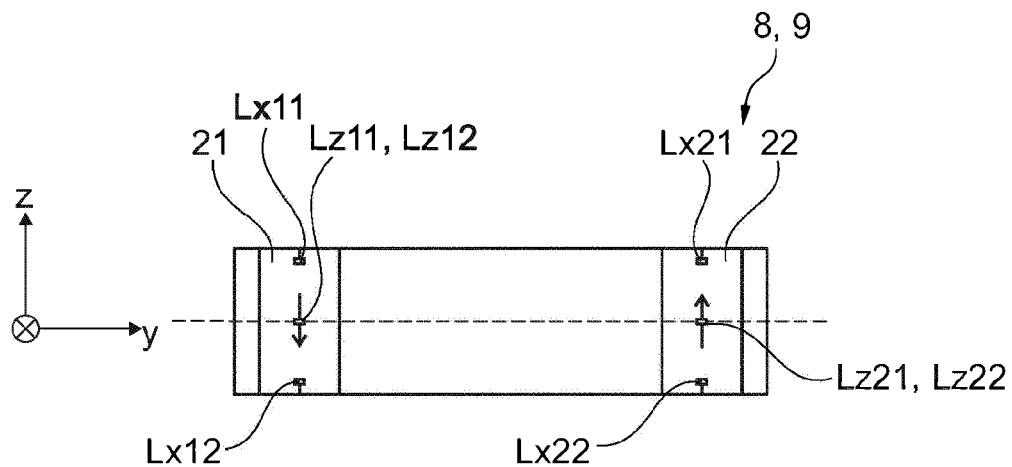
FIG. 5a is a simplified cross-sectional view of a pin.
Figure 5B:
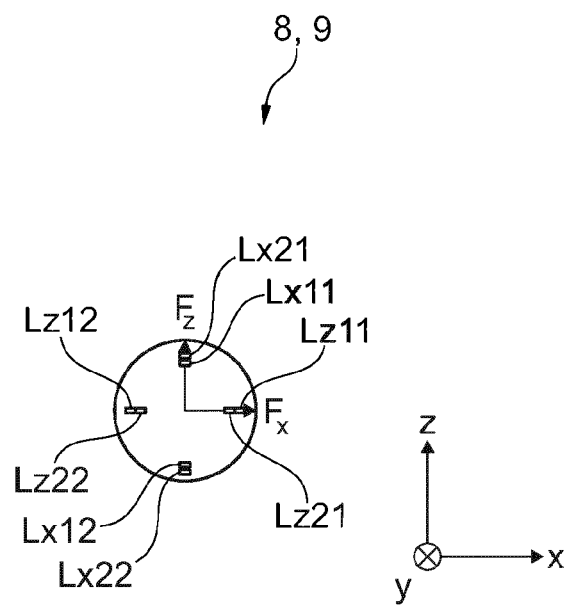
FIG. 5b is another simplified cross-sectional view of the pin.

FIGS. 5a, 5b are simplified cross-sectional simplified views of a first and/or second pin 8, 9. The first and/or second pin 8, 9 comprises a first magneto-elastically active region 21 and a second magneto-elastically active region 22.

The first magneto-elastically active region 21 is directly or indirectly attached to or form parts of the pin 8, 9, in such a manner that mechanic (shear) stress applied to the pin 8, 9 is at least partially transmitted to the first magneto-elastically active region 21.

The second magneto-elastically active region 22 is directly or indirectly attached to or form parts of the pin 8, 9, in such a manner that mechanic (shear) stress applied to the pin 8, 9 is at least partially transmitted to the second magneto-elastically active region 22.

Each magneto-elastically active region comprises a magnetically polarized region. The magnetic polarization of the first magneto-elastically active region 21 and the magnetic polarization of the second magneto-elastically active region 22 can be substantially opposite to each other.

The magnetic field sensor means comprises at least one first direction sensitive magnetic field sensor Lx1, Lz1 being arranged approximate the first magneto-elastically active region 21 for outputting a first signal corresponding to a stress-induced magnetic flux emanating from the first magnetically polarized region 21.

The magnetic sensor means comprises at least one second direction sensitive magnetic field sensor Lx2, Lz2 being arranged approximate the second magneto-elastically active region 22 for outputting a second signal corresponding to a stress-induced magnetic flux emanating from the second magnetically polarized region 22.

The at least one out of the first and the second pin 8, 9 comprises at least one X-direction sensitive magnetic field sensor Lx configured to detect a force component Fx1 in a longitudinal direction X that is defined by a direction of longitudinal extension of the second portion 5.

The at least one out of the first and the second pin 8, 9 comprises at least one Z-direction sensitive magnetic field sensor Lz configured to detect a force component Fz1 in a vertical direction Z, that is substantially perpendicular to the longitudinal direction X and perpendicular to the transversal direction Y of longitudinal extension of the at least one out of the first and second pin 8, 9.

Advantageously, the first and/or the second pin 8, 9 comprises a first magneto-elastically active region 21 and a second magneto-elastically active region 22, which are directly or indirectly attached to or form parts of the respective pin 8, 9 in such a manner that mechanic stress that is applied to the pin 8, 9 is transmitted to the magneto-elastically active regions.

Each magneto-elastically active region 21, 22 comprises a magnetically polarized region. The magnetic polarization of the first magneto-elastically active region 21 and the magnetic polarization of the second magneto-elastically active region 22 can be substantially opposite to each other.

The magnetic field sensor means comprises at least one first direction sensitive magnetic field sensor L1 being arranged approximate the first magneto-elastically active region for outputting a first signal corresponding to a stress-induced magnetic flux emanating from the first magnetically polarized region 21.

The magnetic sensor means comprises at least one second direction sensitive magnetic field sensor L2 being arranged approximate the second magneto-elastically active region 22 for outputting a second signal corresponding to a stress-induced magnetic flux emanating from the second magnetically polarized region 22.

The first and/or the second pin 8, 9 comprises at least one respective first X-direction sensitive magnetic field sensor Lx11, Lx12 configured to detect a force component Fx1 in the first magneto-elastically active region 21 in the longitudinal direction X.

The first and/or the second pin 8, 9 comprises at least one respective second X-direction sensitive magnetic field sensor Lx21, Lx22 configured to detect a force component Fx2 in the second magneto-elastically active region 22 in the longitudinal direction X.

The first and/or the second pin 8, 9 comprises at least one respective first Z-direction sensitive magnetic field sensor Lz11, Lz12 configured to detect a force component Fz1 in the first magneto-elastically active region 21 in the vertical direction Z.

The first and/or the second pin 8, 9 comprises at least one second Z-direction sensitive magnetic field sensor Lz21, Lz22 configured to detect a force component Fz2 in the second magneto-elastically active region in the vertical direction Z.

The sensor means comprises at least four magnetic field sensors L having a first to fourth sensing direction, wherein the sensing directions S and a shaft axis A (compare FIGS. 6 and 7) are at least substantially parallel to each other. The first to fourth magnetic field sensors are arranged along the circumference of the pin having substantially equal distances in circumferential direction between each other.

The at least one magneto-elastically active region projects along a circumference of the respective pin, and wherein said region is magnetized in that the domain magnetizations in the magnetically polarized region are in a circumferential direction of the member.

Figure 6:
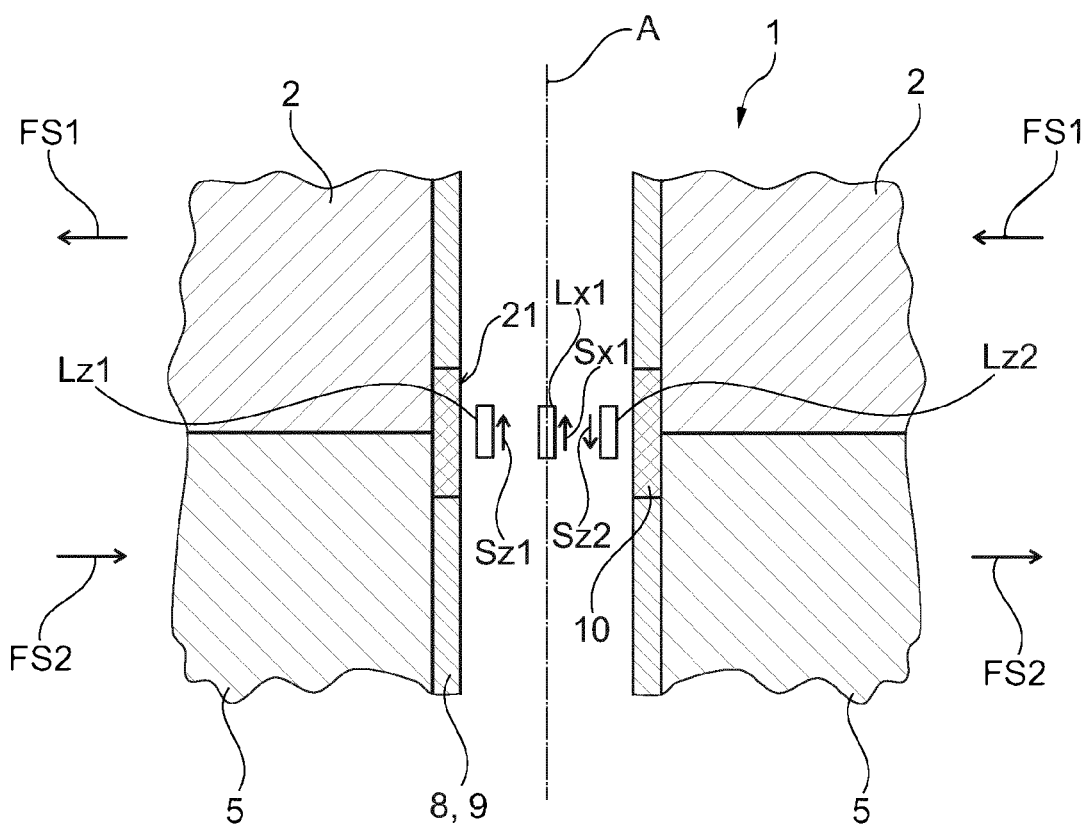
FIG. 6 is a simplified cross-sectional view of a sensor assembly for force sensing.

FIG. 6 is a simplified cross section of a sensor assembly 1 according to an embodiment of the invention. The sensor assembly 1 comprises a first portion 2, which is coupled to a second portion 5 via the pin 8, 9. The first portion 2 is subject to a first shear force FS1 pointing to the left. The second portion 5 is exposed to a second and opposite shear force FS2, pointing to the right. The pin 8, 9 comprises a magneto-elastically active region 21, which is arranged at the transition between the first and the second portion 2, 5. Consequently, the active region 21 is subject to shear forces causing the magnetic flux emanating from the magnetically polarized region of said active region 21 to become increasingly helically shaped, when the shear forces FS1, FS2 increase. The sensor means of the pin 8, 9 comprises four direction sensitive magnetic field sensors Lx1, Lx2, Lz1, Lz2 being arranged along the inner circumference of the pin 8, 9.

Figure 7:
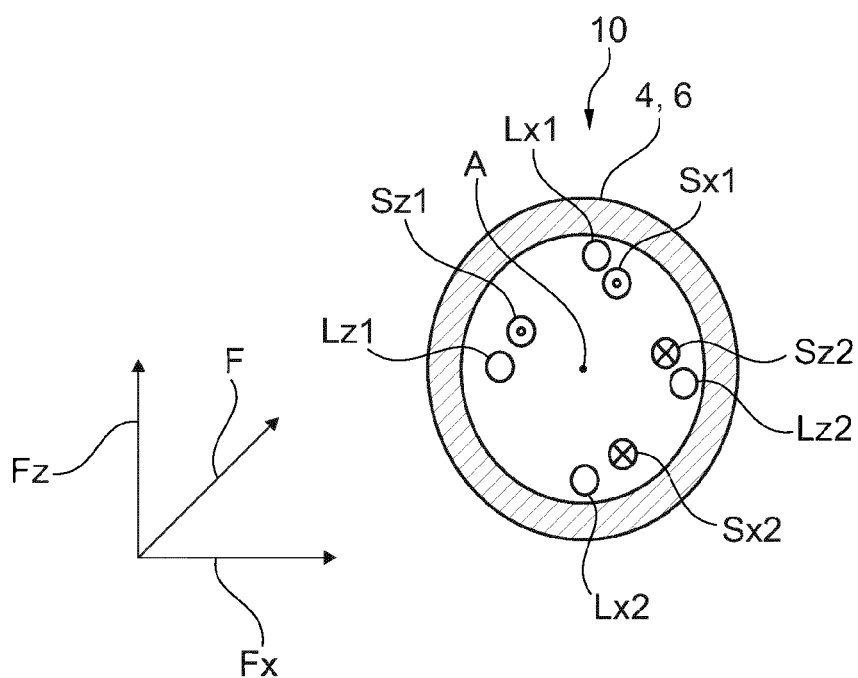
FIG. 7 is another simplified cross-sectional view of the sensor assembly.

The configuration of the direction sensitive magnetic field sensors Lx1, Lx2, Lz1, Lz2 is explained in more detail by making reference to the simplified cross section of the sensor assembly 1, which is shown in FIG. 7. The cross-sectional plane is arranged to be substantially perpendicular to the shaft axis A. The first direction sensitive sensor Lx1 and the third direction sensitive sensor Lx2 form a first group of magnetic field sensors. The second group of sensors consists of the second direction sensitive sensor Lz1 and the fourth direction sensitive sensor Lz2. The sensing direction Sx1 of the first sensor Lx1 is 180° opposite to the third sensing direction Sx2 of the third sensor Lx2. This is indicated in the figure using the conventional signs. The first sensing direction Sx1 points out of the paper plane, the third sensing direction Sx2 points into the paper plane. Similar to the first group of sensors Lx1, Lx2, the second sensing direction Sz1 and the fourth sensing direction Sz2 are 180° opposite to each other. The second and fourth sensor Lz1, Lz2 are arranged accordingly. As it is indicated using the commonly known direction signs, the second sensing direction Sz1 points out of the paper plane while the fourth sensing direction Sz2 is directed into the paper plane.

The second sensor Lz1 (having the second sensing direction Sz1) and the fourth sensor Lz2 (having the fourth sensing direction Sz2) are shown in the simplified cross section of FIG. 7. The first sensor Lx1 and the first sensing direction Sx1 are added to the simplified cross section of FIG. 7 solely for clarification of the configuration of the sensors. Naturally, the first sensor Lx1 is not arranged in a common plane with the second and fourth sensor Sz1, Sz2, as it is shown in the cross section of FIG. 7.

When the pin 8, 9 is exposed to the first and second shear stress forces FS1, FS2, the signals of the first group of sensors (comprising the first and the third sensor Lx1, Lx2) is analyzed so as to determine a first component of a force F inducing the respective shear stress forces FS1, FS2. In a Cartesian coordinate system, this first component may be identified with the X-component Fx of the applied force F. The evaluation of the measurement values of the sensors of the second group (i. e. the second sensor Lz1 and the fourth sensor Lz2) results in a value for a second component of the force F. Within the same Cartesian coordinate system, this second force is identified with the Z-component of the force F, i. e. the force component Fz.

Figure 8:
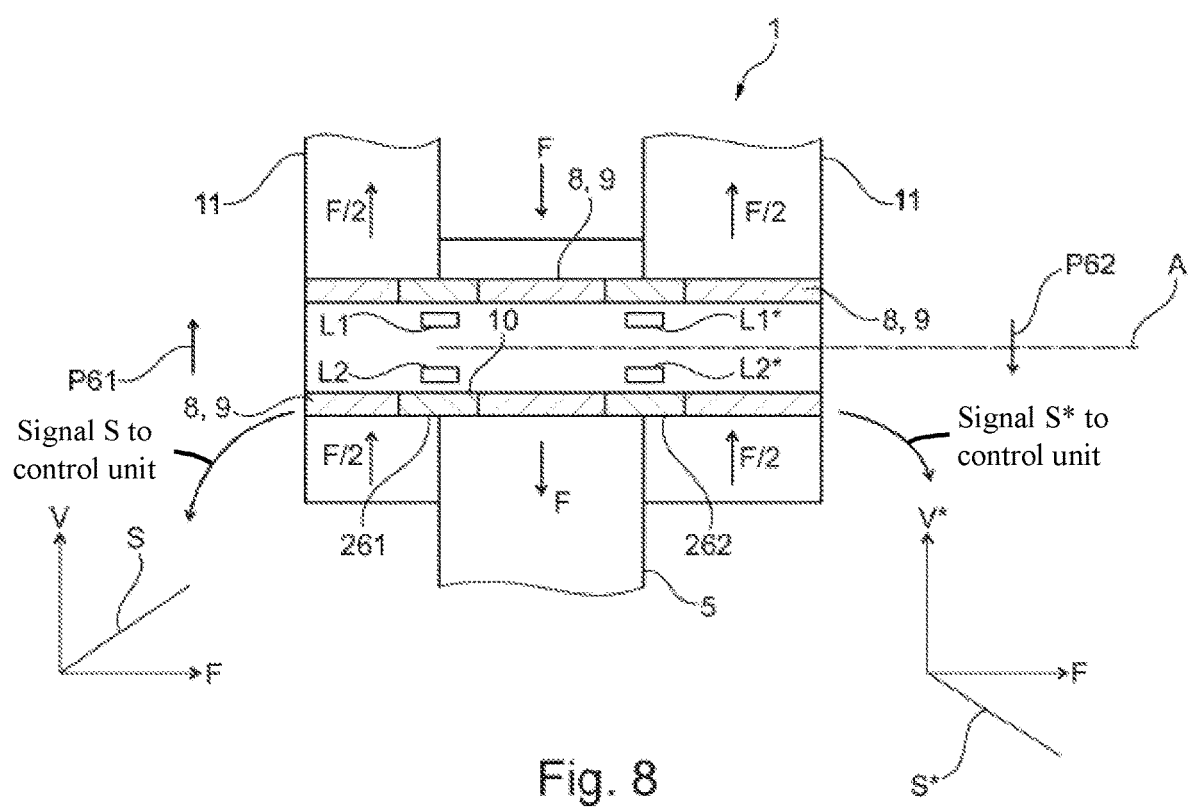
FIG. 8 is a simplified cross-sectional view of a sensor assembly for force sensing.

FIG. 8 is a cross section of a magneto-elastic sensor assembly 2 according to another embodiment of the invention. The first portion 2 surrounds the second portion 5, which is exposed to a force F. The pin 8, 9 intersects the first and the second portions 2, 5 along the shaft axis A. The pin 8, 9 comprises a first magneto-elastically active region 261 and a second magneto-elastically active region 262. Similar to the other embodiments of the invention, these are directly or indirectly attached to or form a part of the pin 8, 9 in such a manner that the mechanic stress is transmitted to the active regions 261, 262. The active regions 261, 262 are magnetically polarized in opposite direction. This is illustrated by the first polarization P61 of the first active region 261 and the second polarization P62 of the second active region 262. The magnetic polarizations P61, P62 are substantially 180° opposite to each other. Furthermore, they are substantially perpendicular to the shaft axis A.

A first pair of magnetic field sensors comprising a first sensor L1 and a second sensor L2 is arranged inside the pin 8, 9 in that this pair of sensors cooperates with the first active region 261. Similar, a second pair of magnetic field sensors comprising a first and a second sensor L1* and L2* is arranged inside the pin 8, 9 so as to interact with the second active region 262. The sensors L1, L2 of the first pair and the sensors L1*, L2* of the second pair are arranged approximate the first and the second magneto-elastically active region 261, 262, respectively. The first sensor pair L1, L2 outputs a first signal S, which is illustrated as a voltage V varying with the applied force F in the lower left of FIG. 8. The signal S corresponds to a stress-induced magnetic flux emanating from the first magnetically polarized region 261.

Similarly, the second pair of magnetic sensors L1*, L2* outputs a second signal S* corresponding to a stress-induced magnetic flux emanating from the second magnetically polarized region 262. This signal S* is also a voltage V* varying with the applied F (see lower right of FIG. 8). However, the slope of the second signal S* is opposite to that of the first signal S. A control unit (FIGS. 4 and 8) of the magneto-elastic sensor assembly is configured for determination of the force F inducing a stress in the pin(s) 8, 9. The control unit performs a differential evaluation of the signals S and S* of the first pair of sensors L1, L2 and the second pair of sensors L1*, L2*. This differential evaluation advantageously doubles the sensitivity of the signal, which is correlated with the applied stress. Because the polarization P61 and P62 of the first and second magnetically active region 261, 262 is opposite to each other, theoretically possible external fields are compensated. The magneto-elastic sensor assembly according to this embodiment is more sensitive and less susceptible to errors.

Advantageously, all embodiments of the invention may be equipped with the sensor configuration of FIG. 8 having separate, oppositely polarized active regions 261, 262 and two corresponding sets i.e. pairs of sensors L1, L2 and L1*, L2*.

Furthermore, the embodiment of FIG. 8 may be equipped with the sensor configuration, which is known from the load pin in FIG. 6 or 7. In other words, the sensor pairs L1, L2 and L1*, L2* may be replaced by a sensor configuration having four sensor pairs Lx11/Lx12, Lx21/Lx22, Lz11/Lz12, Lz21/Lz22, which is exemplarily shown in FIG. 5. According to this particular embodiment of the invention, additional force vectors may be determined.

Figure 9:
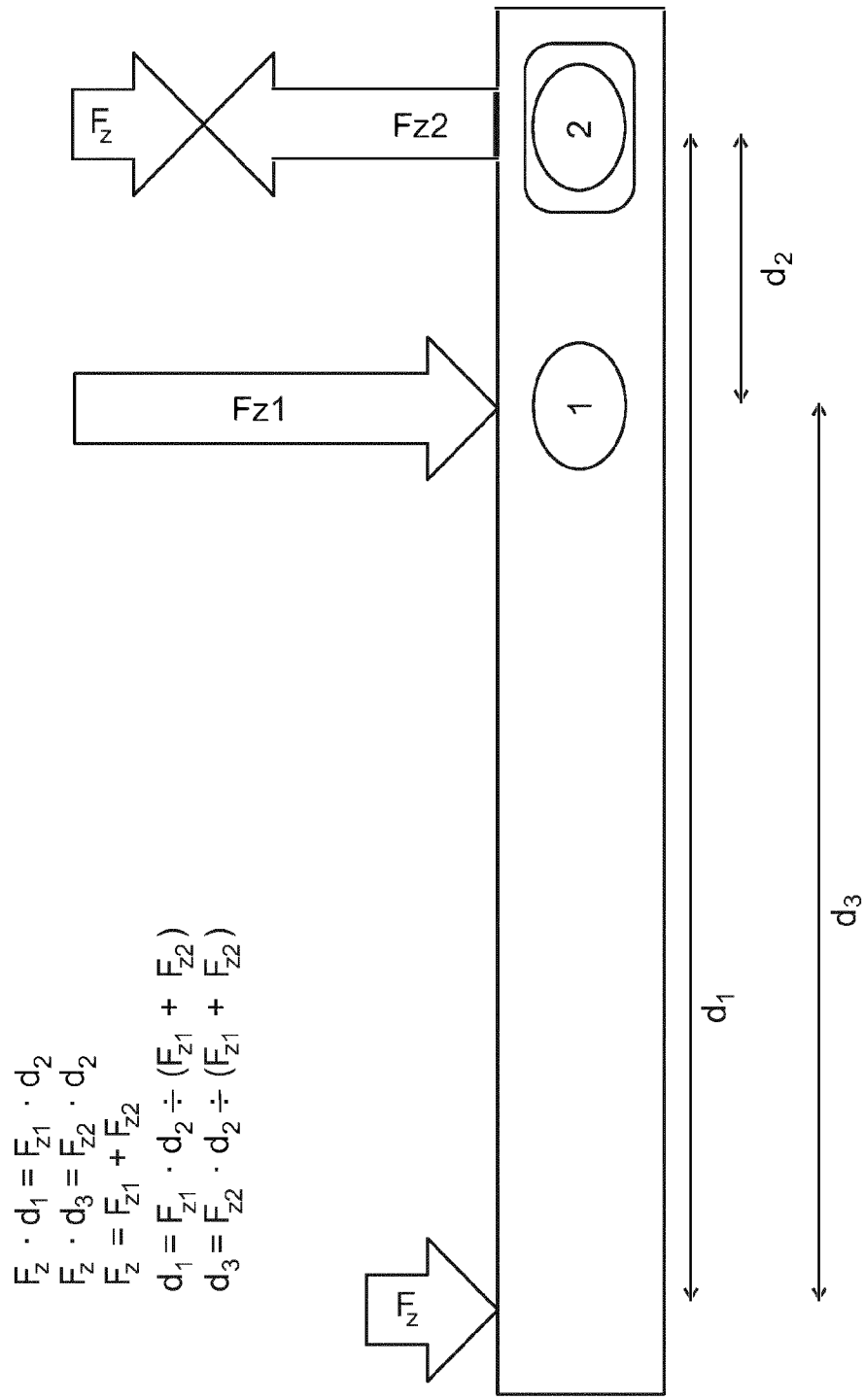
FIG. 9 is a simplified side view of a sensor assembly detecting a first simplified load case.

FIG. 9 is a simplified side view of a sensor assembly 1 detecting a simplified first load case. The force F has a vertical force component Fz in the vertical direction Z. The force F is applied to the sensor assembly via the second portion 5, and more precisely via the ball coupling 104 of the draw bar 102.

For determining the force component Fz the following set of equations have to be solved.

$$Fz*d1=Fz1*d2 \tag{1}$$

$$Fz*d3=Fz2*d2 \tag{2}$$

$$Fz=Fz1+Fz2 \tag{3}$$

$$d1=Fz1*d2/(Fz1+Fz2) \tag{4}$$

$$d3=Fz2*d2/(Fz1+Fz2) \tag{5}$$

F1 is a reaction force on the first pin 8, F2 is a reaction force on the second pin 9. D2 is the distance between (the axes of) the first and the second pin 8, 9. D1 is the distance between the point of load (the ball coupling) and (the axis of) the second pin. D3 is the distance between the point of load and (the axis of) the first pin.

Figure 10:
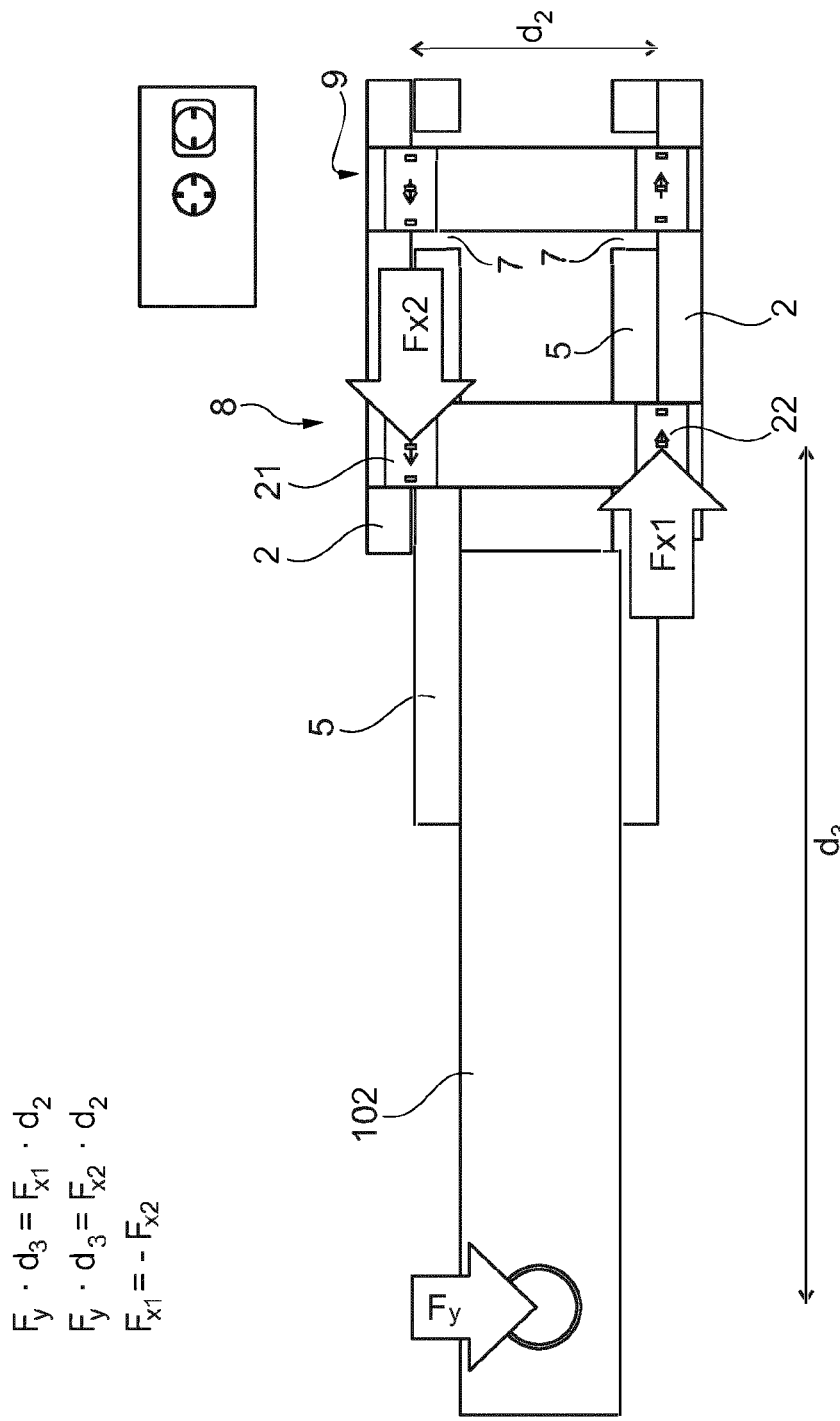
FIG. 10 is a simplified top view of a sensor assembly detecting a second simplified load case.

FIG. 10 is a simplified top view of a sensor assembly detecting a simplified second load case. The force has a transversal force component Fy in the transversal direction Y applied to the sensor assembly 1 via the second portion 5, and more precisely via the ball coupling 104 of the draw bar 102.

The fourth through hole 7 provides a degree of freedom in the longitudinal direction X.

The transversal force component Fy creates a first reactive force Fx2 acting in the longitudinal direction X on the first magneto-elastically active region 21 of the first pin 8, and a second reactive force Fx1 acting in the longitudinal direction X on the second magneto-elastically active region 22 of the first pin 8.

For determining the force component Fy the following set of equations have to be solved.

$$Fy*d3=Fx1*d2 \tag{6}$$

$$Fy*d3=Fx2*d2 \tag{7}$$

$$Fx1=-Fx2 \tag{8}$$

Figure 11:
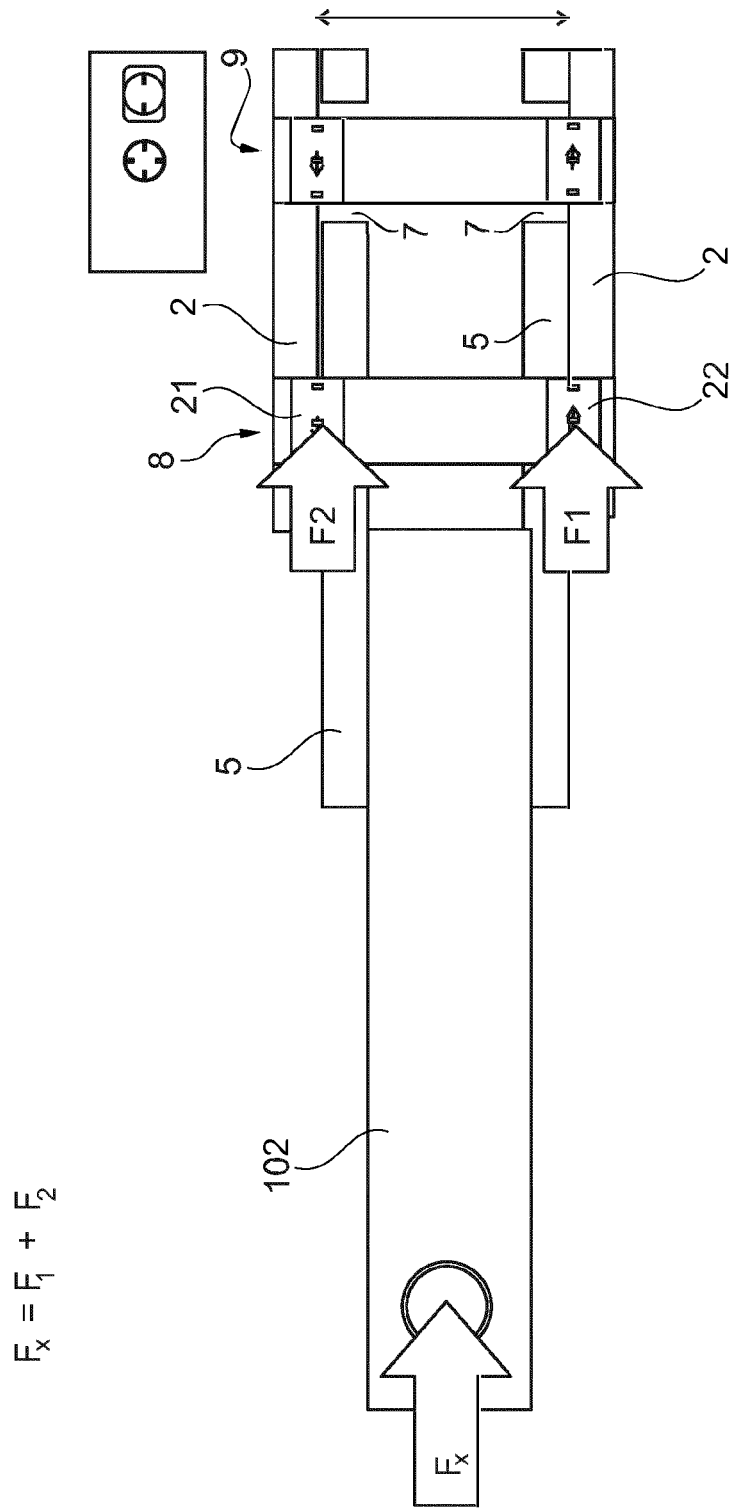
FIG. 11 is a simplified top view of a sensor assembly detecting a third simplified load case.

FIG. 11 is a simplified top view of a sensor assembly detecting a simplified third load case. The force has a longitudinal force component Fx in the longitudinal direction X applied to the to the sensor assembly 1 via the second portion 5, and more precisely via the ball coupling 104 of the draw bar 102.

The fourth through hole 7 provides a degree of freedom in the longitudinal direction X.

The longitudinal force component Fx creates a first reactive force Fx2 acting in the longitudinal direction X on the first magneto-elastically active region 21 of the first pin 8, and a second reactive force Fx1 acting in the longitudinal direction X on the second magneto-elastically active region 22 of the first pin 8.

For determining the force component Fx the following equation has to be solved.

$$Fx = Fx1 + Fx2 \qquad (9)$$

Figure 12:
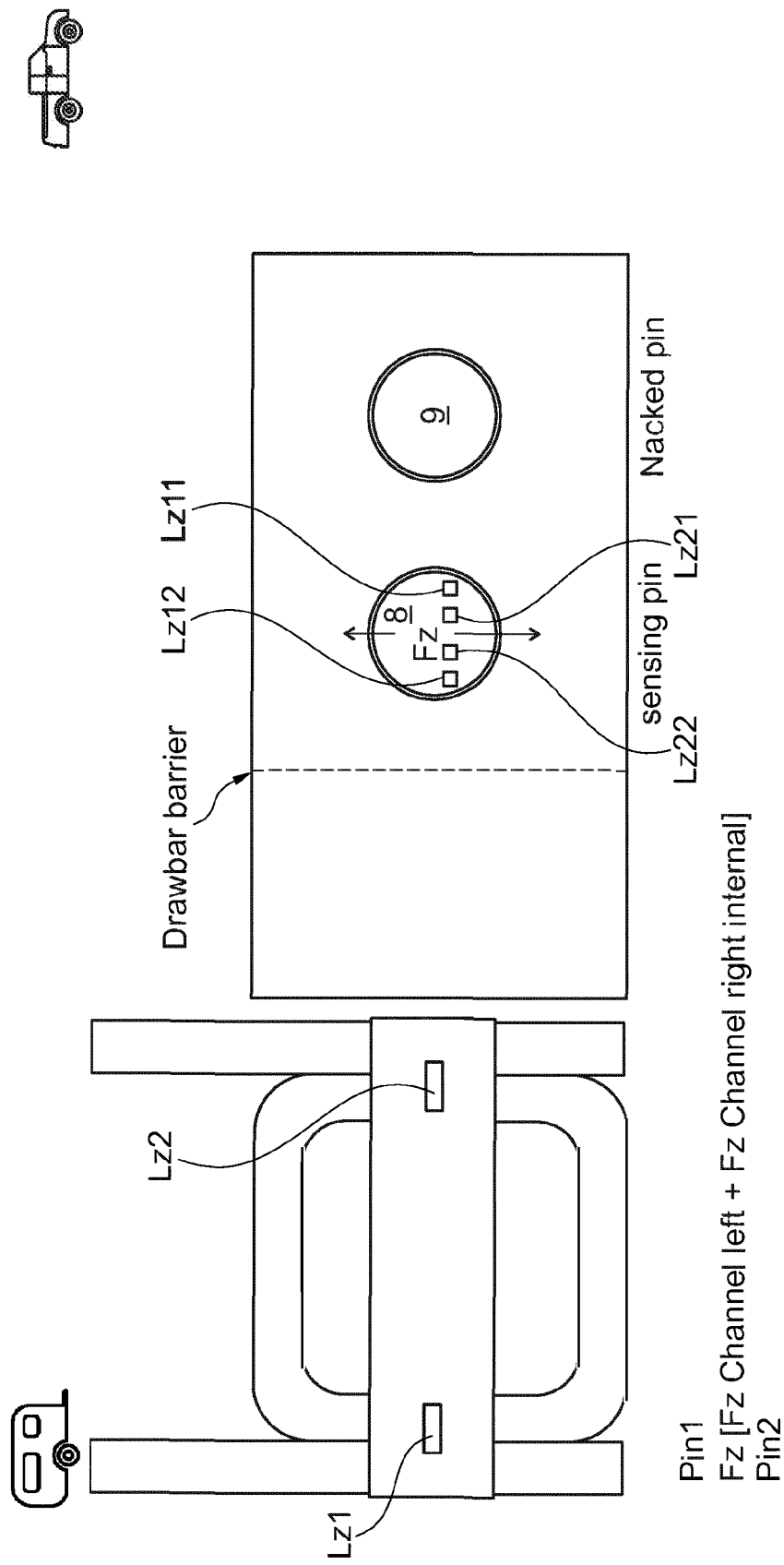
FIG. 12 is a simplified cross-sectional view of a sensor assembly configured to detect a vertical load component Fz of a load F.

FIG. 12 is a simplified cross-sectional view of a sensor assembly configured to detect a vertical load component Fz of a load F.

The first pin 8 comprises a first magneto-elastically active region 21 and a second magneto-elastically active region 22, which are directly or indirectly attached to or form parts of the first pin 8 in such a manner that mechanic stress that is applied to the first pin 8 is transmitted to the magneto-elastically active regions 21, 22.

Each magneto-elastically active region 21, 22 comprises a magnetically polarized region.

The magnetic polarization of the first magneto-elastically active region 21 and the magnetic polarization of the second magneto-elastically active region 22 can be substantially opposite to each other.

The magnetic field sensor means comprises at least one first direction sensitive magnetic field sensor Lz11 being arranged approximate the first magneto-elastically active region for outputting a first signal corresponding to a stress-induced magnetic flux emanating from the first magnetically polarized region 21.

The magnetic sensor means further comprises at least one second direction sensitive magnetic field sensor Lz21 being arranged approximate the second magneto-elastically active region 22 for outputting a second signal corresponding to a stress-induced magnetic flux emanating from the second magnetically polarized region 22.

The first pin 8 comprises a first and a third Z-direction sensitive magnetic field sensor Lz11, Lz12 configured to detect a force component Fz1 in the first magneto-elastically active region 21 in the vertical direction Z.

The first pin 8 further comprises a second and a fourth Z-direction sensitive magnetic field sensor Lz21, Lz22 configured to detect a force component Fz2 in the second magneto-elastically active region in the vertical direction Z.

The second pin 9 is a naked pin, i.e. the second pin comprises no magneto-elastically active region and no direction sensitive magnetic field sensors.

Differently stated, the first pin 8 comprises at least one first Z-direction sensitive magnetic field sensor Lz11 and at least one second Z-direction sensitive magnetic field sensor Lz21.

The first and second pins 8, 9 are rigidly fixed within the first and second through holes 3, 4 of the first portion 2.

The third and the fourth through holes 6, 7 can provide a minimal gap between the abutment surfaces of the second portion 5 and the first and second pins 8, 9.

Figure 13:
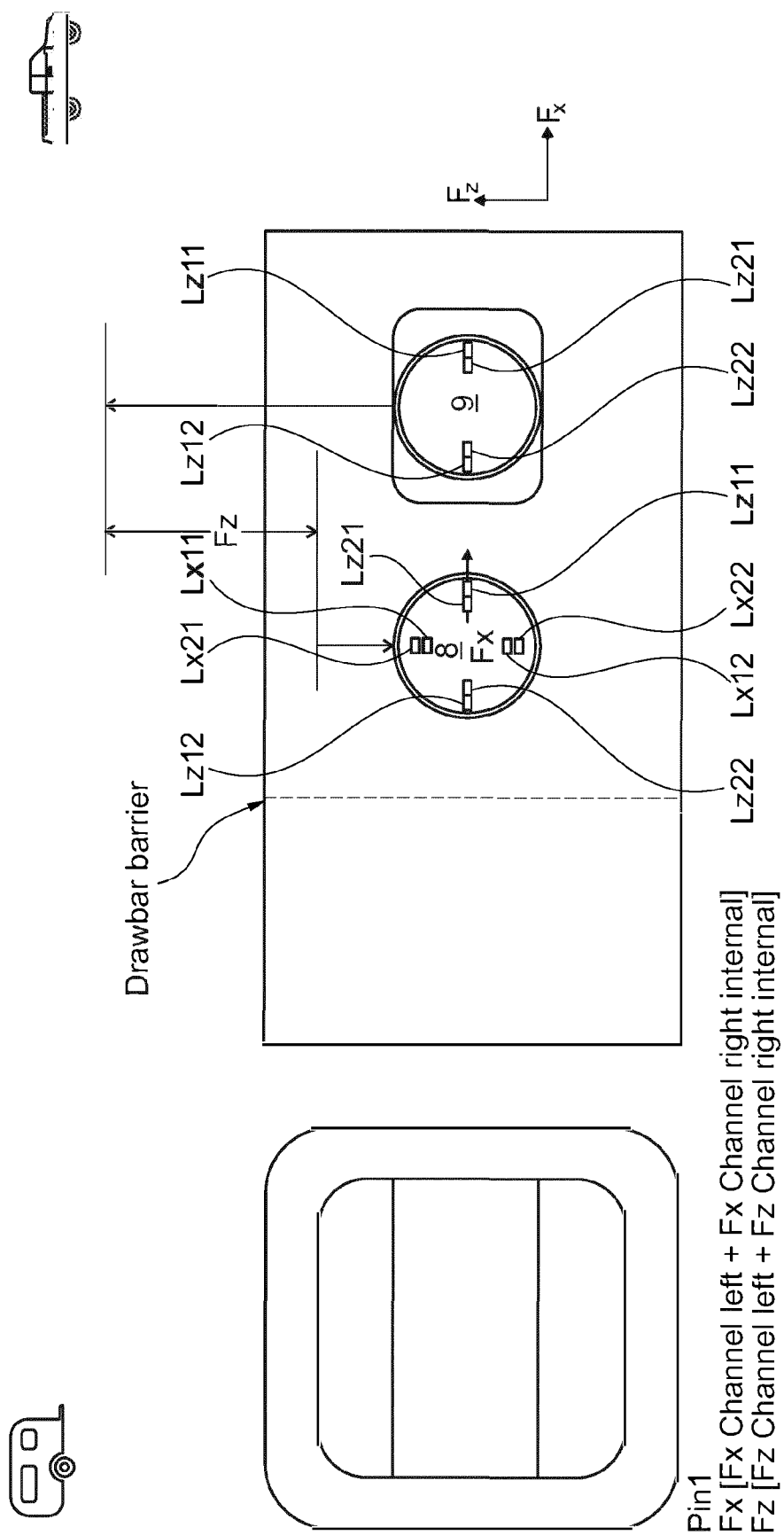
FIG. 13 is a simplified cross-sectional view of a sensor assembly configured to detect a vertical load component Fz, a transversal load component Fy, and a longitudinal load component Fx of a load F.

FIG. 13 is a simplified cross-sectional view of a sensor assembly configured to detect a vertical load component Fz, a transversal load component Fy, and a longitudinal load component Fx of a load F.

The first pin 8 comprises a first magneto-elastically active region 21 and a second magneto-elastically active region 22, which are directly or indirectly attached to or form parts of the first pin 8 in such a manner that mechanic stress that is applied to the first pin 8 is transmitted to the magneto-elastically active regions 21, 22.

Each magneto-elastically active region 21, 22 comprises a magnetically polarized region.

The magnetic polarization of the first magneto-elastically active region 21 and the magnetic polarization of the second magneto-elastically active region 22 can be substantially opposite to each other.

The magnetic field sensor means comprises at least one first and third direction sensitive magnetic field sensor Lx11, Lz11 being arranged approximate the first magneto-elastically active region for outputting a first signal and a third signal corresponding to a stress-induced magnetic flux emanating from the first magnetically polarized region 21.

The magnetic sensor means further comprises at least one second and fourth direction sensitive magnetic field sensor Lx21, Lz21 being arranged approximate the second magneto-elastically active region 22 for outputting a second signal and a fourth signal corresponding to a stress-induced magnetic flux emanating from the second magnetically polarized region 22.

The first pin 8 comprises a first and a third Z-direction sensitive magnetic field sensor Lz11, Lz12 configured to detect a vertical force component Fz11 in the first magneto-elastically active region 21 in the vertical direction Z.

The first pin 8 further comprises a second and a fourth Z-direction sensitive magnetic field sensor Lz21, Lz22 configured to detect a vertical force component Fz12 in the second magneto-elastically active region in the vertical direction Z.

The first pin 8 comprises a first and a third X-direction sensitive magnetic field sensor Lx11, L12 configured to detect a longitudinal force component Fx2 in the first magneto-elastically active region 21 in the longitudinal direction X.

The first pin 8 further comprises a second and a fourth X-direction sensitive magnetic field sensor Lx21, Lx22 configured to detect a longitudinal force component Fx1 in the second magneto-elastically active region in the longitudinal direction X.

The second pin 9 comprises a first and a third Z-direction sensitive magnetic field sensor Lz11, Lz12 configured to detect a vertical force component Fz21 in the first magneto-elastically active region 21 in the vertical direction Z.

The second pin 9 further comprises a second and a fourth Z-direction sensitive magnetic field sensor Lz21, Lz22 configured to detect a vertical force component Fz22 in the second magneto-elastically active region in the vertical direction Z.

Differently stated, the first pin 8 comprises at least one first X-direction sensitive magnetic field sensor Lx11, at least one second X-direction sensitive magnetic field sensor Lx21, at least one first Z-direction sensitive magnetic field sensor Lz11, and the at least one second Z-direction sensitive magnetic field sensor Lz21. The second pin 9 comprises at least one first Z-direction sensitive magnetic field sensor Lz11 and at least one second Z-direction sensitive magnetic field sensor Lz21.

The first and second pins 8, 9 are rigidly fixed within the first and second through holes 3, 4 of the first portion 2.

The third and the fourth through holes 6, 7 can provide a minimal gap between the abutment surfaces of the second portion 5 and the first and second pins 8, 9.

Figure 14:
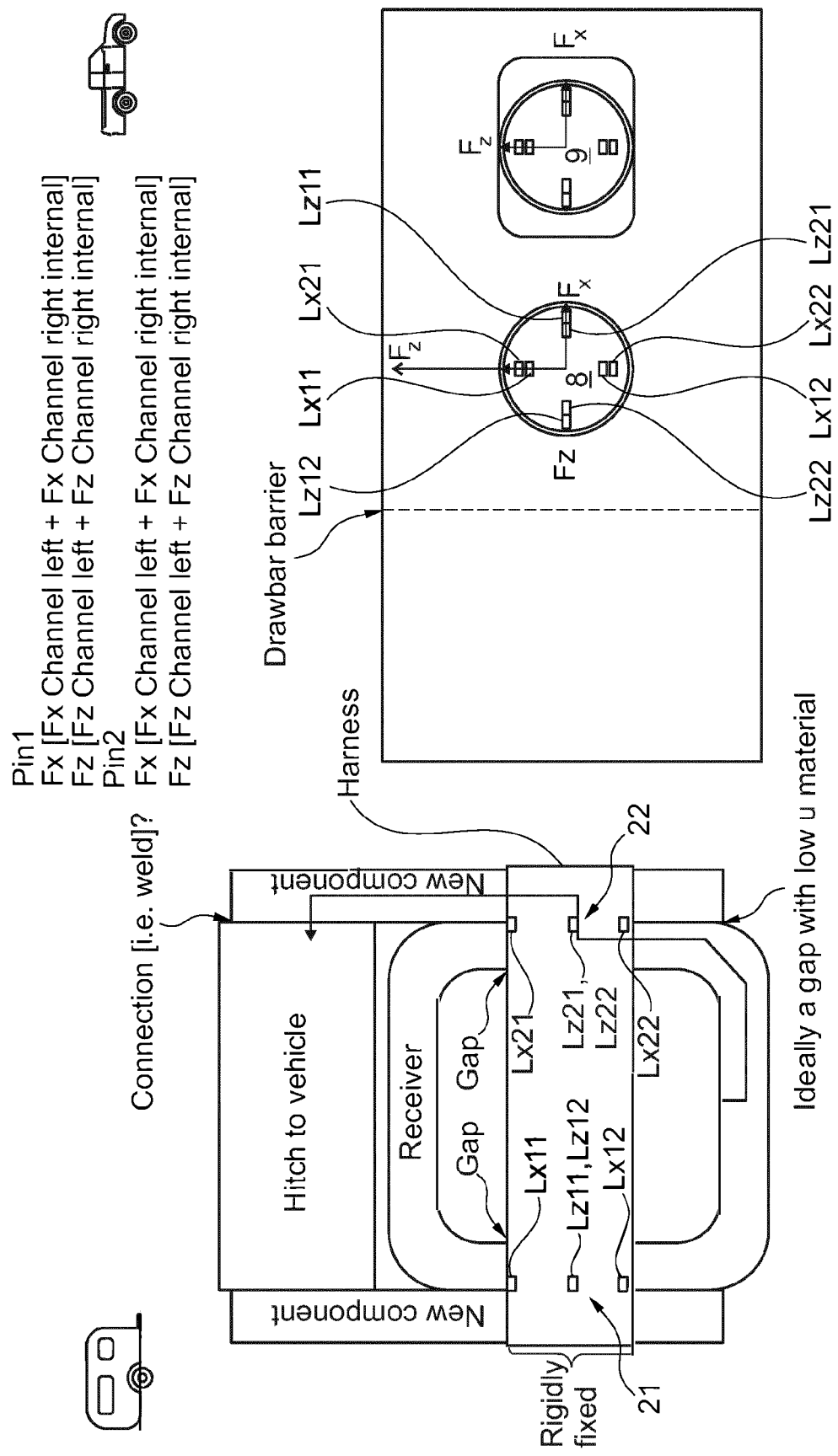
FIG. 14 is a simplified cross-sectional view of a sensor assembly configured to detect a vertical load component Fz, a transversal load component Fy, and a longitudinal load component Fx of a load F.

FIG. 14 is a simplified cross-sectional view of a sensor assembly configured to detect a vertical load component Fz, a transversal load component Fy, and a longitudinal load component Fx of a load F.

The first pin 8 comprises a first magneto-elastically active region 21 and a second magneto-elastically active region 22, which are directly or indirectly attached to or form parts of the first pin 8 in such a manner that mechanic stress that is applied to the first pin 8 is transmitted to the magneto-elastically active regions 21, 22.

Each magneto-elastically active region 21, 22 comprises a magnetically polarized region.

The magnetic polarization of the first magneto-elastically active region 21 and the magnetic polarization of the second magneto-elastically active region 22 can be substantially opposite to each other.

The magnetic field sensor means comprises at least one first and third direction sensitive magnetic field sensor Lx11, Lz11 being arranged approximate the first magneto-elastically active region for outputting a first signal and a third signal corresponding to a stress-induced magnetic flux emanating from the first magnetically polarized region 21.

The magnetic sensor means further comprises at least one second and fourth direction sensitive magnetic field sensor Lx21, Lz21 being arranged approximate the second magneto-elastically active region 22 for outputting a second signal and a fourth signal corresponding to a stress-induced magnetic flux emanating from the second magnetically polarized region 22.

The first pin 8 comprises a first and a third Z-direction sensitive magnetic field sensor Lz11, Lz12 configured to detect a vertical force component Fz11 in the first magneto-elastically active region 21 in the vertical direction Z.

The first pin 8 further comprises a second and a fourth Z-direction sensitive magnetic field sensor Lz21, Lz22 configured to detect a vertical force component Fz12 in the second magneto-elastically active region in the vertical direction Z.

The first pin 8 comprises a first and a third X-direction sensitive magnetic field sensor Lx11, L12 configured to detect a longitudinal force component Fx2 in the first magneto-elastically active region 21 in the longitudinal direction X.

The first pin 8 further comprises a second and a fourth X-direction sensitive magnetic field sensor Lx21, Lx22 configured to detect a longitudinal force component Fx1 in the second magneto-elastically active region in the longitudinal direction X.

The second pin 9 comprises a first and a third Z-direction sensitive magnetic field sensor Lz11, Lz12 configured to detect a vertical force component Fz21 in the first magneto-elastically active region 21 in the vertical direction Z.

The second pin 9 further comprises a second and a fourth Z-direction sensitive magnetic field sensor Lz21, Lz22 configured to detect a vertical force component Fz22 in the second magneto-elastically active region 22 in the vertical direction Z.

The second pin 9 comprises a first and a third X-direction sensitive magnetic field sensor Lx11, L12 configured to detect a longitudinal force component Fx10 in the first magneto-elastically active region 21 in the longitudinal direction X.

The second pin 9 further comprises a second and a fourth X-direction sensitive magnetic field sensor Lx21, Lx22 configured to detect a longitudinal force component Fx20 in the second magneto-elastically active region 22 in the longitudinal direction X.

Therefore, the configuration of the second pin 9 is substantially similar to the configuration of the first pin 8.

Differently stated, the first pin 8 comprises at least one first X-direction sensitive magnetic field sensor Lx11, at least one second X-direction sensitive magnetic field sensor Lx21, at least one first Z-direction magnetic field sensor Lz11, and at least one second Z-direction magnetic field sensor Lz21. The second pin comprises at least one first X-direction sensitive magnetic field sensor Lx11, at least one second X-direction sensitive magnetic field sensor Lx21, at least one first Z-direction magnetic field sensor Lz11, and at least one second Z-direction magnetic field sensor Lz21.

However, the first and the second longitudinal force components Fx10, Fx20 are comparatively small (for example, resulting from friction between the abutment surface of the fourth through hole 7 and the second pin 9) or substantially zero. This is a direct result of the additional translational degree of freedom in the longitudinal direction X, which degree of freedom is provided by the fourth through hole 7 in the second portion 5.

The first and second pins 8, 9 are rigidly fixed within the first and second through holes 3, 4 of the first portion 2.

The third and the fourth through holes 6, 7 can provide a minimal gap between the abutment surfaces of the second portion 5 and the first and second pins 8, 9.

Figure 15:
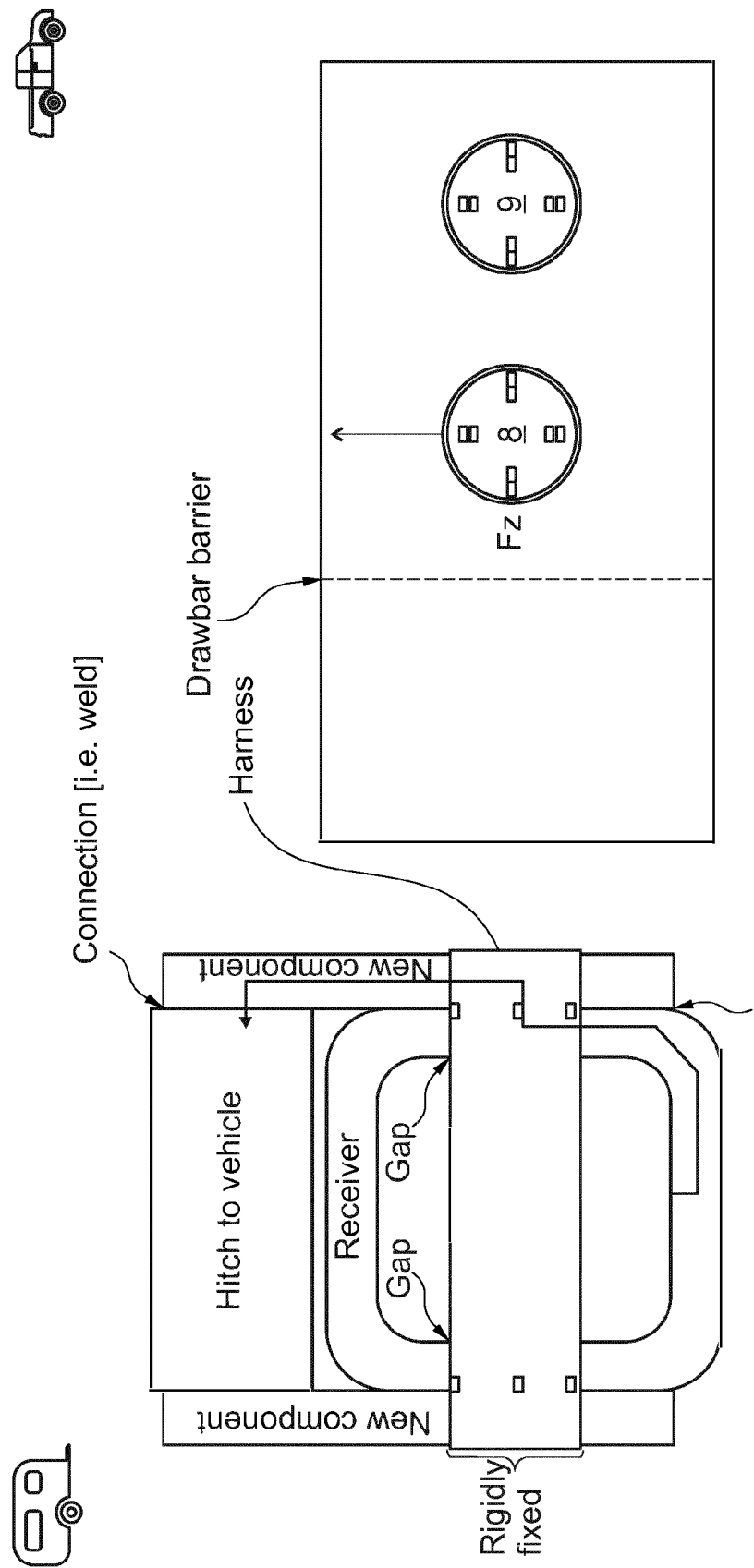
FIG. 15 is a simplified cross-sectional view of a sensor assembly configured to detect a vertical load component Fz, a transversal load component Fy, and a longitudinal load component Fx of a load F.

FIG. 15 is a simplified cross-sectional view of a sensor assembly configured to detect a vertical load component Fz, a transversal load component Fy, and a longitudinal load component Fx of a load F.

The first pin 8 comprises a first magneto-elastically active region 21 and a second magneto-elastically active region 22, which are directly or indirectly attached to or form parts of the first pin 8 in such a manner that mechanic stress that is applied to the first pin 8 is transmitted to the magneto-elastically active regions 21, 22.

Each magneto-elastically active region 21, 22 comprises a magnetically polarized region.

The magnetic polarization of the first magneto-elastically active region 21 and the magnetic polarization of the second magneto-elastically active region 22 can be substantially opposite to each other.

The magnetic field sensor means comprises at least one first and third direction sensitive magnetic field sensor Lx11, Lz11 being arranged approximate the first magneto-elastically active region for outputting a first signal and a third signal corresponding to a stress-induced magnetic flux emanating from the first magnetically polarized region 21.

The magnetic sensor means further comprises at least one second and fourth direction sensitive magnetic field sensor Lx21, Lz21 being arranged approximate the second magneto-elastically active region 22 for outputting a second signal and a fourth signal corresponding to a stress-induced magnetic flux emanating from the second magnetically polarized region 22.

The first pin 8 comprises a first and a third Z-direction sensitive magnetic field sensor Lz11, Lz12 configured to detect a vertical force component Fz11 in the first magneto-elastically active region 21 in the vertical direction Z.

The first pin 8 further comprises a second and a fourth Z-direction sensitive magnetic field sensor Lz21, Lz22 configured to detect a vertical force component Fz12 in the second magneto-elastically active region in the vertical direction Z.

The first pin 8 comprises a first and a third X-direction sensitive magnetic field sensor Lx11, L12 configured to detect a longitudinal force component Fx2 in the first magneto-elastically active region 21 in the longitudinal direction X.

The first pin 8 further comprises a second and a fourth X-direction sensitive magnetic field sensor Lx21, Lx22 configured to detect a longitudinal force component Fx1 in the second magneto-elastically active region in the longitudinal direction X.

The second pin 9 comprises a first and a third Z-direction sensitive magnetic field sensor Lz11, Lz12 configured to detect a vertical force component Fz21 in the first magneto-elastically active region 21 in the vertical direction Z.

The second pin 9 further comprises a second and a fourth Z-direction sensitive magnetic field sensor Lz21, Lz22 configured to detect a vertical force component Fz22 in the second magneto-elastically active region 22 in the vertical direction Z.

The second pin 9 comprises a first and a third X-direction sensitive magnetic field sensor Lx11, L12 configured to detect a longitudinal force component Fx22 in the first magneto-elastically active region 21 in the longitudinal direction X.

The second pin 9 further comprises a second and a fourth X-direction sensitive magnetic field sensor Lx21, Lx22 configured to detect a longitudinal force component Fx21 in the second magneto-elastically active region 22 in the longitudinal direction X.

Therefore, the general configuration of the first pin 8 is substantially similar to the configuration of the first pin depicted in FIG. 14.

The general configuration of the second pin 9 is substantially similar to the configuration of the first pin 8.

The first and second pins 8, 9 are rigidly fixed within the first and second through holes 3, 4 of the first portion 2.

The third and the fourth through holes 6, 7 can provide a minimal gap between the abutment surfaces of the second portion 5 and the first and second pins 8, 9. Optionally, the fourth through hole 7 can provide no minimal gap, such that the second pin 9 is rigidly fixed within the third and the fourth through hole 7.

Figure 16:
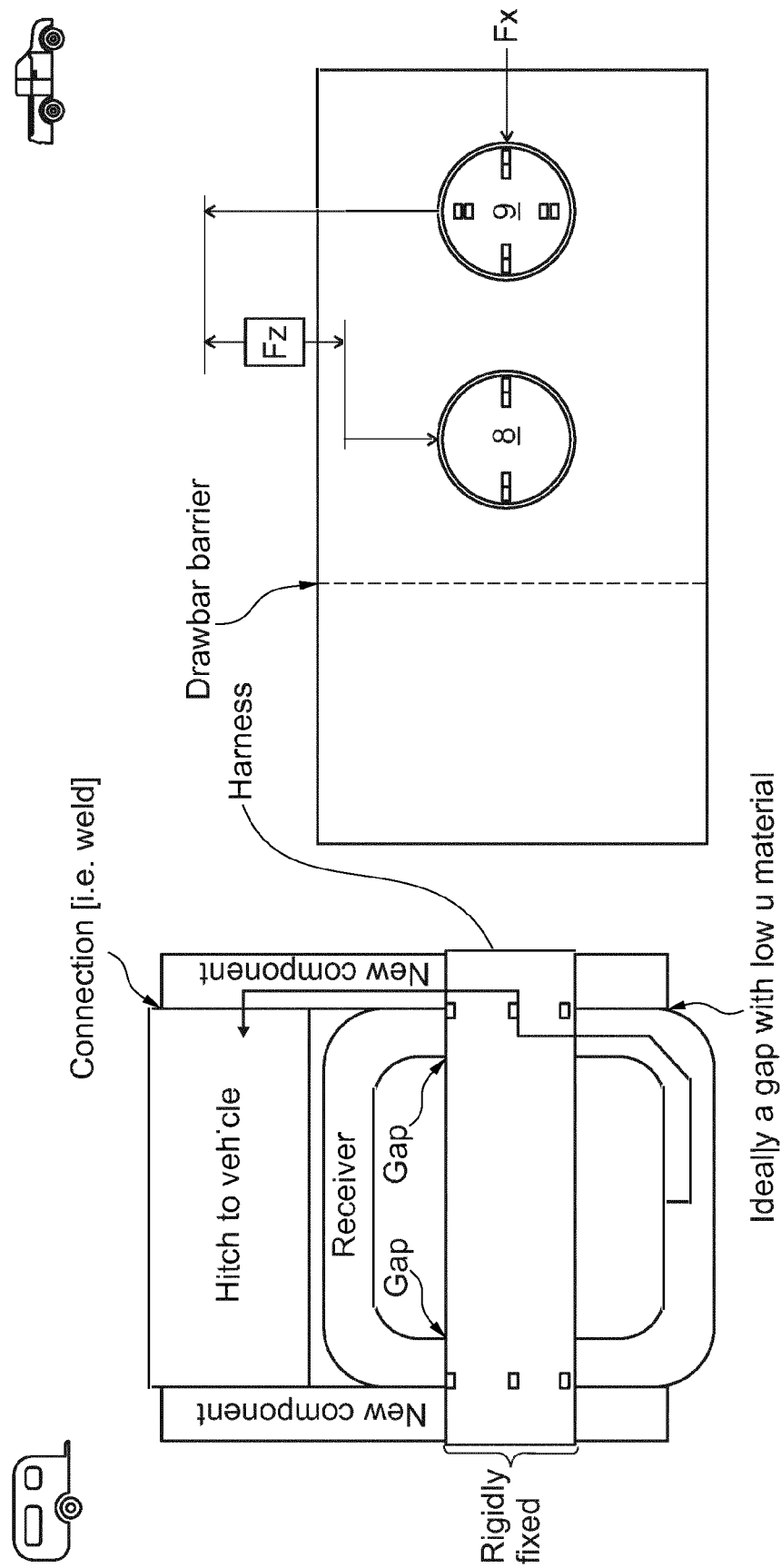
FIG. 16 is a simplified cross-sectional view of a sensor assembly configured to detect a vertical load component Fz, a transversal load component Fy, and a longitudinal load component Fx of a load F.

FIG. 16 is a simplified cross-sectional view of a sensor assembly configured to detect the first load case, the second load case, and the third load case.

The first pin 8 comprises a first magneto-elastically active region 21 and a second magneto-elastically active region 22, which are directly or indirectly attached to or form parts of the first pin 8 in such a manner that mechanic stress that is applied to the first pin 8 is transmitted to the magneto-elastically active regions 21, 22.

Each magneto-elastically active region 21, 22 comprises a magnetically polarized region.

The magnetic polarization of the first magneto-elastically active region 21 and the magnetic polarization of the second magneto-elastically active region 22 can be substantially opposite to each other.

The magnetic field sensor means comprises at least one first direction sensitive magnetic field sensor Lz11 being arranged approximate the first magneto-elastically active region for outputting a first signal corresponding to a stress-induced magnetic flux emanating from the first magnetically polarized region 21.

The magnetic sensor means further comprises at least one second direction sensitive magnetic field sensor Lz21 being arranged approximate the second magneto-elastically active region 22 for outputting a second signal and a fourth signal corresponding to a stress-induced magnetic flux emanating from the second magnetically polarized region 22.

The first pin 8 comprises a first and a third Z-direction sensitive magnetic field sensor Lz11, Lz12 configured to detect a vertical force component Fz11 in the first magneto-elastically active region 21 of the first pin 8 in the vertical direction Z.

The first pin 8 further comprises a second and a fourth Z-direction sensitive magnetic field sensor Lz21, Lz22 configured to detect a vertical force component Fz12 in the second magneto-elastically active region of the first pin 8 in the vertical direction Z.

The first pin 8 comprises no X-direction sensitive magnetic field sensors.

Therefore, the general configuration of the first pin 8 is substantially similar to the general configuration of the first pin 8 depicted in FIG. 12.

The second pin 9 comprises a first and a third Z-direction sensitive magnetic field sensor Lz11, Lz12 configured to detect a vertical force component Fz21 in the first magneto-elastically active region 21 in the vertical direction Z.

The second pin 9 further comprises a second and a fourth Z-direction sensitive magnetic field sensor Lz21, Lz22 configured to detect a vertical force component Fz22 in the second magneto-elastically active region 22 in the vertical direction Z.

The second pin 9 comprises a first and a third X-direction sensitive magnetic field sensor Lx11, L12 configured to detect a longitudinal force component Fx22 in the first magneto-elastically active region 21 in the longitudinal direction X.

The second pin 9 further comprises a second and a fourth X-direction sensitive magnetic field sensor Lx21, Lx22 configured to detect a longitudinal force component Fx21 in the second magneto-elastically active region 22 in the longitudinal direction X.

Therefore, the second pin 9 generally comprises a configuration that is substantially similar to the general configuration of the second pin 9 depicted in FIG. 15.

The first and second pins 8, 9 are rigidly fixed within the first and second through holes 3, 4 of the first portion 2.

The third and the fourth through hole 6, 7 can provide a minimal gap between the abutment surfaces of the second portion 5 and the first and second pins 8, 9. Optionally, the fourth through hole 7 can provide no minimal gap, such that the second pin 9 is rigidly fixed within the third and the fourth through hole 7.

Figure 17:
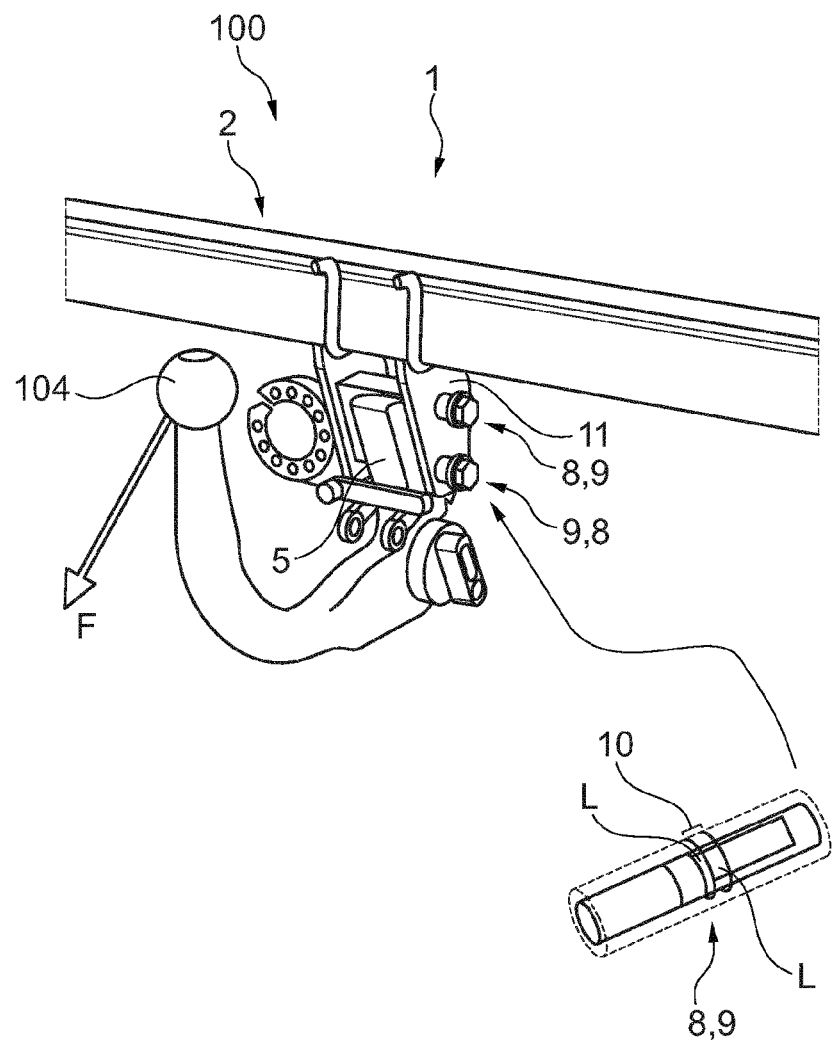
FIG. 17 is a simplified perspective view of a tow coupling comprising a sensor assembly for force sensing.

FIG. 17 is a simplified perspective view of a tow coupling comprising a sensor assembly for sensing (components) of a force F. The sensor assembly 1 for sensing a force F comprises a first portion 2 (attachment assembly, supporting yoke) having a first and a second through hole 3, 4.

The sensor assembly 1 further comprises a second portion 5 (trailer hitch, towing hook) having a third and fourth through hole 6, 7. The third and fourth through holes 6, 7 are positioned in correspondence to the first and second through holes 3, 4.

The sensor assembly 1 further comprises a first pin 8 and a second pin 9. The first pin 8 is arranged such that it extends through the first and third through holes 3, 6. The second pin 9 is arranged such that it extends through the second and fourth through holes 4, 7.

The first portion 2 is coupled to the second portion 5 via the first and second pins 8, 9.

At least one out of the first and the second pin 8, 9 comprises at least one magneto-elastically active region 10 that is directly or indirectly attached to or forms a part of the pin 8, 9 in such a manner that mechanic stress on the pin is transmitted to the magneto-elastically active region.

The magneto-elastically active region 10 comprises at least one magnetically polarized region such that a polarization of the polarized region becomes increasingly helically shaped as the applied stress increases.

The at least one pin 8, 9 further comprises a magnetic field sensor means arranged approximate the at least one magneto-elastically active region 10 for outputting a signal corresponding to a stress-induced magnetic flux emanating from the magnetically polarized region.

The magnetic field sensor means comprise at least one direction sensitive magnetic field sensor L, which is configured for determination of a shear force in at least one direction.

The at least one direction sensitive magnetic field sensor L is arranged to have a predetermined and fixed spatial coordination with the pin 8, 9.

The pin 8, 9 comprising the at least one direction sensitive magnetic field sensor L is at least partially hollow.

The at least one direction sensitive magnetic field sensor L is arranged inside the interior of the pin 8, 9.

The first and second pins 8, 9 are substantially arranged along the vertical direction Z. The pins 8, 9 extend in the transversal direction Y. The longitudinal direction is perpendicular to the vertical direction Z and the transversal direction Y to define the Cartesian coordinate system. The system of equations that has to be solved in order to determine the respective load components, has to be altered accordingly.

Further features and aspects of the invention (which have been described with respect to the preceding embodiments) may also apply to this embodiment.

The sensor assembly 1 is part of a tow coupling 100. The first part 2 is configured to be attached to the chassis of an automobile. The second part 5 provides a ball head 104 that is configured to couple to a trailer.

The direction sensitive sensors L may be vector sensors. In particular, Hall-effect, magneto-resistance, magneto-transistor, magneto-diode, MAGFET field sensor or fluxgate magneto-meter sensors can be applied. This advantageously applies to all embodiments of the invention.

The sensor assembly for force sensing according to aspects of the invention is advantageously applicable for load detection tow couplings, for load detection in farming equipment, and/or for load detection in construction equipment.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. A trailer hitch assembly comprising:
   two magnetoelastic pins adapted to producing respective stress-induced magnetic fields;
   a plurality of sensors configured to output electrical signals indicative of changes in the respective magnetic fields;
   a receiving tube having a portion with at least two spaced apart through holes configured for the two magnetoelastic pins to extend therethrough;
   a connecting device for fixedly attaching respective opposite ends of the two magnetoelastic pins; and
   a control unit remote from the two magnetoelastic pins configured to receive the electrical signals and determine a magnitude and direction of a force transmitted through the receiving tube to the two magnetoelastic pins.

2. The trailer hitch assembly of claim 1, wherein the changes in the respective magnetic fields change based on the magnitude and direction of the force, and wherein the plurality of sensors are configured to detect the respective changes in the magnetic fields corresponding to the amount of stress induced in the two magnetoelastic pins caused by the force.

3. The trailer hitch assembly of claim 1, wherein one or both of the changes in the respective magnetic fields of the two magnetoelastic pins change based on a vertical force, a lateral force, a longitudinal force, and a rotational force acting on the receiving tube, and wherein the vertical force, lateral force, and the longitudinal force are perpendicular to each other.

4. The trailer hitch assembly of claim 1, wherein the control unit is further configured to determine that a first pin of the two magnetoelastic pins has a stress-induced change in a first direction, determine that a second pin of the two magnetoelastic pins has a stress-induced change in a second direction opposite the first direction, and responsively determine that a vertical force is acting on the receiving tube.

5. The trailer hitch assembly of claim 1, wherein the receiving tube comprises an opening configured to engage a trailer hitch arm along a first axis, and wherein the respective axes of the two magnetoelastic pins are oriented perpendicular to and centered on the first axis.

6. The trailer hitch assembly of claim 1, wherein the respective opposite ends of the one of the two magnetoelastic pins are rigidly fixed in respective through holes and wherein the respective opposite ends of the other one of the two magnetoelastic pins are rigidly fixed in respective through holes a first direction but are free to slide in a second direction perpendicular to the first direction.

7. The trailer hitch assembly of claim 6, wherein one of the through holes is oblong and wherein the other one of the two magnetoelastic pins is configured to slide within the oblong through hole in response to a longitudinal force, and wherein the control unit is further configured to:
   determine that the one of the two magnetoelastic pins has a stress-induced change in a first direction by a first amount;
   determine that the other one of the two magnetoelastic pins has a stress-induced change in the first direction by a second amount;
   responsively determine that the longitudinal force is acting on the receiving tube; and
   determine a magnitude of the longitudinal force based on a difference between the first amount and the second amount.

8. The trailer hitch assembly of claim 1, wherein the plurality of sensors comprises two or more sensors corresponding to each of the first and second magnetoelastic pins.

9. The trailer hitch assembly of claim 8, wherein the control unit is further configured to:
   determine, based on the two or more sensors corresponding to the first magnetoelastic pin, that a first end of the first magnetoelastic pin has a stress-induced change in a first direction, and a second end of the first magnetoelastic pin has a stress-induced change in a second direction opposite the first direction; and
   responsively determine that a lateral force is acting on the receiving tube.

10. The trailer hitch assembly of claim 8, wherein the control unit is further configured to:
   determine, based on the two or more sensors corresponding to the first magnetoelastic pin, that a first end of the first magnetoelastic pin has a stress-induced change in a first direction, and a second end of the first magnetoelastic pin has a stress-induced change in a second direction opposite the first direction;

determine, based on the two or more sensors corresponding to the second magnetoelastic pin, that a first end of the second magnetoelastic pin has a stress-induced change in the first direction, and a second end of the second magnetoelastic pin has a stress-induced change in the second direction opposite the first direction; and responsively determine that a rotational force is acting on the receiving tube.

11. A trailer hitch assembly comprising:

a trailer hitch component for attaching to a chassis of a vehicle;

two magnetoelastic pins configured to couple the trailer hitch component to the chassis, wherein the two magnetoelastic pins are spaced apart by a distance d2 with their respective longitudinal axes substantially parallel to each other, wherein the respective opposite ends of at least one of the two magnetoelastic pins are rigidly fixed, and wherein each of the two magnetoelastic pins are adapted to producing respective magnetic fields when a force applied at a coupling ball located a distance d3 from one of the two magnetoelastic pins and a distance d1 from the other one of the two magnetoelastic pins is transferred to them through the hitch component, and wherein d1=d2+d3, a plurality of sensors configured to output electrical signals indicative of changes in the respective magnetic fields; and a control unit remote from the two magnetoelastic pins configured to receive the electrical signals and determine a magnitude and direction of the applied force.

12. The trailer hitch assembly of claim 11, wherein the changes in the respective magnetic fields change based on the magnitude and direction of the applied force, and wherein the plurality of sensors are configured to detect the respective changes in the magnetic fields corresponding to the amount of stress induced in the two magnetoelastic pins.

13. The trailer hitch assembly of claim 11, wherein one or both of the changes in the respective magnetic fields of the two magnetoelastic pins change based on a vertical force, a lateral force, a longitudinal force, and a rotational force acting on the trailer hitch component, and wherein the vertical force, lateral force, and the longitudinal force are perpendicular to each other.

14. The trailer hitch assembly of claim 11, wherein the control unit is further configured to determine that a first pin of the two magnetoelastic pins has a stress-induced change in a first direction by first amount Fz1, determine that a second pin of the two magnetoelastic pins has a stress-induced change in a second direction opposite the first direction by a second amount Fz2, and responsively determine that a vertical force Fz=Fz1+Fz2 is acting on the coupling ball.

15. The trailer hitch assembly of claim 11, wherein the trailer hitch component comprises an opening configured to engage a trailer hitch arm along a first axis, and wherein the respective axes of the two magnetoelastic pins are oriented perpendicular to and centered on the first axis.

16. The trailer hitch assembly of claim 11, wherein the respective opposite ends of the one of the two magnetoelastic pins are rigidly fixed and wherein the respective opposite ends of the other one of the two magnetoelastic pins are rigidly fixed in a first direction but are free to slide in a second direction perpendicular to the first direction.

17. The trailer hitch assembly of claim 16, wherein the other one of the two magnetoelastic is configured to slide within an oblong coupling in response to a longitudinal force, and wherein the control unit is further configured to:

determine that the one of the two magnetoelastic pins has a stress-induced change in a first direction by a first amount F1;

determine that the other one of the two magnetoelastic pins has a stress-induced change in the first direction by a second amount F2;

responsively determine that the longitudinal force Fx is acting on the coupling ball; and determine a magnitude of the longitudinal force based on a sum of the first amount=F1 and the second amount F2.

18. The trailer hitch assembly of claim 11, wherein the plurality of sensors comprises two or more sensors corresponding to each of the first and second magnetoelastic pins.

19. The trailer hitch assembly of claim 18, wherein the control unit is further configured to:

determine, based on the two or more sensors corresponding to the first magnetoelastic pin, that a first end of the first magnetoelastic pin has a stress-induced change Fx1 in a first direction, and a second end of the first magnetoelastic pin has a stress-induced change Fx2 in a second direction opposite the first direction; and responsively determine that a lateral force Fy is acting on the trailer hitch component.

20. The trailer hitch assembly of claim 18, wherein the control unit is further configured to:

determine, based on the two or more sensors corresponding to the first magnetoelastic pin, that a first end of the first magnetoelastic pin has a stress-induced change in a first direction, and a second end of the first magnetoelastic pin has a stress-induced change in a second direction opposite the first direction;

determine, based on the two or more sensors corresponding to the second magnetoelastic pin, that a first end of the second magnetoelastic pin has a stress-induced change in the first direction, and a second end of the second magnetoelastic pin has a stress-induced change in the second direction opposite the first direction; and responsively determine that a rotational force is acting on the trailer hitch component.

21. A trailer hitch assembly comprising:

two magnetoelastic pins adapted to producing respective stress-induced magnetic fields, wherein a first one of the two magnetoelastic pins is substantially arranged above the other magnetoelastic pin along a vertical direction with their respective longitudinal axes extending in a transversal direction to the vertical and substantially parallel to each other;

a plurality of sensors configured to output electrical signals indicative of changes in the respective magnetic fields;

a connecting device configured to being attached to and extending from the chassis of a vehicle for fixedly attaching respective opposite ends of the two magnetoelastic pins; and a trailer hitch configured to couple with the connecting device and with a trailer, the trailer hitch having a portion with at least two spaced apart through holes configured for the two magnetoelastic pins to extend therethrough.

22. The trailer hitch assembly of claim 21, wherein the two magnetoelastic pins are arranged inside the two magnetoelastic pins.

23. The trailer hitch assembly of claim 21, further comprising a control unit remote from the two magnetoelastic pins configured to receive the electrical signals and determine a magnitude and direction of a force transmitted from the trailer hitch to the two magnetoelastic pins.

24. The trailer hitch assembly of claim 21, wherein the changes in the respective magnetic fields change based on the magnitude and direction of a force applied to the trailer hitch, and wherein the plurality of sensors are configured to detect the respective changes in the magnetic fields corresponding to the amount of stress induced in the two magnetoelastic pins caused by the force.

25. The trailer hitch assembly of claim 21, wherein one or both of the changes in the respective magnetic fields of the two magnetoelastic pins change based on a vertical force, a lateral force, a longitudinal force, and a rotational force acting on the trailer hitch, and wherein the vertical force, lateral force, and the longitudinal force are perpendicular to each other.

26. The trailer hitch assembly of claim 21, wherein the control unit is further configured to determine that the first pin of the two magnetoelastic pins has a stress-induced change in a first direction, determine that the other pin of the two magnetoelastic pins has a stress-induced change in a second direction opposite the first direction, and responsively determine that a vertical force is acting on the trailer hitch.

27. The trailer hitch assembly of claim 21, wherein the connecting device comprises an opening configured to engage an end of the trailer hitch along a first axis, and wherein the respective axes of the two magnetoelastic pins are oriented perpendicular to and centered on the first axis.

28. The trailer hitch assembly of claim 21, wherein the respective opposite ends of the first one of the two magnetoelastic pins are rigidly fixed in respective through holes and wherein the respective opposite ends of the other one of the two magnetoelastic pins are rigidly fixed in respective through holes in a first direction but are free to slide in a second direction perpendicular to the first direction such that it is insensitive with respect to shear forces acting in the second direction.

29. The trailer hitch assembly of claim 28, wherein one of the through holes is oblong and wherein the other one of the two magnetoelastic pins is configured to slide within the oblong through hole in response to a vertical force, and wherein the control unit is further configured to:

determine that the one of the two magnetoelastic pins has a stress-induced change in a first direction by a first amount;

determine that the other one of the two magnetoelastic pins has a stress-induced change in the first direction by a second amount;

responsively determine that the vertical force is acting on the trailer hitch; and determine a magnitude of the vertical force based on a sum of the first amount and the second amount.

30. The trailer hitch assembly of claim 21, wherein the plurality of sensors comprises two or more sensors corresponding to each of the first and second magnetoelastic pins.

31. The trailer hitch assembly of claim 30, wherein the control unit is further configured to:

determine, based on the two or more sensors corresponding to the first magnetoelastic pin, that a first end of the first magnetoelastic pin has a stress-induced change in a first direction, and a second end of the first magnetoelastic pin has a stress-induced change in a second direction opposite the first direction; and responsively determine that a lateral force is acting on the trailer hitch.

32. The trailer hitch assembly of claim 30, wherein the control unit is further configured to:

determine, based on the two or more sensors corresponding to the first magnetoelastic pin, that a first end of the first magnetoelastic pin has a stress-induced change in a first direction, and a second end of the first magnetoelastic pin has a stress-induced change in a second direction opposite the first direction;

determine, based on the two or more sensors corresponding to the other one of the two magnetoelastic pin, that a first end of the second magnetoelastic pin has a stress-induced change in the first direction, and a second end of the second magnetoelastic pin has a stress-induced change in the second direction opposite the first direction; and responsively determine that a rotational force is acting on the trailer hitch.

* * * * *